(12) United States Patent
Redmond

(10) Patent No.: US 8,932,184 B2
(45) Date of Patent: *Jan. 13, 2015

(54) HYDROGEN STORAGE, DISTRIBUTION, AND RECOVERY SYSTEM

(76) Inventor: Scott D. Redmond, San Francisco, CA (US)

( * ) Notice: Subject to any disclaimer, the term of this patent is extended or adjusted under 35 U.S.C. 154(b) by 11 days.

This patent is subject to a terminal disclaimer.

(21) Appl. No.: 13/200,630

(22) Filed: Sep. 26, 2011

(65) Prior Publication Data

US 2013/0071294 A1 Mar. 21, 2013

Related U.S. Application Data

(63) Continuation of application No. 11/700,745, filed on Jan. 30, 2007, now Pat. No. 8,066,946, which is a continuation-in-part of application No. 10/310,498, filed on Dec. 4, 2002, now Pat. No. 7,169,489, which is a continuation-in-part of application No. 10/241,125, filed on Sep. 10, 2002, now abandoned, and a continuation-in-part of application No. 10/099,274, filed on Mar. 15, 2002, now abandoned, and a continuation-in-part of application No. 10/099,771, filed on Mar. 15, 2002, now Pat. No. 7,399,325, and a continuation-in-part of application No. 10/178,974, filed on Jun. 25, 2002, now abandoned.

(51) Int. Cl.
| | |
|---|---|
| *B01J 7/00* | (2006.01) |
| *B82Y 30/00* | (2011.01) |
| *C01B 3/00* | (2006.01) |
| *H01M 8/04* | (2006.01) |
| *F17D 3/00* | (2006.01) |
| *F17C 11/00* | (2006.01) |
| *H01M 8/06* | (2006.01) |

(52) U.S. Cl.
CPC .. *B01J 7/00* (2013.01); *B82Y 30/00* (2013.01); *C01B 3/0005* (2013.01); *C01B 3/0021* (2013.01); *C01B 3/0026* (2013.01); *C01B 3/0031* (2013.01); *C01B 3/0084* (2013.01); *H01M 8/04201* (2013.01); *H01M 8/04208* (2013.01); *H01M 8/04216* (2013.01); *F17D 3/00* (2013.01); *F17C 11/005* (2013.01); *H01M 8/065* (2013.01); *Y02E 60/321* (2013.01); *Y02E 60/325* (2013.01); *Y02E 60/327* (2013.01); *Y02E 60/34* (2013.01); *Y02E 60/50* (2013.01)
USPC ............. 482/61; 48/65; 48/204; 422/211

(58) Field of Classification Search
USPC ................. 48/61, 65, 204; 422/211
See application file for complete search history.

(56) References Cited

U.S. PATENT DOCUMENTS

| | | | | |
|---|---|---|---|---|
| 7,169,489 | B2 * | 1/2007 | Redmond | 429/515 |
| 7,922,781 | B2 * | 4/2011 | Chellappa et al. | 48/197 R |
| 2004/0213998 | A1 * | 10/2004 | Hearley et al. | 428/402 |

* cited by examiner

*Primary Examiner* — Nina Bhat
(74) *Attorney, Agent, or Firm* — Patrick F. Bright

(57) ABSTRACT

Cassette based systems and methods of hydrogen storage, distribution, and recovery are disclosed. A cassette or other container may contain a hydrogen storage or storing material. Information may be stored in the material and subsequently read or accessed. A probe may be used to interrogate the material. The hydrogen content or other characteristics of the material may be determined based on the interrogation. A hydrogen dispensing unit may contain a depleted cassette acceptor to accept depleted cassettes and a charged cassette dispenser to dispense charged cassettes. The dispensing unit may be implemented in a hydrogen retail store or as a standalone unit. The retail store or the unit may connect to a hydrogen network and implement various business methods, as disclosed herein.

13 Claims, 27 Drawing Sheets

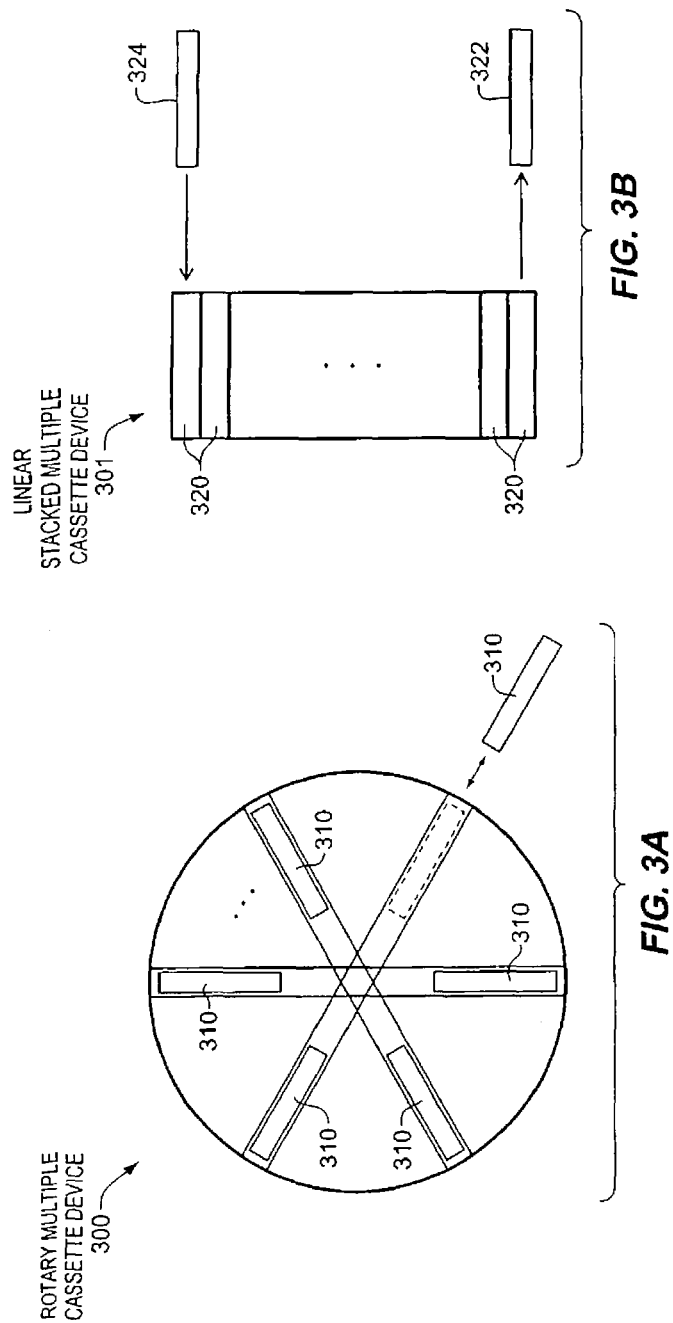

WELCOME BACK MR. REDMOND

Your next reload will be at 3:45PM on March 22, 2003

Maintenance is required in 420 days on Lab unit.

Cleaning is required in 190 days on BMW 745i Unit.

- ☐ CHECK DAILY USAGE
- ☐ CHECK MONTHLY USAGE
- ☐ EXPEDITE ENERGY DELIVERY
- ☐ DELAY ENERGY DELIVERY
- ☐ PRODUCE PRINTABLE CHARTS
- ☐ OFFER OVERFLOW ENERGY FOR SALE
- ☐ DETAILED REPORT FOR LAB UNIT
- ☐ DETAILED REPORT FOR HOME UNIT
- ☐ DETAILED REPORT FOR BMW 745i UNIT
- ☐ EDUCATION RESOURCES
- ☐ TODAY'S INFORMATION
- ☐ OTHERS

WEB PAGE 2200

*FIG. 22*

HYDROGEN STORAGE, DISTRIBUTION, AND RECOVERY SYSTEM

RELATED APPLICATIONS

Continuation of application Ser. No. 11/700,745, filed on Jan. 30, 2007, now patent pub. No. 2007/0259220 A1 now U.S. Pat. No. 8,066,946, which is a continuation-in-part of application Ser. No. 10/310,498, filed on Dec. 4, 2002, now U.S. Pat. No. 7,169,489, which is a continuation-in-part of application Ser. No. 10/241,125, filed on Sep. 10, 2002 now abandoned, and which is a continuation-in-part of application Ser. No. 10/099,274, filed on Mar. 15, 2002 now abandoned, now abandoned and which is a continuation-in-part of application Ser. No. 10/099,771, filed on Mar. 15, 2002 now U.S. Pat. No. 7,399,325, and which is a continuation-in-part of application Ser. No. 10/178,974, filed on Jun. 25, 2002, now abandoned.

BACKGROUND

1. Field of the Invention

Embodiments of the invention relate to cassette-based hydrogen storage, distribution, and recovery. In some embodiments of the invention, a cassette may be used to store a hydrogen containing material, the cassette may be distributed by a common carrier, and a hydrogen recovery system may be used to recover hydrogen from the cassette for use in a fuel cell, hydrogen powered vehicle, or other utilization device. In some embodiments of the invention, the cassettes may be distributed with the assistance of a hydrogen distribution network based on information associated with hydrogen storage, distribution, and recovery.

2. Background

The widespread use of fossil fuels for energy and for powering internal combustion engine vehicles has created significant air quality problems in much of the industrialized world. Air pollution in turn is related to numerous health and environmental problems. A variety of alternative energy sources, such as nuclear, solar, geothermal and wind power have been proposed to reduce dependence on fossil fuels. However, drawbacks exist for each of these alternative energy sources.

One of the most promising fossil fuel alternatives is hydrogen. Hydrogen can be combined with oxygen via combustion, or through fuel cell mediated oxidation/reduction reactions, to produce heat, or electrical power. After many years of development, hydrogen-based fuel cells are a viable source of energy and currently offer a number of advantages over petroleum-based internal combustion engines, and the like. Often hydrogen-based fuel cells are more efficient, operate with less friction, operate at lower temperatures, are less polluting, do not emit carbon dioxide (a suspected greenhouse gas), are quieter, etc. As a fuel, hydrogen offers a number of advantages including being abundant, affordable, clean, renewable, and having favorable energy density. The primary product of this reaction—water—is non-polluting and can be recycled to regenerate hydrogen and oxygen.

Unfortunately, existing approaches for storing, distributing, and recovering hydrogen are extremely limiting, and are a significant impediment to the widespread utilization of hydrogen fuel, and the realization of the associated advantages. To illustrate some of the problems, consider one of the more prevalent approaches based on pressurized tanks or cylinders to store gaseous or liquefied hydrogen.

This approach involves producing hydrogen gas, liquefying or pressurizing the hydrogen into a pressurized cylinder, shipping the cylinders to the point of use, and releasing the hydrogen from the cylinders. Due to hydrogen's flammability characteristics (e.g., flammability over a wide range of concentrations in air, and low spark temperatures), the storage, distribution, and use of hydrogen in such tanks is highly regulated and controlled. In order to provide improved safety, and due to the high pressures involved, the tanks are often heavy, contain specialized explosion-proof components, and are correspondingly expensive. Nevertheless, even with these precautions, there is still a significant risk that hydrogen may be released, and explode, during loading, unloading, or distribution. Such risks render the approach generally unfavorable for powering motorized vehicles. Accordingly, the costs and dangers associated with these prior art techniques for storing and distributing hydrogen are prohibitive, and limit the utilization of hydrogen as fuel.

Thus, the potential for using hydrogen as a fuel is great, but there are significant and limiting problems with conventional approaches for storing, distributing, and recovering hydrogen.

BRIEF DESCRIPTION OF THE SEVERAL VIEWS OF THE DRAWINGS

The novel features believed characteristic of the invention are set forth in the appended claims. The present invention is illustrated by way of example, and not by way of limitation, in the figures of the accompanying drawings and in which like reference numerals refer to similar elements. The invention itself, however, as well as a preferred mode of use, will best be understood by reference to the following detailed description of an illustrative embodiment when read in conjunction with the accompanying drawings:

FIGS. 3A-B show exemplary multiple cassette storage devices, according to embodiments of the invention.

FIG. 22 shows a conventional HTML format web page that may be presented to a user connected to a hydrogen network, according to embodiments of the invention.

DETAILED DESCRIPTION

Described herein are systems and methods for storing, distributing, and recovering hydrogen fuel. To aid in the understanding of the present invention, the following description provides specific details of presently preferred embodiments of the invention. It will be apparent, however, to one skilled in the art that the present invention may be practiced without some of these specific details, for example by substituting other hydrogen storage containers in place of the cassettes disclosed herein, or by substituting other hydrogen storing materials in place of those described herein. Additionally, cassettes may be distributed with the assistance of different distribution networks that contain varying levels of storage, distribution, and recovery information. Where the discussion refers to well-known structures and devices, block diagrams are used, in part, to demonstrate the broad applicability of the present invention to a wide range of such structures and devices.

The utility of hydrogen as a fuel depends largely on storage and transportation of the hydrogen. Currently, hydrogen is typically stored in tanks as a compressed gas or cryogenic liquid. Certain solid state materials for storing hydrogen are known in the arts. The solid state storage is inherently safer than compressed gas or cryogenic liquid forms particularly for onboard storage of hydrogen for hydrogen powered vehicles. However, the storage and transportation solutions for these solid state hydrogen storage materials are limited. The present inventors have conceived solutions for storing and transporting hydrogen on solid state hydrogen storage materials. The solutions incorporate numerous cassette designs for containing, storing, and transporting hydrogen storing materials as well as novel hydrogen storage materials described herein and in co-pending patent applications and business methods associated with transporting hydrogen and implementing a hydrogen network.

I. Hydrogen Storage and Recovery Systems

Figure 1:
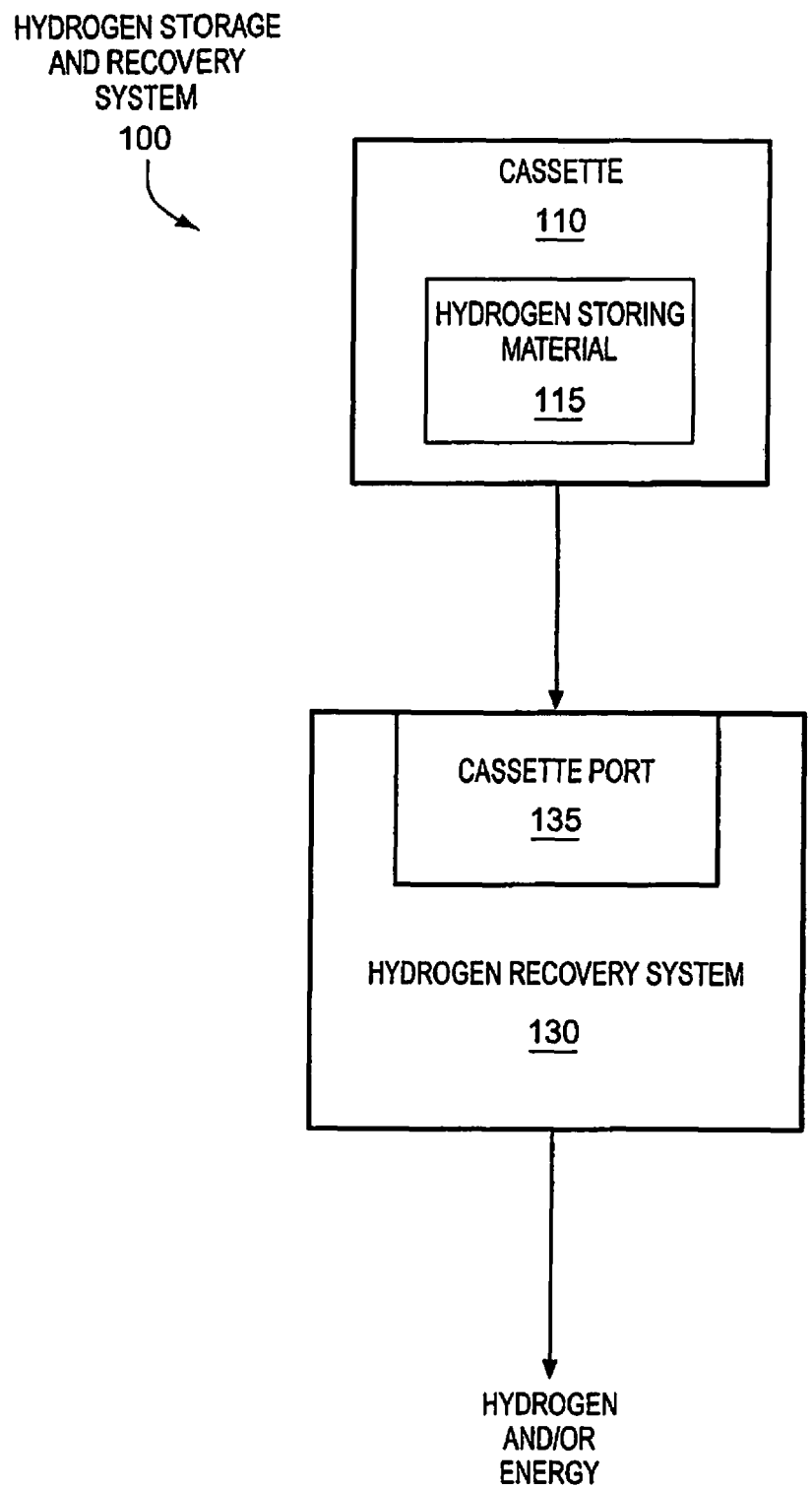
FIG. 1 shows a cassette based hydrogen storage and recovery system, according to embodiments of the invention.

FIG. 1 shows a cassette-based hydrogen storage and recovery system 100, according to embodiments of the invention. The system includes a cassette 110, a hydrogen storing material 115 within the cassette, a hydrogen recovery system 130, and a cassette receiving port 135 of the recovery system where the cassette may unload or discharge its hydrogen cargo. The cassette containing the hydrogen storing material, which is an embodiment of a hydrogen storage system, may be coupled with the cassette port of the hydrogen recovery system to allow the system to recover hydrogen from the cassette. In one instance, the cassette may be inserted into a cassette receptacle of the recovery system, similarly to the way a video cassette recorder (VCR) tape is inserted into a VCR. The hydrogen recovery system may provide the recovered hydrogen, or energy generated from the recovered hydrogen, or both, to another hydrogen or energy utilizing system, such as a hydrogen fuel cell, or various conventional electrical systems.

As used herein, the term cassette will be used to refer to a container for a hydrogen storage material that allows for improved handling of the hydrogen storage material during distribution and that may be loaded and unloaded into a hydrogen recovery system. Advantages of the cassette system include safety, ease of use, cost-effectiveness, reliable and transportability. The cassettes, the hydrogen storing material, and the hydrogen recovery systems may be designed in accordance with any codes and/or regulations that are consistent with their intended use. The cassette may have any shape, size, weight, hydrogen storing material, amount of hydrogen storing material, and amount of hydrogen stored therein that is desired for the particular implementation. In one instance, the cassette may have a compact rectangular solid shape and a size that is similar to a VCR cassette, although this is not required. For example, the cassette may have a shape of a squat cylinder and a size similar to that of a hearing aid battery, a hockey puck, or larger.

The cassette may be impact resistant, corrosion resistant, waterproof, gas leak proof and lightweight. They may be resistant to thermal, electrical and mechanical stress, as might occur during distribution or in a vehicle collision for example. The cassette may be relatively un-pressurized (no significant internal gas pressure) while containing the hydrogen storing material, at least during periods of distribution when hydrogen is not being recovered from the cassette. The cassettes may avoid using liquid hydrogen, may be un-pressurized or at least very low pressure, and may allow recovery of hydrogen at safe temperatures that avoid hydrogen gas ignition. During storage and transport, the materials contained therein should release only low amounts of hydrogen gas. Because of the flammable and potentially explosive nature of hydrogen gas, the ability to transport the cassette system with little or no internal pressure and with little risk of leakage is a significant safety advantage. Although during operation the cassettes may have an internal pressure in the range of approximately 1-4 atmospheres, the cassette may be rated to withstand an internal pressure up to approximately 10 atmospheres, to provide a margin of safety in the event of an unintended release of hydrogen from the material, and thereafter to safely rupture to avoid an explosion.

The cassette of certain embodiments may contain a sensor to sense temperature (e.g., a resistance temperature detector), pressure, or another condition within the cassette. The cassette may be material-agnostic in that a variety of hydrogen storing compounds may be contained within the cassette. The cassette may be modular (e.g., constructed with standardized components and dimensions) and interchangeable with other cassettes for improved scalability and flexibility in use. The systems may be scalable so that they work for a variety of hydrogen utilization magnitudes ranging from quite small to quite large. The cassette may be readily portable and in some embodiments may allow transport of hydrogen by a common carrier as a non-hazardous material. Desirably, the cassette may be provided at a sufficiently low cost, although this is not required. Other features of a cassette that may be desirable are that it may be repeatedly charged and discharged without breaking down, would exhibit fairly rapid hydrogen uptake and release, could store a sufficiently high weight percent of hydrogen to provide a compact cassette, may allow hydrogen recovery at relatively low temperatures, for example in the range of approximately 25-150° C., and would be sufficiently light for its intended use. Exemplary cassette designs, for several widely differing types of hydrogen storage materials, are discussed below.

Different embodiments of cassettes and hydrogen recovery systems for recovering hydrogen from the cassettes are discussed in further detail below. In certain embodiments the cassette may allow loading or unloading a hydrogen containing material. For example, metal hydride may be removed from the container and into a hydrogen recovery system. In other embodiments the container may allow obtaining or deriving hydrogen from the hydrogen containing material. For example, hydrogen may be thermally released from the container by heating a sodium alanate hydrogen containing material within the container. Of course, it will be appreciated that many other materials and cassettes for those materials are contemplated as will be appreciated by a person having an ordinary level of skill in the art and the benefit of the present disclosure.

Figure 2A:
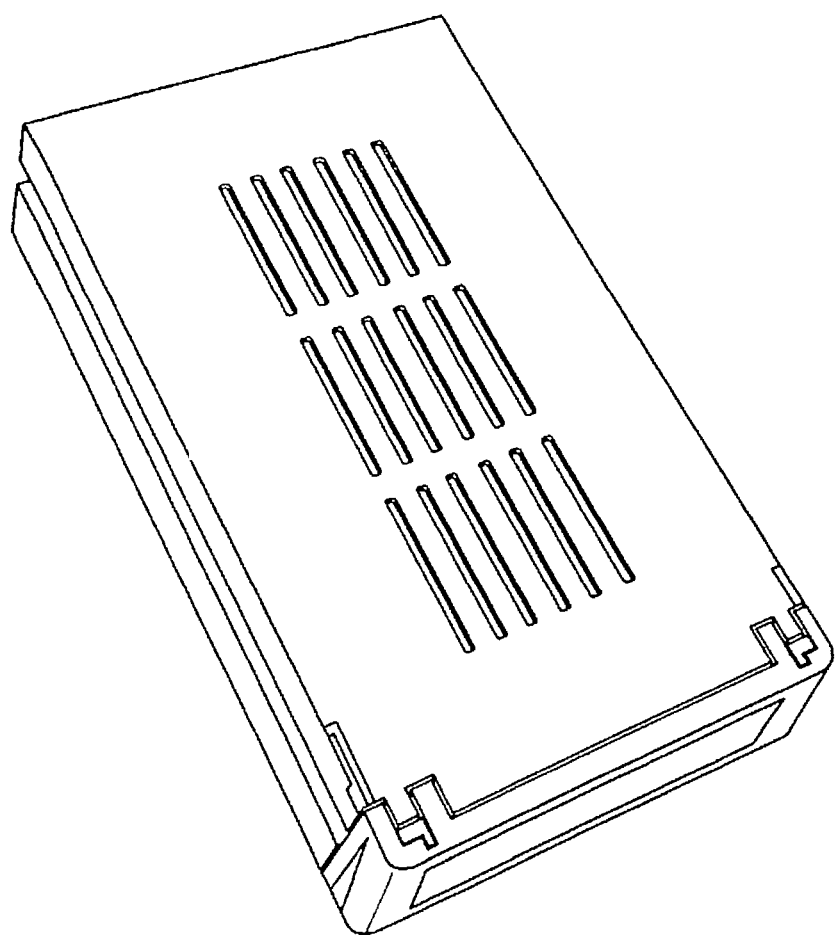
FIG. 2A shows an exemplary cassette, according to embodiments of the invention.

FIG. 2A shows a non-limiting example of a cassette, according to embodiments of the invention. The cassette is an A2 sized cassette that may hold approximately a liter of a solid hydrogen storing material, such as sodium hydride. The cassette has a size and shape that are convenient for handling, distribution, and stacking. The cassette has a hinged door (at the bottom) that may allow certain types of hydrogen storing materials to be removed from the cassette for processing within a recovery system. The cassette contains a handle for ease of handling.

As used herein, the term hydrogen storing material will be used to refer to a material that contains hydrogen, often chemically binding the hydrogen, and allows it to be stored within the cassette and allows it to be subsequently recovered by the hydrogen recovery system when and where it is needed. Chemically binding the hydrogen, for example through sorption or through chemical bonds, may significantly reduce the risks of unintended release of hydrogen, the flammability, and the associated risks of explosion. The hydrogen is stored as a bound and relatively stable solid state rather than as a compressed gas or liquid, which would readily leave the cassette if it were ruptured. Hydrogen storage materials that store relatively large amounts of hydrogen per unit of storage material will often be desired in order to distribute a large amount of hydrogen in a compact cassette.

Non-limiting examples of hydrogen storing materials that are contemplated to be useful with the present invention include solid metal hydrides, metal hydride solutions (e.g., a metal borohydride solution), metal hydride slurries (e.g., a metal hydride with mineral oil), carbon nanostructures (e.g., fullerenes, nanotubes, or nanofibers), glass microspheres, sodium alanates, doped sodium alanates, and many others. Of course virtually any other known hydrogen storing material may potentially be used.

Metal hydride compositions for hydrogen storage are well known in the art (e.g., U.S. Pat. Nos. 4,211,537; 4,728,580; 4,667,185; 6,165,643). Systems for hydrogen generation using metal hydride or metal alloy hydrides are also well known (U.S. Pat. Nos. 4,302,217; 4,537,761; 4,570,446; 4,599,867; 5,360,461; 5,797,269; 5,962,155; 5,987,895; 6,143,052; 6,194,092; 6,267,229). Metal hydrides reversibly take up hydrogen gas when exposed to very high pressures of hydrogen. Hydrogen release is facilitated by heating the metal hydride to high temperature.

Hydrogen generating borohydrides, such as lithium or sodium borohydride, are known in the art (see, e.g., U.S. Pat. Nos. 4,000,003; 4,002,726; 4,628,010; 5,372,617). In the presence of an appropriate catalyst, such as platinum, borohydride reacts with water to generate hydrogen and borate. In certain embodiments of the invention, the rate of hydrogen production may be controlled by regulating exposure of the catalyst to the borohydride solution. In alternative embodiments of the invention, solid chemical hydrides such as lithium borohydride, sodium borohydride, calcium hydride, lithium aluminum hydride or lithium hydride may be used to generate hydrogen upon exposure to water (U.S. Pat. Nos. 4,000,003; 5,372,617; 5,702,491). Another exemplary embodiment is disclosed in U.S. Pat. No. 6,274,093, comprising a compound such as ammonia that can react with a solid compound, such as lithium aluminum tetrahydride, to release hydrogen.

In another exemplary embodiment, hydrogen may be stored in carbon nanotubes and/or fullerenes (e.g., Dillon et al., "Carbon Nanotube Materials for Hydrogen Storage," Proceedings of the 2001 DOE Hydrogen Program Review, www.eren.doe.gov/hydrogen/pdfs/30535 am.pdf). Methods for preparing carbon nanotubes are well known (e.g., U.S. Pat. Nos. 6,258,401; 6,283,812; 6,297,592). Carbon nanotubes may also be obtained from commercial sources, such as CarboLex (Lexington, Ky.), NanoLab (Watertown, Mass.), Materials and Electrochemical Research (Tucson, Ariz.) or Carbon Nano Technologies Inc. (Houston, Tex.).

Hydrogen may be recovered from the cassette with the use of a hydrogen recovery system. As used herein, the term hydrogen recovery system will be used to refer to a system that recovers hydrogen from a cassette. Some hydrogen recovery systems may also use hydrogen, for example in an internal fuel cell, and may therefore also be hydrogen utilization systems as well as hydrogen recovery systems. In some instances, as discussed further below, hydrogen may be recovered from these hydrogen storing materials by heating at near atmospheric pressure, or slightly above. In other instances, hydrogen may be recovered from these materials by reaction with a suitable reactant, often water. For example, sodium alanate may be heated to a sufficient temperature to release hydrogen in a cassette of one embodiment of the invention. Alternatively, a metal hydride may be removed from the cassette and reacted with water in order to recover hydrogen. In one instance, the cassette contains a borohydride solution that may be removed from the cassette and exposed to a catalyst such as platinum and potentially additional water in order to recover hydrogen.

Figure 2B:
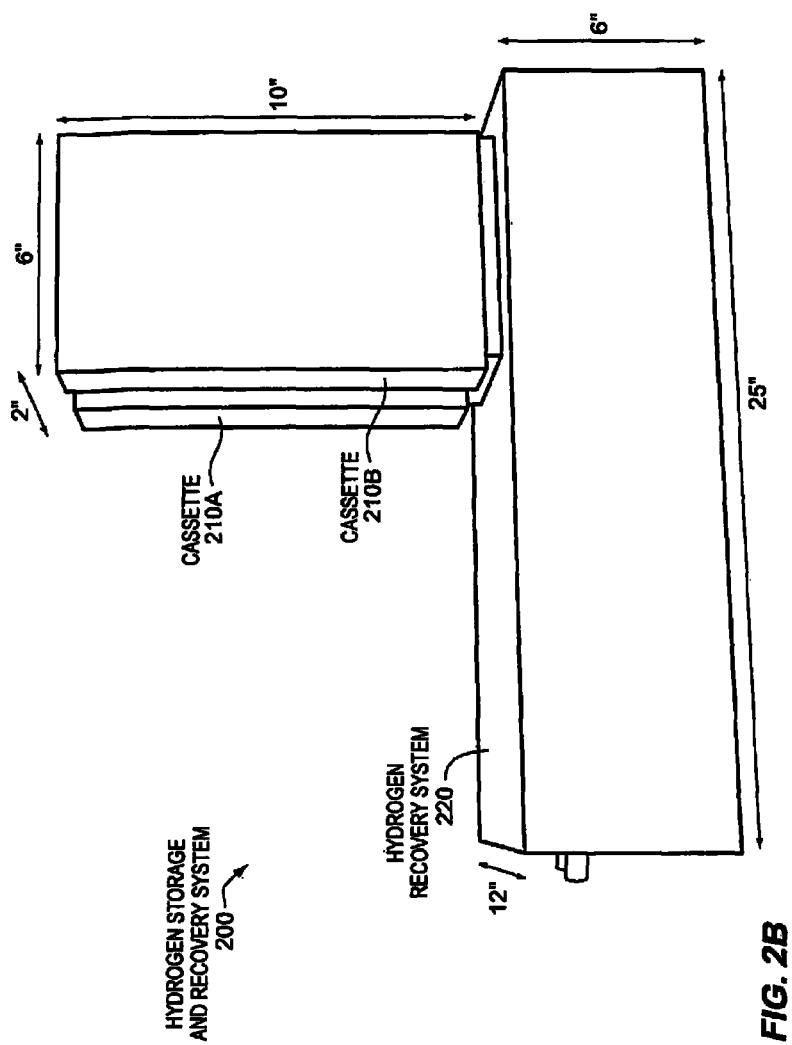
FIG. 2B shows an exemplary hydrogen storage and recovery system, according to embodiments of the invention.

FIG. 2B shows a non-limiting example of a hydrogen storage and recovery system 200, according to embodiments of the invention. As shown, the cassettes 210A-B are inserted into cassette ports of the hydrogen recovery system 220. The particular system is a dual cassette system that allows two cassettes to be simultaneously coupled with the recovery system. As desired, both cassettes may be processed simultaneously to recover hydrogen, or one cassette may be processed to depletion before hydrogen is recovered from the other cassette. In one embodiment, the recovery system may be designed as a fully self-contained hydrogen utilizing electrical power generator system, feeding hydrogen gas generated by the cassettes to an internal fuel cell that may generate 6 or 12 volt direct current (DC) electrical power. In certain embodiments, the recovery system may also comprise, or be attached to, an AC/DC converter that can provide 120 Volt alternating current (AC) power to electrical devices. In other embodiments, the recovery system may feed hydrogen gas to other hydrogen utilization systems such as an external fuel cell or vehicle. In the exemplary embodiment shown the recovery system is about 12 inches deep, 6 inches tall, and 25 inches wide, while the cassettes are about 2 inches deep, 6 inches wide, and 10 inches tall. The artisan will realize that in different embodiments the cassettes and recovery system may be smaller or larger in size.

FIGS. 3A-B show exemplary multiple cassette storage devices, according to embodiments of the invention. In particular, FIG. 3A shows a rotary multiple cassette device or clip 300. A plurality of cassettes 310 may each be loaded into cassette receptacles of the device and unloaded or discharged one by one into a cassette port of a hydrogen recovery system. The device may be rotated in order to access the next cassette. The particular device shown contains six cassettes, although the cassette may contain any desired number of cassettes. The cassettes may be unloaded manually by an operator or systematically by the hydrogen recovery unit, as desired. FIG. 3B shows a linear stacked multiple cassette device or clip 301. The device contains a plurality of stacked cassettes 320 for sequential loading into a hydrogen recovery system. As one example, a charged cassette 322 may be extracted from the bottom of the device while a depleted cassette 324 may be returned to the top of the stack and pushed down into the stack, and this process may be repeated sequentially for each of the cassettes until the device contains a stack of all depleted cassettes.

II. Hydrogen Utilization Systems

In some embodiments, the hydrogen recovered by a hydrogen recovery unit may be provided to a hydrogen utilization system. Suitable hydrogen utilization systems include but are not limited to fuel cells, hydrogen powered vehicles (e.g., fuel cell vehicles and modified internal combustion engine (ICE) vehicles), catalytic heaters, portable electrical generators, emergency electrical generators, and other hydrogen utilization systems. In some embodiments, the hydrogen utilization system is separate from the hydrogen recovery system, while in other embodiments, the hydrogen recovery system may contain a hydrogen utilization system, such as a fuel cell, to utilize some or all of the recovered hydrogen.

A fuel cell is a device that combines hydrogen and oxygen, for example from the air, to produce electric power without combustion. The fuel cell often contains a housing, controls, and a membrane-electrode-assembly including anode and cathode electrodes separated by a membrane. The membrane electrode assembly of one embodiment includes a thin flat laminate of a first layer serving as the anode, a second layer serving as the cathode, and a third layer of a plastic sheet serving as the membrane. A variety of hydrogen utilizing fuel cell designs are known in the art, including but not limited to the polymer electrolyte membrane (PEM) fuel cell, the phosphoric acid fuel cell, the molten carbonate fuel cell and the solid oxide fuel cell. Hydrogen may enter the fuel cell, enter the membrane-electrode-assembly, encounter an electric charge, exit the membrane into oxygen, react to form water and thereby generate useable energy. A stack of a plurality of fuel cells may also be used. Fuel cells may be obtained commercially from a number of sources. The fuel cell may power virtually any electronic device (e.g., a computer system, a cell phone, a hearing aid, etc.) or a home, business, etc.

Alternatively, the recovered hydrogen may be provided to fuel a hydrogen-powered vehicle. Hydrogen powered vehicles include among others fuel cell vehicles and modified ICE vehicles. Non-limiting examples of known hydrogen-powered vehicles include the Mazda HRX-2 and MX-5 and the BMW 750hL. Other hydrogen-powered vehicles are being developed or tested by most of the major automobile manufacturers, including General Motors, Daimler-Benz, Ford, Toyota and Honda. Conventional ICE vehicles may also be retrofitted to burn hydrogen instead of gasoline. This is described in U.S. patent application Ser. No. 10/178,974, entitled "Methods and Apparatus for Converting Internal Combustion Engine (ICE) Vehicles to Hydrogen Fuel," by Scott D. Redmond, filed Jun. 25, 2002, the entire text of which is incorporated herein by reference. See also, Quantum Impco-Gaseous Fuel Metering System, Quantum Technologies, Inc., Irvine Calif. Of course the vehicles do not have to be cars or trucks and may also be airplanes, satellites, or the like.

Potentially any catalytic hydrogen-powered heater may be used. Catalytic heaters may be obtained from commercial sources, such as Bruest Catalytic Heaters (Branford, Conn.). Catalytic heaters oxidize hydrogen without flame, emitting medium to long wave infrared energy. A platinum catalyst may force combustion below the gas ignition point and may generate surface temperatures up to 1000° F. The temperature may be proportional to the rate of reaction, which may in turn depend on the rate at which hydrogen is provided to the heater. In still other embodiments of the invention, hydrogen may be combusted to generate heat and/or electricity, using potentially any combustion system known in the art. Another example of a hydrogen utilization system is the Hydro-que® Hydrogen Gas Barbecue Grill. The grill operates like conventional grills except it burns hydrogen instead of propane. Of course there are numerous other hydrogen utilization systems. Accordingly, the hydrogen utilization system is to be interpreted broadly.

III. Systems that Heat Hydrogen Storing Materials to Recover Hydrogen

According to some embodiments of the invention, a hydrogen storage system may comprise a cassette and a hydrogen storing material contained within the cassette that may be heated in order to release hydrogen. In such embodiments of the invention, a hydrogen storing system may include an opening of the cassette to allow hydrogen to leave the cassette. The system may further include one or more hydrogen flow regulators, such as one or more valves, to start, stop, and/or regulate the flow of hydrogen into and/or out of the cassette through the opening. In one aspect, the one or more hydrogen flow regulators may allow hydrogen to flow into the cassette in one configuration, for example when an external pressure reaches a predetermined threshold over atmospheric pressure (e.g., 2 atmospheres), and flow out of the cassette in another configuration, for example when hydrogen is recovered from the material within the cassette. The system may further comprise a heating system to heat the hydrogen storing material and recovery hydrogen. Various types of heating systems including those based on inserted heating elements and electrical resistance heaters will be discussed in further detail below. The hydrogen storing system may further include a sensor to sense and report conditions within the cassette to an external control system. The sensor may include a temperature sensor, a pressure sensor, or a sensor to sense the amount of hydrogen in the cassette.

It will be appreciated that the cassette may have many of the features that are discussed elsewhere herein, such as a communication system, an information storage system, and the like. The cassette may comprise a rigid, impact resistant, chemical resistant, electrically and thermally insulating outer casing that may have a pivoted handle at one end for ease of handling. Any type of strong, impact, thermal and chemical resistant plastic may be used, such as polyethylene, PMMA, polycarbonate, PVP, PTFE, vinyl or acrylic. These plastics may be pre-thermoformed. Other casing materials of use include metals such as aluminum, copper, or stainless steel, ceramics, and/or a composite of a metal, a ceramic, and/or a plastic. The cassette may be designed to handle an internal pressure in the range of approximately 2-4 atmospheres or approximately 10 atmospheres, or perhaps slightly higher, in order to provide safety and meet requirements during distribution by a common carrier. The cassette housings may be fabricated by conventional approaches (e.g., molding, welding, etc.).

In addition to the above described rigid casing, which is typically on the exterior of the cassette, the cassette may additionally comprise one or more additional layers of different materials to enclose the hydrogen storing material and assist with such functions as providing thermal reflectivity, thermal insulation, puncture protection, and protecting the material from exposure to the environment. Exposure of sodium alanates to water, for example, could result in rapid release of hydrogen that may form an explosive mixture with air. Materials that may be used as additional layers include, but are not limited to, a flexible metallized fabric, Mylar™, plastic/foil, Kevlar™, SpectraFabric™ antiballistic woven mesh fabric or similar robust yet lightweight thin skin or sheath housing. Mylar™ is a trademarked polyester material available from DuPont. Kevlar is a trademarked aramid fiber available from DuPont. The use of flexible materials for the additional layers is preferred, as impact with a pointed object would be less likely to puncture a material that can deform. According to one embodiment of the invention, the cassette contains a series of layered materials, comprising an inner layer of flexible metallized plastic, a middle layer of Kevlar™, and an outer layer of Mylar™, surrounded by a small gas (air) space and the outer rigid cassette exterior. According to another embodiment of the invention, the cassette contains an innermost layer of flexible thermally reflective material, a puncture resistant (e.g., Kevlar™) layer outside this inner reflective layer, an insulation layer (e.g., Mylar™) outside the puncture resistant layer, and a gas space (e.g., air or foam) between the insulating layer and the rigid cassette exterior. In one instance, the cassette may be an A2 size cassette having one or more internal compartments that collectively hold approximately 1 liter of hydrogen storage material, of course this is not required.

The hinged handle may be used for inserting and removing the cassette from a hydrogen utilizing system. In some embodiments, the cassette may comprise a spring-loaded or other type of door that is pushed open when the cassette is inserted into the receptacle, allowing an inlet/outlet coupling to connect to a hydrogen valve on the cassette. In other embodiments, a seal such as a metallized paper or plastic covering may be sealed over an aperture in the cassette with adhesive. The user would peel off the seal before inserting the cassette into the receptacle of the hydrogen recovery system. Flanges on the cassette housing may be used to align the cassette with the receptacle and inlet/outlet coupling. In various embodiments, it is contemplated that any hydrogen valves would be located on the side of the cassette that is pushed into the receptacle and mating with the coupling would occur automatically when the cassette is firmly seated in the receptacle. In alternative embodiments of the invention, the hydrogen valve(s) may be located on the side of the cassette facing away from the receptacle and the user may manually attach one or more couplings to the valve(s). In some embodiments, the cassette contains a single opening through which flow is regulated by a bidirectional, one-way valve for hydrogen movement. When the cassette is inserted into a hydrogen utilizing system or a hydrogen charging system, the valve may mate with a coupling on the system.

There are a variety of hydrogen storing materials that may be heated to release hydrogen. Three exemplary hydrogen storing materials that are suitable for use with the present invention include among others metal hydrides, carbon nanostructures (e.g., nanotubes, fullerenes, etc.), and glass microspheres. Conventional forms of each of these hydrogen storage materials are known in the arts. Metal hydrides contain hydrogen that has been reacted with and chemically bound by metals. In simplified concept the metal hydride "soaks up" hydrogen into the metal alloy the way a sponge soaks up water, although the hydrogen is chemically bound and may be recovered by heating rather than by squeezing. Many metal hydrides contain hydrogen bonded thereto under high-pressure conditions that may be released by heating at lower pressure. Carbon nanotubes are tubes of carbon on the order of several nanometers in diameter that may adsorb and store hydrogen on their surfaces and within their tubular structure. Carbon nanotubes have a high hydrogen storage capacity per unit weight. Glass microspheres are hollow glass spheres can be used to store hydrogen. The microspheres may be heated to increase the permeability of their walls to hydrogen and filled or charged with hydrogen in a high pressure hydrogen environment. Thereafter the microspheres may be cooled to lock the hydrogen inside. Recovery of hydrogen from the microspheres may be achieved by a subsequent heating to again increase the permeability of the sphere walls to hydrogen and allow it to be recovered from the interior void.

In some embodiments of the invention, the hydrogen storing material may comprise sodium alanate (sodium aluminum hydride or $NaAlH_4$), or a doped sodium alanate. Hydrogen may be recovered from various doped sodium alanate materials by heating to temperatures not greater than about 150° C. Doped sodium alanates for hydrogen storage are disclosed in related copending U.S. Provisional Patent Application 60/395,013 filed on Jul. 10, 2002 by Craig M. Jensen and Scott D. Redmond and entitled "Improved Methods For Hydrogen Storage Using Doped Alanate Compositions", now U.S. Pat. No. 7,011,768, issued Mar. 14, 2006, which is hereby entirely incorporated by reference. As discussed therein, one suitable dopant is $\{n^5\text{-}C_5H_5\}_2TiH_2$. Hydrogen may be recovered from this material by heating to a temperature not greater than approximately 100° C. Many alternate dopants are also disclosed including related dopants wherein the cyclopentadienyl ring structure is modified or substituted, and those wherein the titanium is replaced by another catalyst such as zinc or another transition element. In an exemplary embodiment the ratios of NaH:aluminum:titanium are approximately 0.7:1.0:0.1 or else the molar ratio of NaH is in the range of approximately 0.1 to 0.88, the molar ratio of dopant is in the range of approximately 0.04 to 0.3, and approximately 3 moles of sodium are removed from the material for each approximately 1 mole of dopant added to the material. In alternate embodiments of the invention, the hydrogen storing material may comprise a solid alkali metal alanate as disclosed in U.S. Pat. No. 6,106,801 to Bogdanovic. Bogdanovic disclosed the use of $TiCl_3$, $TiCl_4$, HTiCl, titanium tetra-n-butylate $(Ti(OBu)_4$, $Cp_2ZrCl_2$, $ZrCl_4$, $Cp_2Zr_2$, $VCl_3$, $Cp_2VCl_2$, $VCl_3$, $Cp_2VCl_2$, $NbCl_3$, $YCl_3$, $LaCl_3$, $CeCl_3$, $PrCl_3$, $NdCl_3$, $SmCl_3$, $FeCl_2$. $NiCl_2$ and $LaNi_5$ as dopants of sodium alanate, potassium alanate and $Na_2LiAlH_6$, using about 2 mol % of dopant. Other metal hydride hydrogen storing materials that may be heated to recovery hydrogen include $MgH_2$, $Mg_2NiH_4$, $PdH_{0.6}$, $CaNi_5H_4$, $LaNi_5H_6$, and FeTiH. Hydrogen may be recovered from $MgH_2$ by heating to approximately 250-350° C. Hydrogen may be recovered from these materials at near atmospheric pressure by heating to a temperature in the range between about −10° C. to about 350° C. (the materials are listed in order of decreasing temperature from left to right). As an example, the hydrogen recovery temperature for $Mg_2NiH_4$ is in the range of approximately 250-300° C. The addition of nickel in the material $Mg_2NiH_4$ lowers the temperature slightly. The recovery material for $PdH_{0.6}$ is still lower, around 100-300° C. depending on the pressure, about 150° C. at atmospheric pressure. In still other embodiments of the invention, the hydrogen storing material may include other rare earth hydrides, or many other materials that are known. In any event, the hydrogen storage material may be inserted into the cassette, charged with hydrogen under pressure, and the cassette may be sealed for distribution and subsequent hydrogen recovery.

Hydrogen may be released from the hydrogen storing material by heating. In the case of the particular doped sodium alanate, the heating may be to relatively low temperature that is not more than approximately 100° C., although in certain embodiments hydrogen release at lower temperatures may be sufficient to satisfy power requirements. Different temperatures may apply for other materials and may easily be determined without undue experimentation. In some embodiments, the system in which the cassette is employed for hydrogen recovery may include an accessory bottle of hydrogen to fuel the system and initiate power generation, for example from a fuel cell. A backup hydrogen storage tank or a buffer tank may also be included to provide a hydrogen supply to the fuel cell while the cassette contents are being heated. The electrical power produced may then be used with an electrical heating system or element, such as a resistive electrical heater, to raise the internal cassette temperature to the operating temperature. In other embodiments, hydrogen from an accessory bottle or from the cassette may directly power a catalytic heater. Alternatively, the hydrogen recovery or utilization system may comprise an accessory battery or other power source to provide for initial heating of the cassette. Once hydrogen release has been initiated, the power generated by the hydrogen utilizing system may be used for further heating of the cassette. In some embodiments of the invention a heating system or element may be incorporated into the cassette itself. In alternative embodiments the heating system or element may be built into the hydrogen recovery system. For example, a retractable heating element may be inserted into the cassette as or after it has been placed in a cassette receptacle of a hydrogen recovery system. Any source of heat and any apparatus for heating known in the art may be used to raise the temperature of the hydrogen storing material, including without limitation heat generated by a fuel cell, such as a PEM fuel cell.

Figure 4B:
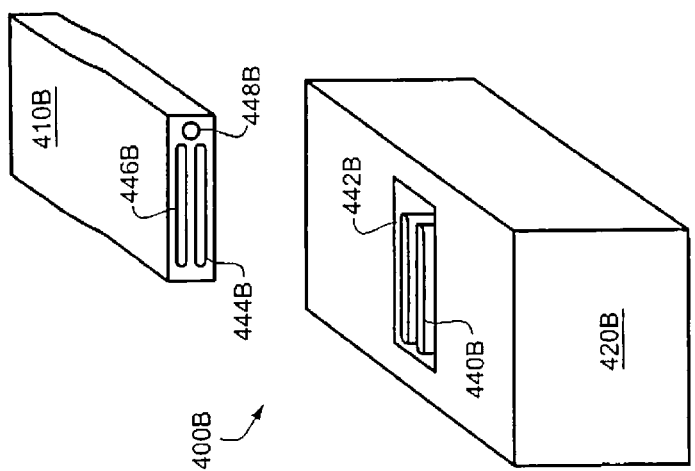
FIG. 4B shows a hydrogen storage and recovery system containing a heating system, according to embodiments of the invention, wherein thermal vane heating elements of the hydrogen recovery system may be inserted into spaces within the cassette to heat a hydrogen storing material within the cassette and recover hydrogen.
Figure 4A:
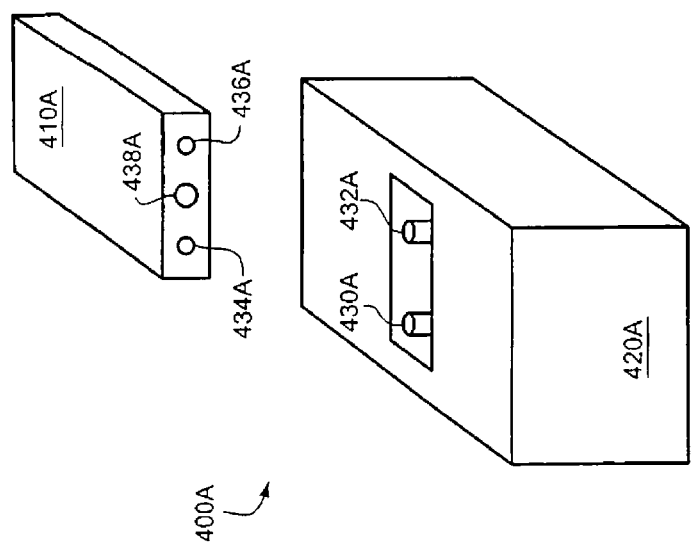
FIG. 4A shows a hydrogen storage and recovery system containing a heating system, according to embodiments of the invention, wherein thermal prongs of the hydrogen recovery system may be inserted into corresponding voids of the cassette to heat a hydrogen storing material within the cassette and recover hydrogen.

FIGS. 4A-B show hydrogen storing and recovery systems 400A-B containing heating systems according to two embodiments of the invention for heating a hydrogen storing material within cassettes 410A-B to recover hydrogen wherein heating elements that are part of the hydrogen recovery system are inserted into spaces within the cassette module. In particular, FIG. 4A shows an embodiment where heating elements in the form of thermal prongs 430A, 432A of a hydrogen recovery system 420A are inserted into corresponding holes 434A, 436A in the base of a cassette 410A. Hydrogen is recovered through a valve 438A. FIG. 4B shows an embodiment where heating elements in the form of thermal vanes 440B, 442B of a hydrogen recovery system 420B are inserted into corresponding slots 444B, 446B in a cassette 410B. Hydrogen is recovered through a valve 448B. The prongs or vanes often extend through most of the length of the cassettes, for example between about 50-100% the length of the cassette, in order to obtain good distribution of heat to hydrogen storing material at the back of the cassette. In either embodiment, heat may be generated by any method known in the art, such as electrical resistive heaters that are contained within or that are thermally coupled with the respective prongs or vanes. The heat may also be generated by catalytic oxidation of hydrogen, or otherwise, and conveyed to the thermal elements. In certain embodiments, heat generated by a PEM or other fuel cell may be used to heat the contents of the cassette. In embodiments wherein heat is received from an inserted thermal element, thermal insulation would often not be disposed between the inserted heating element and the hydrogen storing material. Similarly, often there will be minimal or no gas or air space between the heating element and the hydrogen storing material in order to allow good conduction. The heat provided by the heating elements may increase the temperature of the hydrogen storing material, causing release and recovery of hydrogen from the material, and causing the hydrogen to exit the cassettes through the openings and valves. The flow through the openings may be regulated by hydrogen flow regulators, such as valves, as will be discussed in further detail below. In an alternate embodiment of the invention, thermal prongs, thermal vanes, or other heating elements may be formed within the cassette and may receive heat or electrical current sufficient to cause resistive heating within the elements from an external source.

Figure 4D:
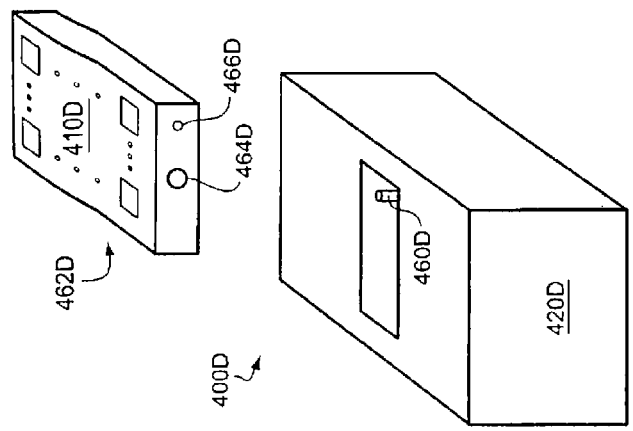
FIG. 4D shows a hydrogen storage and recovery system containing a heating system, according to embodiments of the invention, wherein the cassette contains a plurality of resistive heaters as heating elements in order to heat a hydrogen storing material within the cassette and recover hydrogen through an opening regulated by a valve.
Figure 4C:
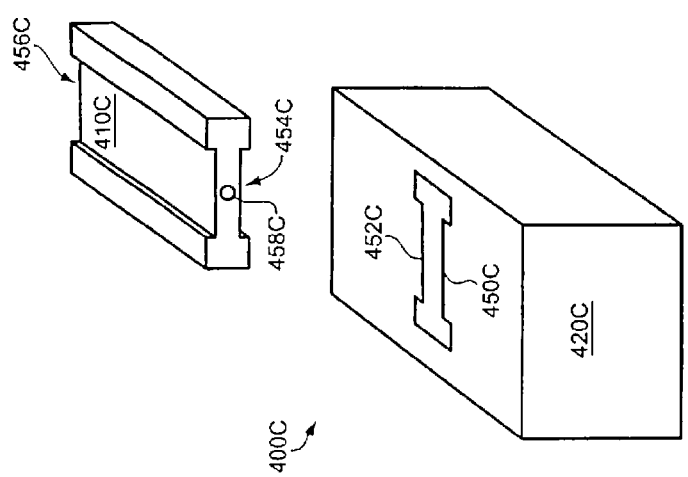
FIG. 4C shows a hydrogen storage and recovery system containing a heating system, according to embodiments of the invention, wherein a portion of the exterior of the cassette is sufficiently conductive to allow influx of an externally supplied heat to heat a hydrogen storing material within the cassette and recover hydrogen.

FIG. 4C shows a heating system for heating a cassette 410C in a hydrogen recovery system 420C wherein a portion of the exterior of the cassette is sufficiently conductive to allow influx of an externally supplied heat, according to embodiments of the invention. The particular cassette illustrated has thermal conduction recesses 454C, 456C or grooves that run along its top and bottom surfaces. The recesses may directly couple with and contact mating thermal ridges or ribs 450C, 452C that protrude from the hydrogen recovery system and that are connected with the thermal system to provide heat to the cassette through the recesses. Hydrogen recovered by the heating may exit though an opening regulated by a valve 458C. In contrast to the rest of the cassette outer covering, the thermal conduction recesses may contain thermally conductive materials in order to facilitate heat transfer from the thermal ribs to the hydrogen storing material within the cassette. The portions of the cassette housing making up the surfaces of the recess would often not contain an insulating material or layer. In some embodiments, the cassette may contain internal heat transfer elements, such as vanes, tubes, or fins, which may thermally couple with the thermal conduction recesses and help to conduct and distribute heat to the material within the cassette. In some embodiments of the invention, removable protective covers, potentially containing an insulating material, may be inserted into the thermal conduction recesses, for example by sliding into grooves or other couplings on the sidewalls of the recesses, in order to protect the hydrogen storing material and potentially reduce thermal influx during shipping, and at other times when the cassette is not inserted into the hydrogen recovery system for hydrogen recovery. Of course, the thermal conduction recesses are not required, and in an alternate embodiment of the invention a non-recessed portion of the housing of a cassette may contain a conductive material and lack thermal insulation to allow influx of exterior applied heat. Hydrogen that is thermally recovered from the cassette may exit through an opening, often under the regulation of a valve.

FIG. 4D shows a heating system for heating a cassette 410D in a hydrogen recovery system 420D containing a plurality of resistive heaters 462D (any desired number) as heating elements in order to recovery hydrogen through an opening regulated by a valve 464D, according to embodiments of the invention. The resistive heaters may be incorporated into the cassette housing or contained within the cassette interior, for example distributed around the cassette interior to distribute heat efficiently to hydrogen storing material formed around the resistive heaters. Examples of resistive heaters that are suitable for various embodiments include but are not limited to Thermofoil™ combined resistance heaters and sensors available from Minco Products, Inc. of Minneapolis, Minn., HY-7110 and HY-7115 heaters available from Hytek Microsystems of Carson City, Nev., and miniature resistance heaters available from Vishay Intertechnology, Inc. of Malvern, Pa. The cassette contains an electrical outlet 466D or other receptacle or contact for a plug 460D of the recovery system to receive electrical current to cause heating within the resistive heaters. The resistance heaters may receive electrical current, often direct current, from an external power source. The external power source may be within the hydrogen recovery system (e.g., a trickle charge battery or an internal fuel cell), may be within a hydrogen utilization system (e.g., a fuel cell or a battery of a vehicle), or may be from another source (e.g., a power outlet). In yet another embodiment, thermal tubes, panels, vanes or rods may be built into the cassette so that if power or heat is passed to them from an external source they may heat the cassette contents.

The Thermofoil™ combined resistance heaters and sensors combine an etched foil heating element with a RTD resistance temperature detector or NTC (negative temperature coefficient) thermistor sensor in a single package. The Thermofoil™ heaters allow heating upto 150° C., come in various sizes ranging between about 1×2 inches and about 5×5 inches, with different material options (e.g., Kaptan polyimide, silicone rubber, etc.), are flexible, and contain contacts to be electrically connected with the electrical outlet. Minco also offers a CT325 DC temperature controller, which is relatively small at only 1.0×1.0×1.5 inches, which may be included within a cassette or a hydrogen recovery unit, as desired. Minco also offers a number of other heaters, such as Thermal-Clear™ and Wire-Wound Rubber Heaters that may potentially be suitable.

The HY-7110 and HY-7115 heaters available from Hytek are also suitable. The HY-7110 is a miniature proportionally controlled DC heater with an integral thermistor and temperature control circuit. The heater may operate from an 8-35 volt power supply. In an instance where a 28 volt power supply is used the heater may supply up to 28 Watts of power. The temperature of the heater may be programmed and thereafter controlled with a single external resistor. Accurate control may be achieved in the range of approximately 50-100° C. Operation at higher temperatures is also possible, although control may not be as accurate in these higher ranges. The HY-7115 heater is a similar resistance heater that operates at a lower supply voltage in the range of approximately 3-8 volts. In an instance where an 8 volt supply power is used the heater may supply up to 14 Watts of power.

Other exemplary heaters are available from Vishay Intertechnology, Inc. of Malvern, Pa. (formerly JP Technologies, Inc. of Raleigh, N.C.). Miniature resistance heaters and resistance temperature detectors (RTDs) are fabricated from thin metallic foils and laminated to thin heat-resistant plastic substrates. The heaters and RTDs may be separate or may be combined as one heating and temperature measurement unit. The thin, metal foil sensors are designed for rapid response temperature measurements. The foils used are typically >0.0002" (0.005 mm) thick and have extremely low thermal inertia. In comparison with standard wire wound RTD's, foil RTD's provide maximum surface exposure and make more intimate contact with surfaces. Metal foil may comprise nickel, platinum and/or Balco, with backings and/or encapsulants of Kapton®, glass/epoxy or Mylar™. These devices are capable of being bonded onto a variety of intricate shapes, such as the inside or outside surface of cassettes. The heaters and sensors may operate up to approximately 370° C. The heaters and sensors are offered in various standard configurations or may be custom designed for a variety of applications.

Figure 5:
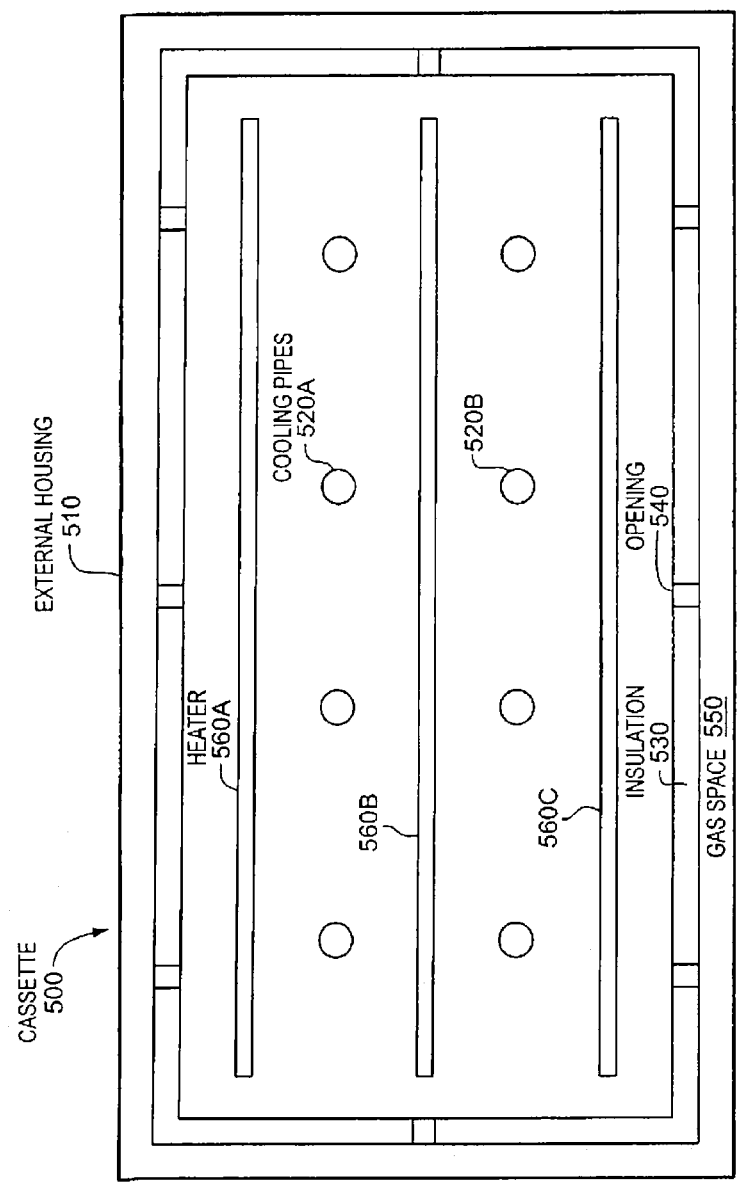
FIG. 5 shows a cross sectional view of a cassette containing a stack of alternating internal heating devices and cooling devices embedded within a hydrogen storing material and having a hydrogen distribution manifold, according to embodiments of the invention.

FIG. 5 shows a cross sectional view of a cassette 500 containing a stack of alternating internal heating devices and cooling devices embedded within a hydrogen storing material, such as a doped sodium alanate powder, and having a hydrogen distribution manifold, according to embodiments of the invention. The particular stack shown contains a plurality of electrical resistance heaters 560A-C that are stacked over one another and have layers of cooling pipes 520A-B to convey cooling water or another coolant as well as hydrogen storing material disposed therebetween. Electrical current from an external source may be provided to the resistance heaters to heat the hydrogen storing material and cooling water or another liquid, gaseous, or aerosol coolant may be provided through the pipes to cool the material. The pipes will often be metal pipes, for example copper or aluminum pipes of a sufficient diameter to achieve the desired cooling, although this is not required. Of course the pipes are not required and another channel for a coolant may also be used. Often, the material will be heated and/or cooled based on temperature measurements sensed within the container. As previously discussed, temperature sensors may be contained within the electrical resistance heaters. Temperature and other sensors may also be built into the cassette housing. In various embodiments of the invention, the coolant may be provided through the pipes in normal operation to offset some of the heating, or in extreme temperature conditions to remove unwanted heat from the material.

The cassette also contains a gas manifold that helps distribute or direct hydrogen gas to or from material located at different positions within the cassette. According to one embodiment of the invention, the manifold comprises a gas space 550 and a flow distributor to the hydrogen storing material. The gas space may be a void that may be filled with hydrogen gas, a porous material (e.g., fabric, fibers, or packing) that is sufficiently porous to contain a hydrogen gas and allow the gas to flow therethrough. The flow distributor of one embodiment of the invention comprises a plurality of openings 540, such as perforations or slits, in a insulating layer 530, or other layer, disposed between the gas space and the hydrogen storing material. The flow distributor of another embodiment of the invention comprises a porous or permeable layer through which hydrogen gas may pass between the gas space and the hydrogen storing material. In one aspect, hydrogen may be released at different locations within the cassette by heating the hydrogen storing material with the heating devices and the released gas may pass through the vent and into the gas space for efficient collection and removal from the cassette. In another aspect, during charging a cassette with hydrogen, hydrogen may be added to the gas space and may be efficiently distributed from the gas space to the hydrogen storing material through a plurality of distributed openings or perforations of the vent.

Of course other heating and cooling systems may also be used. In one alternate embodiment of the invention, the cassette may contain a Peltier thermoelectric element to alternatively heat or cool a material by reversing the current, although these elements may have less heating and cooling efficiency and may operate over a limited temperature range. In another alternate embodiment, the cassette may contain a heat pipe to heat the material. The heat pipe may contain an evaporated material that may condense and thereby release heat into the material.

An information processing and control system may be used to control or regulate hydrogen generation. For example, the control system may monitor the hydrogen utilizing system to constantly determine the hydrogen needs of the system. The cassette may contain sensors to sense and report conditions inside the cassette to an external information processing and control system. The sensor may sense the temperature of the cassette contents, the hydrogen gas pressure inside the cassette, the amount of hydrogen remaining in the cassette, or other conditions. The sensor may be part of the control system that monitors the hydrogen needs of a hydrogen utilizing system and adjusts the conditions within the cassette. For example, in one embodiment, the control system may increase the amount of heat supplied to the cassette in order to achieve an elevated temperature in the cassette and an increased release of hydrogen gas. Depletion of hydrogen fuel from a cassette may result in a signal to an operator to replace or recharge the cassette, or may alternatively result in a signal to an external ordering and delivery system to send a replacement cassette. In an embodiment where the hydrogen recovery system has access to a multiple cassette device, the depletion may cause the system to automatically switch or replace a depleted cassette with a charged one.

In certain embodiments of the invention, the cassette may comprise one or more hydrogen gas flow regulators. A valve is one example of a hydrogen gas flow regulator. A valve is a mechanical device that may allow starting, stopping, and/or regulating the flow of hydrogen into and/or out of the cassette. The valve often contains a moveable part that may be in an open, closed, or partially closed position relative to a passageway for flow. During distribution and at other times when hydrogen is not being recovered from the cassette the valve would normally be in the closed position, preventing entrance or exit of any material. In one embodiment, when the valve is open it only allows passage of hydrogen gas. The valve may open, for example, in response to the generation of about 1 atmosphere of hydrogen gas pressure, or slightly more, inside the cassette. Alternatively, the valve may open, for example, in response to the application of two or more atmospheres of hydrogen gas pressure outside the cassette. Those pressures are not limiting and other pressure set points may be used. Thus, in some embodiments the valve is a two-way valve that will allow hydrogen to leave or enter the cassette. In alternative embodiments, the cassette may comprise two one-way valves, a first valve that opens only in response to hydrogen pressure inside the cassette and a second valve that opens only in response to elevated pressure from a hydrogen charging system outside the cassette. In some embodiments, the valve(s) will not allow passage of liquids, only of gas. It is contemplated within the scope of the invention that any known method of opening and closing the valve(s) may be utilized. Thus, valve opening could occur automatically in response to pressure gradients. Alternatively, electrically controlled valves, such as solenoid operated valves, could open and close in response to signals from an information processing and control system. In some embodiments of the invention, the valve is a switchable or configurable bi-directional one-way valve. When in one configuration, the valve only allows hydrogen to flow from the inside of the cassette to the outside, while in an alternative configuration the valve only allows hydrogen to flow from the outside of the cassette to the inside, as in hydrogen recharging of the cassette. In another configuration the valve may be closed and may not allow entry or exit of gas from the cassette. This configuration be automatically imposed by coupling the valve with an external seat or coupling of the hydrogen recovery system when the cassette is inserted into the system, or may be configured manually by an operator.

Figure 6:
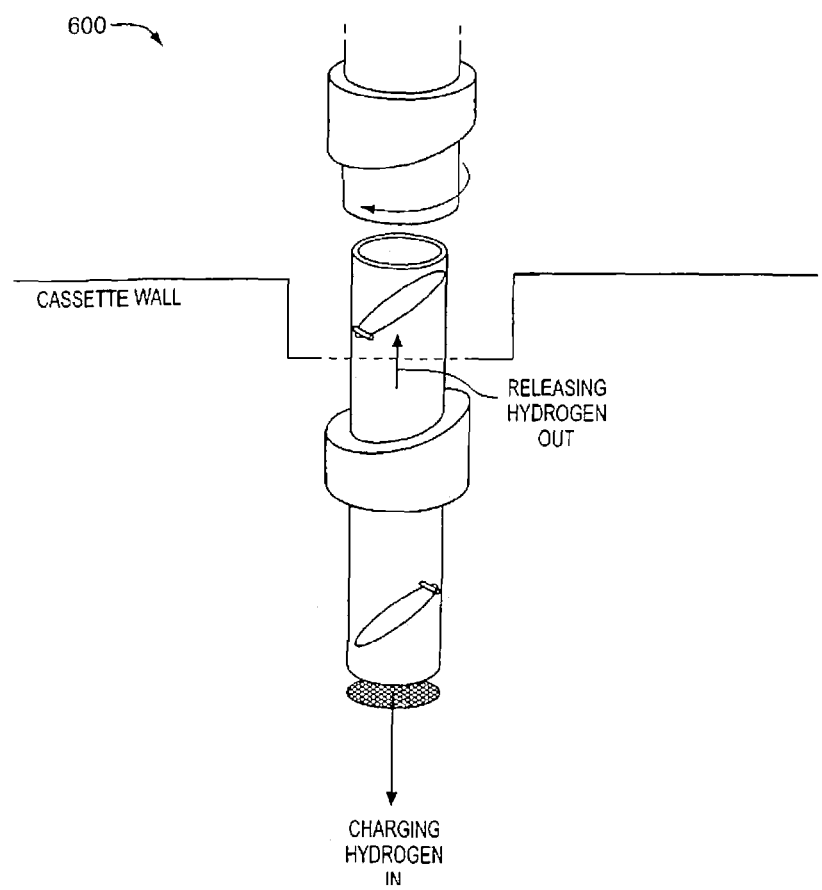
FIG. 6 shows an exemplary switchable or configurable bi-directional one-way hydrogen gas valve suitable for use in a cassette, according to embodiments of the invention.

FIG. 6 shows an exemplary switchable or configurable bi-directional one-way hydrogen gas valve suitable for use in a cassette, according to some embodiments of the invention. When the valve is switched or configured in one direction, it allows hydrogen gas to pass from the cassette module to a hydrogen utilizing system. When the valve is configured in the other direction, it allows the cassette to be charged with pressurized hydrogen gas from an external supply. In either switching mode, gas may flow in one direction only. The valve is designed to allow movement of gas, but to prevent the movement of water or other liquid contaminants. A variety of water impermeable gas valves are known in the art. For example, such a valve might comprise a selectively permeable membrane that allows passage of gas but not water, for example a GORE-TEX® (W.L. Gore and Associates, Inc., Newark, Del.) or other membrane. The valve direction may be determined by the different couplings, seatings, or connections to which it is attached during charging or hydrogen recovery. When the cassette is inserted into a hydrogen recovery system, the coupling may turn a collar that allows hydrogen gas to exit the cassette. When the cassette is attached to a hydrogen charging system, the coupling may switch the valve to the other direction, allowing hydrogen gas to enter the cassette and recharge the alanate composition. Various embodiments may utilize different mechanisms, such as a male to female or female to male connection or a locking collar that can slide up or down, depending on the coupling attachment. Alternatively, the locking collar may be fixed by a surface mount.

Exemplary valves suitable for use are known for controlling gas flow in the nuclear power industry. The gate type design uses spring loaded seal discs that seal tightly at all pressures from 0 psig to maximum rating. When open, the valve permits bi-directional flow with tight sealing in both flow directions. Because of the straight-through flow path with self-cleaning sealing surfaces, internal passages inherently resist any buildup of contamination. Features may include zero leakage to the environment; the absence of any packings, bellows, or diaphragms; a valve rating of ANSI class 150 to 2500; high cycle life with over 100,000 operations in most applications; straight-through flow; and resistance to contamination build-up. The valve body material may comprise stainless steel, carbon steel, AL6V or other ASME Materials. The seats may be carbon. In certain embodiments, position indication switches are available for remote status indication. The valve may comprise socket weld, butt weld or tube extension line connections. Opening and closing of the valve may be controlled by a solenoid operator, constructed of Class H or better materials. Solenoid and switch assemblies may be accessible for removal or maintenance without disturbing the pressure boundary.

Another exemplary valve that may be of use is the latex-free Carhill Valve System designed for use in artificial resuscitation (CORPAK, Wheeling, Ill.). A silicone duckbill valve allows the one-way passage of air. A 99% BFE bi-directional filter prevents cross-contamination of the cassette contents.

In another exemplary embodiment, Quick-Connecting Fluid Couplers provide connections in systems that involve the flow of air or gas (Nitto Kohki, Hanover Park, Ill.). A built in automatic open and shut valve provides high flow, easy flow control and an excellent seal. Available valves include Pneumatic HI-CUPLA, Plastic HI-CUPLA ACE, Semiconductor Semicon Cupla, Ultra Small Micro Coupler and Full Blow Cupla. The valve(s) of use in the embodiments are not limited to the examples disclosed herein but may include any valve known in the art that will allow passage of hydrogen gas without leakage of sodium alanate. Preferably, the valve(s) will also prevent atmospheric oxygen and/or external water from contaminating the cassette contents.

Figure 7:
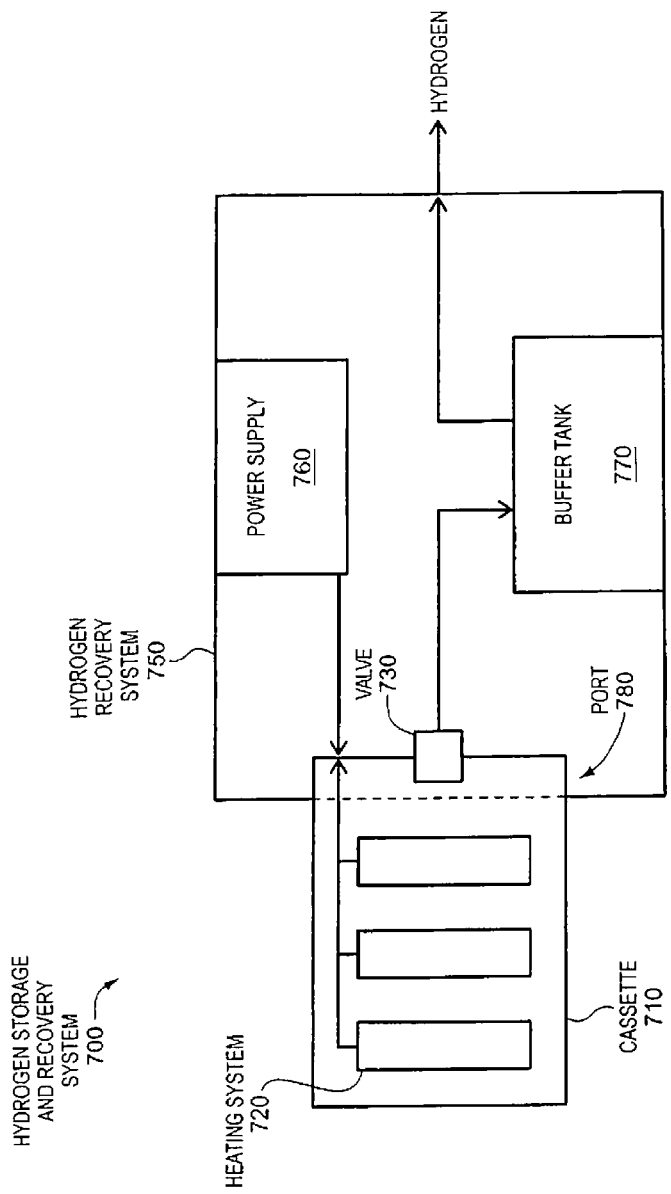
FIG. 7 shows a hydrogen storage and recovery system, according to embodiments of the invention.

FIG. 7 shows a hydrogen storage and recovery system 700, according to embodiments of the invention. The system contains a cassette 710 inserted into a hydrogen recovery system 750. The cassette contains a heating system 720 comprised of a plurality of electrical resistance heaters. The heaters are electrically coupled with a power supply 760 of the recovery system. The power supply may include a power supply that receives power from an outlet, generator, or other external source. Alternatively, the power supply may comprise a battery. Or else, the power supply may comprise an internal fuel cell and a trickle charge battery coupled with the fuel cell. The power supply provide electricity to the heaters to recovery hydrogen from the cassette through a valve 730. In one instance, hydrogen from the valve passes through a line, for example metal tubing or pipe, to a buffer tank 770. The hydrogen may be fed from the buffer tank to a hydrogen utilization system, under control, or as needed.

It is an aspect of some embodiments of the invention that cassettes are rechargeable and may be recharged in a hydrogen charging system that supplies hydrogen gas under pressure. In one embodiment the cassettes may be charged while attached to a hydrogen recovery system or hydrogen utilization system, such as a vehicle, fuel cell, electrical power unit, catalytic heater and/or hydrogen combustion system. The hydrogen charging system may contain a cooling system and a temperature control module to remove excess heat that is generated during the hydrogen charging process and cool the cassettes during recharging. Any form of heat transfer device known in the art may be used. Non-limiting examples include fluid or water-filled tubes, water jackets, cooling fins and other radiant devices, heat pumps, fans, etc. Alternatively, after being depleted of hydrogen the cassettes may be removed from the hydrogen recovery or utilizing system and replaced with charged cassettes, while the depleted cassettes may be returned and recharged in a separate hydrogen charging system. In such embodiments, hydrogen charging may occur at relatively slow rates and low temperatures, eliminating the need for a temperature control module, of course one may be used as desired. After charging the cassette, excess unabsorbed hydrogen may be removed from the cassette with a mild vacuum or by flushing with an inert gas, such as nitrogen or argon. In other embodiments, disposable cassettes may be designed for single-use applications, for example military field use. In such embodiments, it may be preferred to use materials that will degrade over time, such as biodegradable plastics or equivalent materials.

IV. Systems that Permeate Hydrogen Storing Materials to Recover Hydrogen

According to some embodiments of the invention hydrogen freed from a hydrogen storing material may be removed from a hydrogen permeable cassette or container by permeating the hydrogen through a hydrogen permeable material thereof. A hydrogen storing system according to embodiments of the present invention may comprise a hydrogen permeable container having a solid hydrogen storing material contained therein. The hydrogen permeable container, or at least some portion thereof, may contain a hydrogen permeable material having a sufficient permeability to hydrogen under charging and recovery conditions, for example at temperatures substantially higher than ambient, to respectively allow hydrogen to be added to, or removed from, the container. The hydrogen permeable container may be a glass cassette containing a glass material that is sufficiently permeable to hydrogen when heated. The glass may contain additives or dopants that increase the permeability of the glass to hydrogen. The solid hydrogen storing material in any of these containers may comprise a metal hydride, a carbon nanostructure, or hollow glass microspheres. Of course, hydrogen permeable materials other than glass may also be used including metals and polymers (e.g., those conventionally used in hydrogen separation membranes). The concepts of the present invention will be largely illustrated with glass hydrogen permeable materials, although it will be appreciated by a person having an ordinary level of skill in the art and the benefit of the present disclosure, that the glass may be replaced by other hydrogen permeable materials.

Figure 8A:
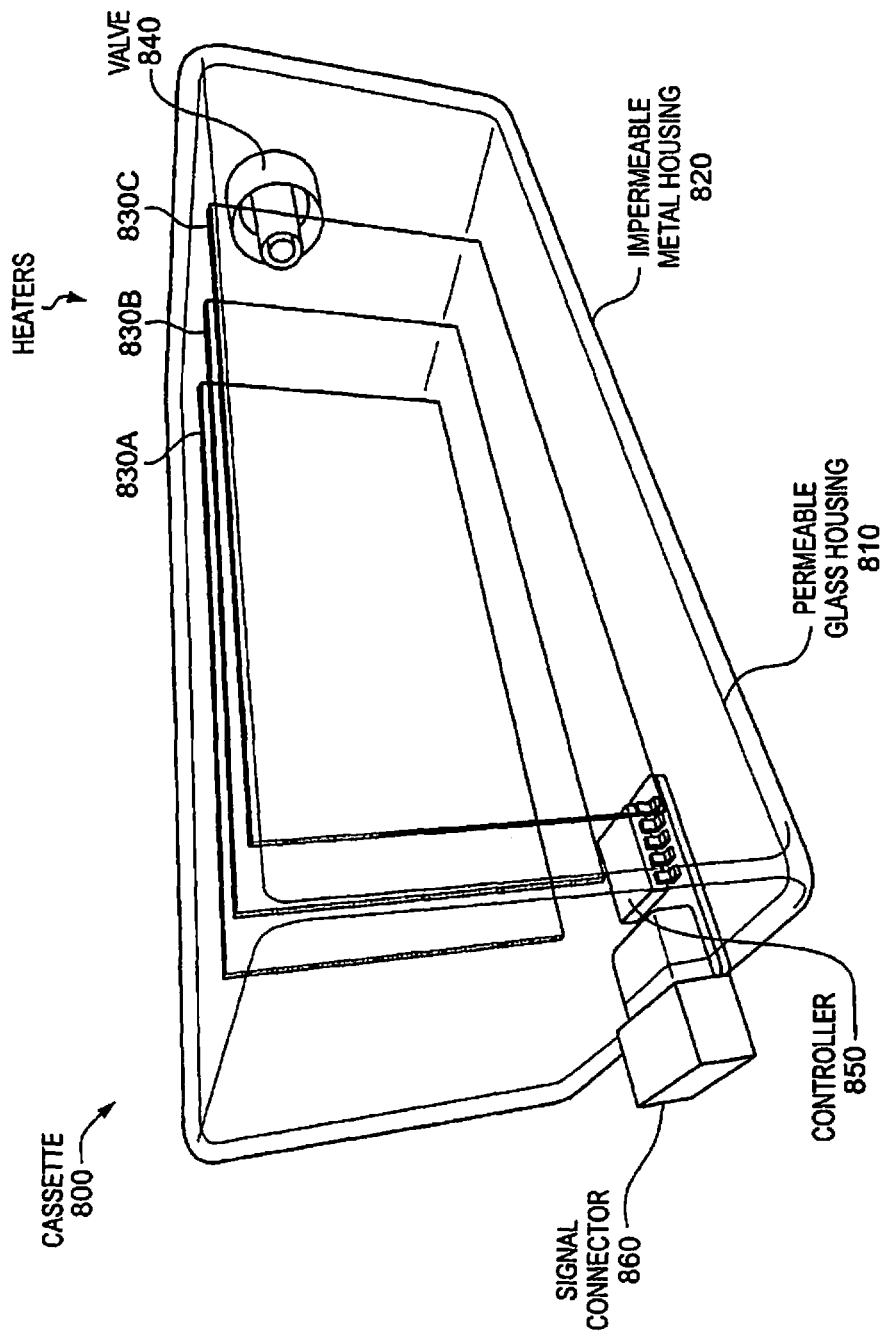
FIG. 8A shows a hydrogen permeable glass cassette, according to embodiments of the invention.

FIG. 8A shows a cassette 800 containing a hydrogen permeable glass cassette housing 810, according to embodiments of the invention. The cassette 800 contains a hydrogen storing material (not shown) contained within the glass cassette housing, electrical resistance heaters 830A-C to heat the hydrogen storing material in order to free hydrogen and allow it to permeate the glass housing, a controller 850 to control the heating, a signal connector 860 to connect the controller and the heaters to an external electrical system for receiving power and information, a hydrogen impermeable metal cassette housing 820 encasing the glass cassette housing in order to collect the permeated hydrogen, and a valve 840 of the impermeable housing for recovering hydrogen from the cassette 800.

The glass cassette housing 810, or at least a portion thereof, is sufficiently permeable to hydrogen to allow an effective amount of freed hydrogen gas within the cassette to pass through or permeate the glass when the hydrogen storage material within the glass is heated. As used herein, the term glass will be used to refer to a wide variety of silicate materials that have a primarily glassy and non-crystalline structure. Common types of glass that are contemplated to be useful include soda-lime glass, lead glass, borosilicate glass, aluminosilicate glass, fused silica glass, and glass-ceramics. Each of these types, except for fused silica glass which is quite pure, have numerous compositional variations known in the arts.

Soda-lime glass is among the more commonly used forms of glass and is relatively cost effective. It often contains in the range of approximately 60-75% silica, 12-18% soda, and 5-12% lime. The resistance to high temperatures and sudden changes of temperature are not as good as some other forms of glass and resistance to corrosive chemicals is only fair. Lead glass often has at least approximately 20% lead oxide and is relatively soft and has improved electrical insulating properties. Resistance to high temperatures and sudden temperature changes is not good. Borosilicate glass is a silicate glass containing at least about 5% boric oxide. Borosilicate glass is often somewhat more costly than either lime or lead glass, but offers better resistance to temperature change and chemical corrosion. As an example, bake ware and laboratory ware are often made of borosilicate glass. Aluminosilicate glass contains aluminum oxide and behaves similarly to borosilicate glass in its resistance to temperature and corrosion. Both borosilicate and aluminosilicate glass may be more difficult to fabricate and more costly than either lime or lead glass. Ninety-six percent silica glass is a borosilicate glass that has been processed to remove most non-silicate elements by reheating to approximately 1200° C. and consolidating the resulting pores. The processing makes the glass more resistant to heat shock. Fused silica glass is substantially pure silicon dioxide in the non-crystalline state. This form is comparatively expensive and difficult to fabricate although it offers good temperature and corrosion resistance. Another suitable form of glass is glass-ceramics. Glass ceramics start as glass and are converted to crystalline ceramics. So rather than being completely amorphous the glass may have a crystalline component. Often, glass ceramics are several times stronger and harder than glass, are relatively free of the pores that are often found in ceramic materials, have good corrosion resistance, have good thermal resistance and resistance to heat shock, and may be tailored for a desired thermal expansion coefficient. The glass-ceramics may be formed using conventional glass forming techniques such as molding, blowing, pressing, drawing, centrifugal casting, etc. Any of these glasses are suitable depending upon the performance and cost expectations of the particular implementation.

As used herein, the term permeate and the like will be used to refer to hydrogen diffusing through or penetrating the walls of the glass cassette. Permeability across thin walls, sometimes referred to as membranes, is a well-known phenomenon. The permeability of hydrogen through a glass wall may depend upon the solubility or partitioning of hydrogen to the glass (e.g., the initial chemisorption) and the rate of diffusion of hydrogen through the glass. In essence, the glass contains pores or interstice between the silicate and other molecules that make up the glass. Hydrogen, which is a relatively small molecule, may diffuse through the interstice even at ambient temperatures. The rate of diffusion of hydrogen through ordinary glass at ambient temperatures is quite low but may be sufficient depending upon the needed recovery rate of the hydrogen, the thickness of the glass housing, and the surface area of the glass housing that allows permeation. For example, for a low powered electrical device (e.g., a cell phone), the amount of hydrogen permeated by the glass walls at near ambient temperature may be sufficient.

Often, in order to achieve higher rates of diffusion and permeation, the present inventors contemplate heating the glass cassette housing to a temperature that is sufficient to provide a desired permeability to hydrogen. As is well known, the rate of diffusion of hydrogen through the glass housing increases with increasing temperature. The heating effectively increases the size of the interstice, due to increased molecular motion that makes them seem bigger to hydrogen molecules, and also increases the diffusion constant of hydrogen. The amount of diffusion increases as the area for diffusion increases (i.e., the size of the glass cassette housing increases) and as the thickness of the housing wall decreases (i.e., a smaller distance for diffusion). As is well known, the permeability also increases with increasing differential hydrogen pressure across the glass housing. The thickness of the glass housing, the area for diffusion of hydrogen, the temperature of the glass housing, the pressure of hydrogen within the cassette, and the permeability of the glass material may be designed to achieve a desired permeation rate of hydrogen for use in a fuel cell or other hydrogen utilization system. One exemplary glass cassette having approximate dimensions of 1"×2"×¾" (or sized to give a variation in the volume that is in the range of approximately 50%-200%) may have a housing formed of a conventional glass and a wall thickness in the range of approximately ⅟₁₆"-¼" or approximately ⅛", the cassette including a metal hydride hydrogen storing material contained therein may be heated to a temperature in the range of approximately 100° C.-300° C. in order to thermally recover hydrogen and allow it to begin to diffuse across the glass membrane. The hydrogen recovered from the cassette, for example, may be used to power a fuel cell and the permeation rate may be sufficient to supply the needed operating power for example for a laptop computer. It will often be desirable to use relatively low recovery temperatures, and the inventors contemplate using glass materials, wall thickness, and surface area that would allow recovery of sufficient quantities of hydrogen at temperatures not greater than approximately 250° C., or not greater than approximately 200° C.

As discussed, the use of thin walls may be desired for the glass cassette housing since they provide a decreased diffusion distance and hence an increased permeability to hydrogen. In order to allow the use of thin walls and at the same time maintain a sufficient mechanical strength, the present inventors contemplate incorporating reinforcing structures into the glass cassette. Exemplary reinforcing structures include but are not limited to reinforcing ribs, composite fibers (e.g., glass or graphite fibers), a reinforcing cage (e.g., a metal cage or wire mesh), and the like. One exemplary glass cassette contains reinforcing ribs made of glass that is thicker than the rest of the glass housing. As an example, when the non-ribbed portions of the cassette have a thickness in the range of approximately $1/16"$-$1/8"$ the ribs may have a thickness that is greater than approximately $1/8"$, or greater than approximately $1/4"$ (one-quarter inch). The glass ribs may be molded with the glass cassette housing or applied later with an adhesive or by glass welding. Of course, the ribs may be of a material other than glass, such as a plastic, a metal, or a ceramic. Desirably, the material will have a sufficiently similar coefficient of thermal expansion to avoid mechanical stresses during heating and cooling. Another exemplary cassette contains a reinforcing cage that supports the glass cassette housing. For example, the cage may be molded within the glass cassette housing during a molding operation by placing the cage in the mold and flowing the molten glass around the cage and solidifying it there so that the cage is integral within the glass cassette housing in order to provide a mechanical support structure to the glass cassette. At least conceptually, the cage may be similar to the rebar used to strengthen concrete. As another example, the cage may be applied externally to the glass cassette housing in order to provide an external support structure. As yet another example, reinforcing graphite, metal or other fibers may be added to the molten glass and solidified therein to provide enhanced mechanical strength. Of course numerous other reinforcing structures known in the arts may potentially be used.

The glass cassette 810 may be fabricated by conventional glass and ceramic making techniques including but not limited to molding, blowing, pressing, drawing, centrifugal casting, and machining. One approach for forming the glass cassette is molding. During the molding process a molten glass material may be flowed into a mold that defines the glass cassette housing and internal chamber. The molten glass material may be formed by heating glass-precursor materials, such as sand or other forms of silica, to a temperature sufficient to completely melt the precursor materials. If dopants are desired to modify the hydrogen permeability characteristics the dopants may be introduced into the molten glass prior to flowing it in the mold. Depending upon the rate of cooling of the glass material, if the glass is not cooled too quickly, the dopants may partially settle due to gravity within the mold effectively creating a concentration difference within the glass material and making some portions of the cassette more permeable to hydrogen than others. Of course this is not required and mixing or sufficiently rapid solidification may be employed in order to keep the molten glass homogeneous. As discussed previously, the mold may contain form that defines reinforcing ribs on the glass cassette housing. The molten material in the mold may be cooled sufficiently rapidly that solidifies as a primarily amorphous solid without substantial crystallization. Once the molten glass has sufficiently cooled and solidified it may be removed from the mold. The molded cassette may include the cassette housing around an internal void, defined by the mold, where the hydrogen storage material is to be contained, and an opening, also defined by the mold, to allow material to be introduced into the cassette. Of course it will be appreciated by a person having an ordinary level of skill in the art and the benefit of the present invention that other approaches may be used for forming a glass cassette of such structure. As one example, the structure may be machined from a block of glass. As another example, after molding, the molded cassette may be machined in order to reduce the thickness of one or more walls in order to increase the permeation rate. Polishing and other high precision machining approaches commonly used in the arts may be used.

It is contemplated that various additives or dopants may be added to the glass in order to modify, typically increase, the permeability of the glass to hydrogen. This is not required but may be favored in order to achieve a sufficient permeability of hydrogen at a given lower temperature. Specific dopants that are contemplated by the present inventors include boron, boron oxide, aluminum, sodium, magnesium, alkali oxides, and other components. Without wishing to be bound by theory, it may be that any metal that is able to form a metal hydride with hydrogen may potentially be used because they may increase the solubility or partitioning of the hydrogen into the glass and thereby increase the rate of permeation.

Of course other additives known in the arts to increase the size of the interstice, to increase the solubility of hydrogen in the glass, or to otherwise increase the permeability of hydrogen through glass may potentially be used. U.S. Pat. No. 6,231,642 to Shelby et al. discloses dopants for hollow glass microspheres for storage of hydrogen that reportedly increase the permeation of hydrogen across the glass membrane walls. The disclosed dopants include metal oxide dopants formed with at least one metal selected from the group consisting of transition metals and rare earth metals. One glass mentioned contains about 0.1-10 wt % transition metal oxide dopant. Exemplary metal oxide dopants include among others $Fe_3O_4$ and CuO. Two glasses mentioned are borosilicate glass doped with 0.5 wt % and 2 wt % $Fe_3O_4$. Another glass mentioned is a borosilicate glass containing by weight percent about 30-96 $SiO_2$, about 1-25 $B_2O_3$, about 0.5-20 $Al_2O_3$, about 0-20 $Na_2O$, about 0-20 $K_2O$, about 0-15 CaO, and incidental impurities. Any of these doped glasses may potentially be used as a hydrogen permeable material in the cassettes described herein. As desired, the microspheres could be irradiated with infrared radiation as disclosed in order to further increase the permeability of hydrogen, although this is not required.

Also, well know permeability experiments may be used to screen a variety of other additives and dopants in order to determine those that effectively increase permeability to hydrogen without undue experimentation. In short, the glasses containing the additives or dopants may be formed and the rate of permeation of hydrogen across the glass may be measured at a fixed glass temperature (e.g., 200° C.) and fixed pressure differential across the glass (e.g., two atmospheres on one side of the glass and one atmosphere on the other side). Computer simulations or structure-activity relationships may also be used to screen potential additives for their affect on hydrogen permeability. As another option, well known chemisorption experiments may be used to screen a wide variety of additives or dopants without undue experimentation in order to determine those that increase the chemisorption of hydrogen to the glass. Additives that may be acquired and added to the glass at low cost may tend to be favored over those that are more costly and difficult to introduce.

According to some embodiments of the invention, a subset of the cassette, for example a side or a portion of a side, may be more permeable to hydrogen than other portions of the cassette in order to achieve greater rates of permeation of hydrogen through this subset of the cassette. As an example, one side of the cassette may contain hydrogen permeable material (e.g., a glass) and the rest of the cassette may contain a metal, ceramic, or plastic material that is practically or at least comparatively impermeable to hydrogen. The hydrogen permeable side may be attached to the remainder of the cassette housing with an adhesive or with glass welding. Alternatively, rather than the whole side being permeable to hydrogen, the side may contain a portion that is permeable to hydrogen. As one example, a small hydrogen permeable glass window may be inserted into an opening of the cassette and affixed with an adhesive.

As another option, a side or subset of a side of the cassette may have more of a dopant or other additive that increases the rate of permeation of hydrogen. The dopants or additives may be added selectively to the side or subset. In the case of a molding operation to form the cassette, the dopant may be added to the liquid glass material and allowed to settle to a sufficient extent due to gravity before the glass material solidifies due to cooling. In this way, the bottom of the cassette may contain relatively more of the additive or dopant, for example magnesium or magnesium hydride powder, than the top portions of the cassette. In this way, the base of the cassette may be relatively more permeable to hydrogen due to the higher concentration of dopant. Alternatively, rather than using a different additive content, the thickness of the side or subset of the side may be reduced in order to decrease the distance hydrogen needs to diffuse to permeate out of the cassette. As an example, a portion of a side may be polished or ground until a predetermined thickness is achieved. It is also contemplated that the portions or side may be partially or controllably damaged or compromised, in order to increase their permeability to hydrogen, for example by chemical etching, ion bombardment, etc.

Figure 8B:
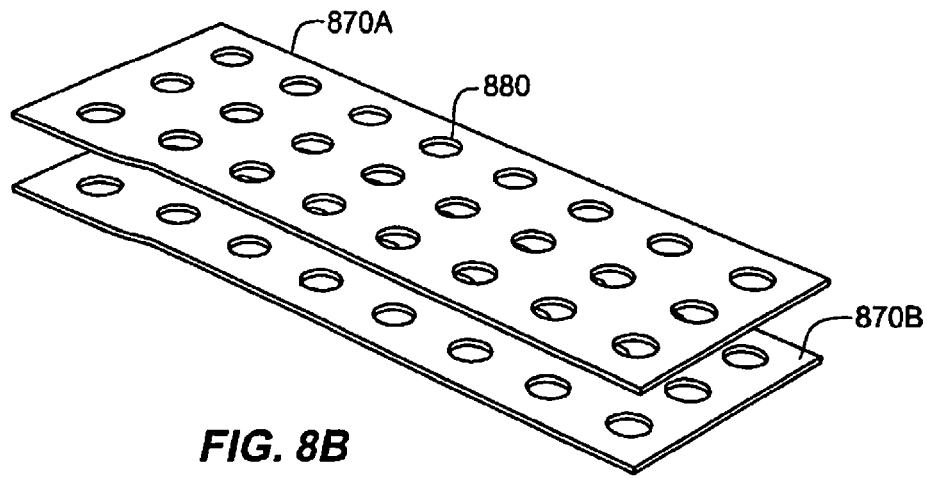
FIG. 8B shows a heating system comprising two parallel horizontal electrical resistance plate heaters with hydrogen flow openings, according to embodiments of the invention.

The glass cassette contains the heaters 830A-C to heat the hydrogen storage material in order to free hydrogen and to heat the glass cassette housing. The particular heaters shown are three parallel vertical electrical resistance heaters. These heaters may be added to the cassette through the opening and appropriately connected. After adding and connecting the heaters, the hydrogen storage material may be added to the cassette so that it is distributed around and dispersed between the heaters. Of course numerous other heating systems are contemplated. As another example, FIG. 8B shows a heating system comprising two parallel horizontal electrical resistance plate heaters with hydrogen flow openings that may be used to heat hydrogen storing material, according to an embodiment of the present invention. The heaters contain hydrogen flow openings, such as holes or slits, which may help to avoid obstructing hydrogen flow during charging and recovery. Alternatively, as another option, any of the electrically resistive heaters discussed elsewhere herein may be used. In the illustrated cassette the heaters within the hydrogen storing material are also used to heat the glass cassette housing walls in order to increase their permeability. Of course, in alternate embodiments of the invention, heaters may be incorporated alongside or within the glass cassette housing walls in order to provide more direct heating of the glass material.

The glass cassette housing contains the controller 850 or another equivalent electrical device to control the amount of heating or a condition such as temperature, or pressure within the cassette. Suitable controllers are known in the arts and are commercially available including those that have been discussed in connection with the commercially available electrical resistance heaters previously described. The controller may monitor the temperature within the cassette, for example the temperature at one or more locations within the hydrogen storing material, and may adjust the heat provided by electrical resistance heaters based on the measured temperatures. The pressure within the glass cassette also depends on the relative amount of hydrogen freed from the storing material and that permeated out of the glass cassette and may be monitored and controlled by the controller. The controller may also receive signals such as power and control signals from external systems such as a hydrogen recovery system. For example, the controller may receive a signal indicating to begin heating, how fast to heat (e.g., based on hydrogen utilization needs), to stop heating, etc. The controller may be electrically connected through the walls of the glass cassette in order to receive power and electrical signals representing control information. The present cassette contains the signal connector 860 to connect the controller to an external hydrogen recovery system or other system in order to receive power and control signals. Alternatively, wires for electrical connection may be molded through the walls of the glass cassette or holes may be drilled in the glass cassette and the wires inserted there through and fastened with adhesive in order to connect the controller. If the signal connector and the controller are able to tolerate the temperatures expected during molding they may be molded into the glass cassette housing during the molding operations. As another option, the signal connector and the controller may be inserted into the glass cassette housing after molding and affixed with an adhesive. Based on the received control signals and the conditions sensed, the controller may correspondingly control the electrical resistance heaters in order to control the amount of heating and/or the conditions within the glass cassette. In alternate embodiments of the invention, an external controller, for example located within a hydrogen recovery system, may be used to control heating and conditions within the glass cassette. The external controller may control heating based on a temperature measured at the exterior of the cassette housing.

The glass cassette may also contain a microelectronic device to sense conditions such as temperature and pressure within the cassette, to store and process information associated with the cassette, and to communicate or telemeter information to other electrical devices. The microelectronic device may be a communication device (e.g., a telemetry device) or an information storage and/or processing device as previously described. The microelectronic device may be external or contained within the interior of the cassette. As one option, a pick-and-place apparatus may place the microelectronic device on the cassette housing before the glass material has cooled below the softening point. A number of commercially available microelectronic devices, such as microchips having ceramic structures, are able to tolerate high temperatures near the softening point of glass. As another option, the cassette may have a recess formed within the housing for example during molding where the microelectronic device may be inserted and affixed with an adhesive. The microelectronic device of these embodiments may sense or transduce conditions within the cassette, such as temperature and pressure, through the glass housing. The device may contain a sensor to sense a temperature of the glass cassette housing. As desired, the temperature of the hydrogen storing material contained therein may be inferred from this measurement. As another option, the microelectronic device may be contained within the cassette and may sense the temperature and pressure within the cassette directly. The microelectronic device may be affixed to the inside of the cassette housing with an adhesive prior to the addition of the hydrogen storage material. The microelectronic device may also be combined with the controller as a single device.

After adding any desired heaters and electronic devices, a hydrogen storing material may be formed within the hydrogen permeable container or cassette. Forming may include adding a hydrogen storing material to the hydrogen permeable container through an opening therein and then closing the opening. As an example, after adding the controller and heaters to the cassette, a hydrogen storing material (e.g., a metal hydride powder, metal hydride nanoparticles, metal hydride coated particle substrates, hydrogen charged carbon nanostructures, or hydrogen filled glass microspheres) may be added to the cassette through the opening. Once all desired components have been added to the cassette, they may be sealed within the cassette by closing the opening for example by placing a glass, ceramic, or metal cap over the opening and running an automated brazing torch around the edges of the opening to melt the glass and fuse the cap to the cassette, or by affixing a plastic, metal, ceramic, or glass cap to the cassette with an adhesive.

As another option, forming may include adding a hydrogen storage material (e.g., a metal capable of forming a metal hydride with hydrogen) to the hydrogen permeable container through an opening therein, closing the opening, and permeating hydrogen through the container to charge the hydrogen storage material with hydrogen and form the hydrogen storing material. For example, a glass cassette containing a metal, such as lithium, magnesium, or various other metals which are known to form metal hydrides, may be exposed to hydrogen gas at sufficient pressure and temperature to induce hydrogen to permeate the glass cassette housing and form a metal hydride with the metal contained therein. The glass cassette containing the metal hydrogen storage material contained therein may be placed in a hydrogen-charging chamber and exposed to hydrogen at a sufficient pressure and temperature. In general, higher pressures and higher temperatures increase the permeability of hydrogen across the glass and therefore increase the rate of charging. If the cassette is sealed, the external pressure may create a pressure differential across the glass cassette housing, with the higher pressure being on the outside, and should be maintained sufficiently low to avoid mechanically damaging the cassette. The temperature should be kept lower than the melting point and often lower than the softening point of the glass. Often it will be desirable to maintain the temperature lower than the melting point of the hydrogen storage material or hydrogen storing material. For example, in the case of a magnesium or magnesium hydride powder it may be desirable to keep the temperature below the melting point of these materials to avoid sintering the materials. Sintering the materials may reduce the ease of recovering hydrogen. Of course a wide range of temperatures and pressures are suitable depending upon whether a rapid or slow charging rate is desired.

At any rate, some of the hydrogen within the chamber permeates the walls of the glass cassette and reacts with the metal contained within the cassette to form a metal hydride. At least conceptually the metal hydride "soaks up" hydrogen into the metal the way a sponge soaks up water, although the hydrogen is chemically bound and may be later recovered by heating rather than by squeezing. After charging the cassette with hydrogen, the cassette may be slowly brought back to ambient temperature and pressure and then removed from the chamber. Accordingly, a hydrogen permeable container having contained therein a hydrogen storage material, which may also be a depleted hydrogen storing material from which hydrogen has previously been recovered, may be charged with hydrogen by permeating hydrogen across the container walls or some portion thereof.

Although not required, the illustrated cassette 800 contains the impermeable housing 820 that encases the permeable glass cassette housing. The hydrogen storing material may be formed in the cassette before or after encasing the glass housing with the impermeable housing, as desired. The impermeable housing is comparatively impermeable to hydrogen and may be used to collect and retain hydrogen recovered from the cassette until it is needed and is withdrawn from the impermeable housing through the valve 840 or an unregulated gas flow opening, for example. The illustrated impermeable housing is formed of a metal such as stainless steel, carbon steel, aluminum, or other conventional metals including alloys. Often, a metal housing will be desired since even a thin wall of metal may be sufficiently impermeable to hydrogen, since metals are appropriate for the temperatures and pressures used during charging and recovery, since metals provide additional mechanical strength and protection to the glass cassette, and since they may be formed around the glass cassette cost effectively. The metal housing may be formed around the glass cassette with welding, with sealing gaskets, with adhesives, or using other techniques known in the arts. The impermeable metal housing may be slightly larger in volume than the glass cassette housing to provide a volume or chamber that allows the hydrogen recovered from the glass cassette to be collected. As shown, the metal housing may have openings to accommodate the signal connector and/or the controller, or wires associated therewith. In the illustrated embodiment, the metal housing has an opening where the signal connector is inserted and mates with the controller. In another embodiment, the mating portion of the controller may protrude from the glass cassette housing so that it can be mated with the signal connector external relative to the glass cassette housing. The same approach may be used for establishing other signal connections for communication, etc. The metal cassette may have one or more valves, as previously discussed, to allow adding and removing hydrogen from its interior. The valves may be desired for the additional control that they provide over the flow of hydrogen into and out of the cassette. Of course, they are not required in order to implement the invention and a simplified metal housing may contain an unregulated opening through which hydrogen gas may pass.

Of course, the use of a metal is not required for the impermeable cassette housing. Other materials that are potentially suitable include low hydrogen permeability ceramics, low permeability thermally stable plastics, and also sufficiently thick housings of somewhat permeable materials. Of course, the impermeable cassette housing is not required, as will be appreciated by a person having an ordinary level of skill in the art and the benefit of the present disclosure. As an example, a naked glass cassette (not having the impermeable metal housing) may be added to and sealed within an impermeable hydrogen collection chamber, for example made of metal, of a hydrogen recovery system. The hydrogen recovered from the cassette may be collected in this chamber and held until it is needed.

Hydrogen may be recovered from a cassette, such as the cassette 800, which contains a hydrogen storing material by heating the hydrogen storing material within the cassette to free hydrogen from the material and permeating the freed hydrogen across a heated hydrogen permeable material in order to recover the hydrogen. As an example, a metal hydride within a glass cassette housing may be heated in order to free the hydrogen from the hydride and cause the hydrogen to permeate across the walls of the glass housing. The same approach may be used when the hydrogen storing material comprises a glass microsphere or a carbon nanostructure. In one embodiment of the present invention, the metal hydride is heated to a temperature greater than ambient temperature (approximately 25° C.) that is sufficient to free hydrogen. For various doped sodium alanate materials this temperature is not greater than approximately 150° C. For other materials appropriate recovery temperatures known in the arts may be used. In another embodiment of the invention, the metal hydride is heated to a temperature that is sufficient to increase the permeability of the glass cassette housing. In the case of many metal hydrides this temperature may be higher than the recovery temperature. Depending on factors such as thickness, material, etc., this temperature may be not greater than approximately 300° C., or not greater than approximately 200° C. Higher temperatures up to about the softening or melting point of the glass cassette housing may also be used, but often such high temperatures will not be desired since using such high temperatures in electronic devices causes a number of well known problems.

In the present cassette, the hydrogen storing material and the glass cassette housing 810 may be heated with the electrically resistive heaters. Alternatively, the cassette may be heated by thermal conduction from an adjacent hot surface. As another option, heating prongs, vanes, or other insertable heating elements may be inserted into the cassette where they provide heat to the material by thermal conduction. In other embodiments, if the cassette housing contains a metal cage (e.g., a wire cage as discussed for use as a reinforcing structure), the metal cage may help heat the cassette walls and material within the cassette. In one aspect electrical current may be passed through the metal cage to allow it to heat as an electrical resistance heater, or in another aspect heat may be applied to the wire cage from an external heat source and thermally conducted and distributed to the cassette through the metal cage. In these embodiments, in addition to providing mechanical structure to the cassette housing, the metal cage may assist with heating the cassette. As additional options, the material may be heated by irradiation with laser terahertz radiation or another suitable focused energy beam. The glass housing may be sufficiently transparent to allow the material contained therein to be irradiated. Of course other approaches for heating may also be used (e.g., a pressurized capsule heater).

The concepts of the present invention have been primarily illustrated through an exemplary cassette containing a glass hydrogen permeable material, although the invention is not so limited. In alternate embodiments of the invention the hydrogen permeable glass material may be replaced by another hydrogen permeable material known in the arts. Materials conventionally used in the arts for hydrogen separation membranes to separate hydrogen from other gases such as hydrogen sulfide, carbon dioxide, coal gasification gases, fuel gas, methane, and the like may potentially be used. The hydrogen separation membranes, in addition to having permeability to hydrogen, also have selective permeability that favors hydrogen over various other gases. A material that selectively permeates hydrogen more than the primary components of air (e.g., nitrogen and oxygen) may be desired. A hydrogen-permeable metal membrane is disclosed in U.S. Pat. No. 6,152,995 to Edlund. A hydrogen purification membrane containing vanadium alloyed with at least 1 to 20 atomic percent nickel and/or 1 to 20 atomic percent cobalt and/or 1 to 20 atomic percent palladium is disclosed in U.S. Pat. No. 6,395,405 to Buxbaum. One exemplary hydrogen purification membrane disclosed comprises a metallic substrate having a coating, the coating comprising palladium and a surface species present as discontinuous surface deposits, the surface species selected from the group consisting of alkali metal cations, alkaline earth elements and alkaline earth cations. ZnS film membranes on glass supports have also been used as hydrogen separation membranes and introduce an n-type semiconductor character that may favor chemisorption of hydrogen. Other hydrogen permeable membranes abound in the literature. Non-limiting examples of such membranes include palladium membranes, tantalum membranes, palladium-coated porous stainless steel support, palladium-coated ceramic support, perovskite materials, hydrogen permeable silicalite-1 molecular sieve materials, and other hydrogen permeable materials. Any of these hydrogen permeable membranes may potentially be used as a hydrogen permeable material within a cassette, according to embodiments of the invention. For example, it is contemplated that any of these hydrogen permeable membranes may be formed on a permeable or porous cassette, such as a porous glass, a ceramic, a porous stainless steel, or a permeable polymeric material.

V. Systems that React Hydrogen Storing Materials to Recover Hydrogen

The cassette of one embodiment of the invention is a compact container for containing a solid hydrogen storing material that may be reacted in order to recover hydrogen. The hydrogen storing material may have chemical bonds formed to the hydrogen that may be broken through chemical reactions in order to release and recovery hydrogen from the material. The cassette may contain an opening to allow a material to enter and/or exit the cassette. In some embodiments, the hydrogen storing material may exit through the opening into a hydrogen recovery system that contain a reaction system to conduct and controls reactions to free and recover hydrogen from the material. In other embodiments, a reactant from a hydrogen recovery system may enter the cassette through the opening and react with and recover hydrogen from the cassette. Cassettes and openings according to various embodiments are discussed in further detail below. The cassette may allow the hydrogen storing material to be easily handled, distributed, shipped, and otherwise deployed to a hydrogen recovery system that may extract and recover hydrogen from the cassette for fuel to power a fuel cell or other hydrogen utilization system.

Many different materials may be reacted in order to recovery hydrogen and are suitable for embodiments of the invention. Hydrogen storing materials that store hydrogen as a solid or bound to a solid may be favored over those that store hydrogen as a compressed gas or liquid due to the reduced likelihood of leaking and the resulting safety concerns. Likewise, materials that store hydrogen densely may be favored in order to provide a compact cassette that is able to store a relatively large amount of hydrogen. Such a hydrogen storage material provides a convenient way to store large amounts of hydrogen at high density in a solid form that avoids many of the prior art problems with cost and safety of storing and distributing hydrogen.

Metal hydrides are one non-limiting example of materials that may be reacted with a suitable reactant, such as water, to recover hydrogen. Non-limiting examples of metal hydrides include alkali metal hydrides (e.g., lithium hydride (LiH), sodium hydride (NaH), and others), alkaline earth metal hydrides (e.g., magnesium hydride ($MgH_2$), calcium hydride (CaH$_2$), and others), lanthanum or rare earth metal hydrides, and others such as sodium aluminum hydride, sodium magnesium hydride, sodiumborohydride (NaBH$_4$), lithium aluminum hydride, lithiumborohydride (LiBH$_4$), fullerene hydride, other hydrides, and any combination of such hydrides. As one illustrative example, hydrogen may be recovered from calcium hydride by reaction with water to produce hydrogen and calcium hydroxide according to the reaction: CaH$_2$+2H$_2$O→Ca(OH)$_2$+2H$_2$. In some implementations the hydrogen storage and/or release characteristics of the hydrides may be altered, often improved, by adding various additives, activators, or dopants. Such additives, activators, and dopants are known in the arts. The hydride may be used in the form of a solid block, several smaller solid blocks that have been sliced or cut from a larger solid block, chips, flakes, powders, or slurry. The slurry may comprise a fine solid hydrogen storing material, such as a powder, in a non-reactive carrier liquid, such as a mineral oil, that allows the powder to be pumped and flowed through tubing. The slurry may be contacted with water in order to allow the recovery of hydrogen as a product of the reaction. The amounts of such materials are not a limitation of the invention and a cassette may contain virtually any quantity of these hydrogen storing materials to provide enough hydrogen for the intended implementation.

A method according to embodiment of the invention may include inserting a cassette containing a hydrogen storing material that may be reacted to produce hydrogen into a cassette port of a hydrogen recovery system. Then, the hydrogen storing material may be removed from the cassette and added to a processing system within the hydrogen recovery system that may implement reactions in order to recovery hydrogen from the material. Before discussing the hydrogen recovery system in further detail, lets initially review exemplary cassettes that are suitable for various embodiments of the invention.

The cassette and the hydrogen recovery system may be hydride agnostic in that many different hydrides and derivatives thereof may be Used with the cassette and hydrogen recovery system. As previously stated, the cassette may have an opening or mechanism for being opened to allow hydrogen storing material out or reactants into the cassette. Exemplary openings include a cassette door that may be opened, an internal tray that may slide open to reveal an opening, a mechanism providing an ability to be opened or broken to expose the internal hydrogen storing material, a perforated seam that may be torn to release material from the cassette, an opening through which material may be squeezed through by squeezing, compressing, or collapsing a flexible cassette housing, an opening through which a material may be pushed with a push rod, plunger or other pushing device, an outlet drain to drain a liquid hydrogen storing material, or many others.

Figure 9:
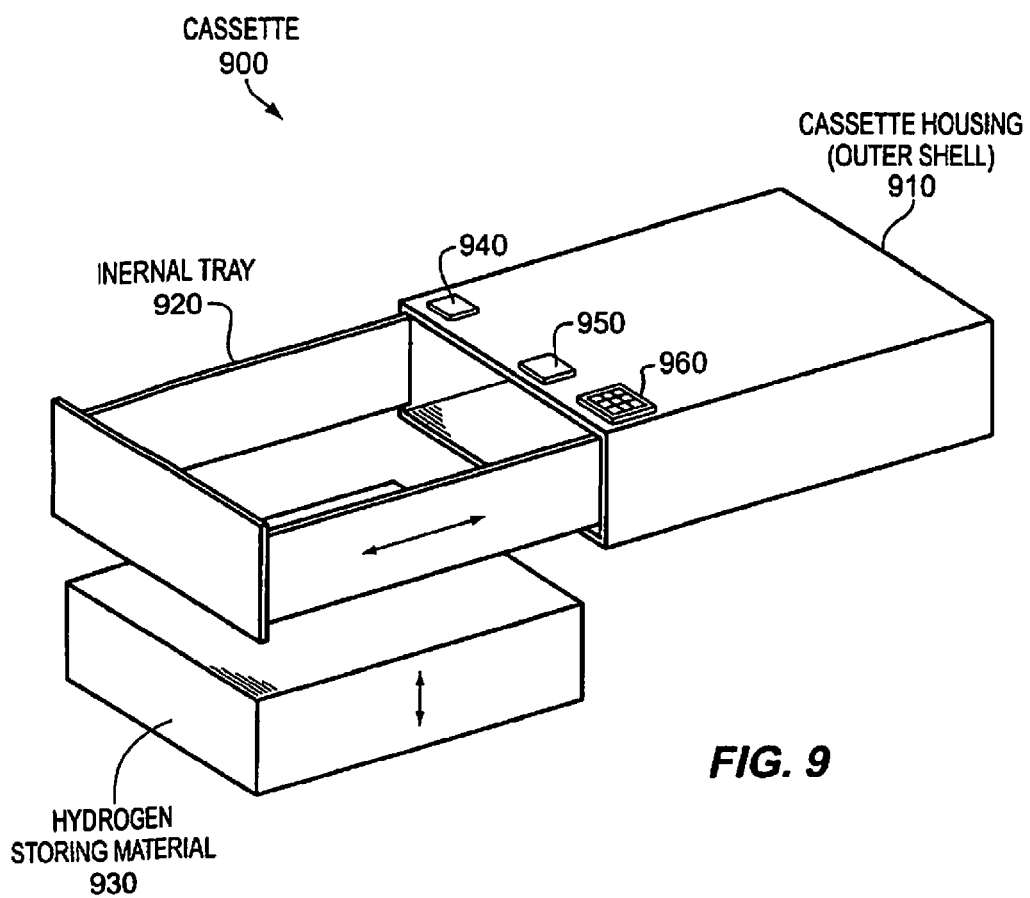
FIG. 9 shows a cassette containing an internal sliding tray with an open bottom to allow discharging a hydrogen storing material, according to embodiments of the invention.

FIG. 9 shows a cassette 900 containing an outer shell cassette housing 910 and an internal sliding tray 920 with an open bottom to allow discharging a hydrogen storing material 930, according to embodiments of the invention. The particular material shown is in the form of a solid rectangular block and the entire bottom is open, although this is not required. In another embodiment, a finely divided solid may be contained within a package, bag, sack, or other container. In still another embodiment, the material may be in the form of a loose finely divided solid and the opening may be a small circular opening in a bottom of the tray, for example. The cassette may contain the material in a configuration where the tray is slid within the outer shell. In this configuration, the cassette may be inserted into the cassette receptacle of the hydrogen recovery system. The hydrogen recovery system may slide the tray open to allow the material or container to drop out of the tray and into a receiving process within the hydrogen recovery system. As an option, the hydrogen recovery system may return the container, package, sack, or bag to the tray. The hydrogen recovery system may then slide the tray back into the cassette shell or housing and eject the cassette. The cassette also contains a communication device (e.g., a telemetry device) 940, a bar code or magnetic strip 950, and an information storage and/or processing electronic device 960 attached to the outside of the cassette housing, although this is not required in other embodiments. The communication device and the information storage and/or processing electronic device may be provided as one or more microelectronic devices, that is they may be combined in a single device, as desired.

Figure 10A:
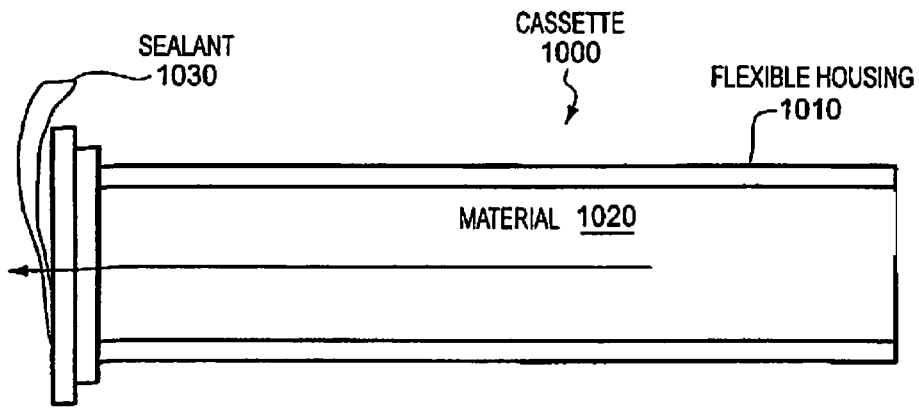
FIGS. 10A-B shows a cassette containing a flexible housing that may be compressed, squeezed, or otherwise collapsed as shown in FIG. 10B to force a hydrogen storing material from the cassette, according to embodiments of the invention.
Figure 10B:
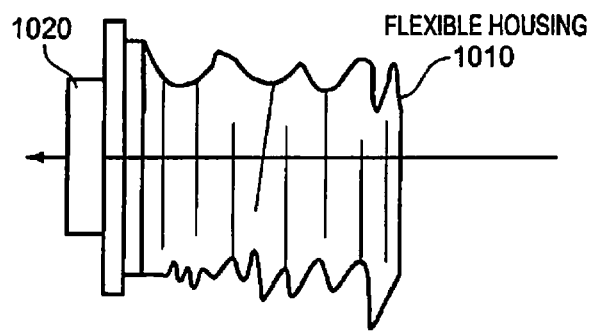

FIG. 10A shows a cassette 1000 containing a flexible housing 1010 that may be compressed, squeezed, or otherwise collapsed as shown in FIG. 10B to force a hydrogen storing material 1020 from the cassette, according to embodiments of the invention. In particular, FIG. 10A, shows the cassette prior to use in a hydrogen recovery system. The cassette includes the solid hydrogen storage material contained therein. In one specific embodiment, the material may be a sodium hydride. The cassette may contain a sealant 1030 adhered to and sealing an opening at an end of the cassette. Non-limiting examples of sealants include plastic, metallized plastic, or metallized paper adhered with an adhesive. Alternatively, the cassette may be sealed with a lid or a cap. An operator may remove the sealant and introduce the cassette into the hydrogen recovery system. The end of the cassette where the sealant was removed to create the opening may be rigid to provide a good seat against the hydrogen recovery system. Other portions of the cassette housing may be flexible and collapsible. Examples of materials that may be used for the cassette housing include metallized fabric, plastic/foil, flexible plastics, Mylar™, polyimide, or similar materials. The flexible housing may be collapsed manually or systematically by a device under the control of the hydrogen recovery system. For example, the operator may push against the other end of the cassette to causing the flexible cassette housing to collapse accordion-like and drive the rigid internal material into the hydrogen recovery system, as shown in FIG. 10B. Alternatively, the hydrogen recovery system may use a conventional push rod or a rotary-to-linear leadscrew drive pusher to collapse the housing and drive the material into the recovery system, or an extraction arm to pull on the hydrogen storage material. In any event, the hydrogen storing material may be removed from the cassette into the hydrogen recovery system for processing.

Figure 11:
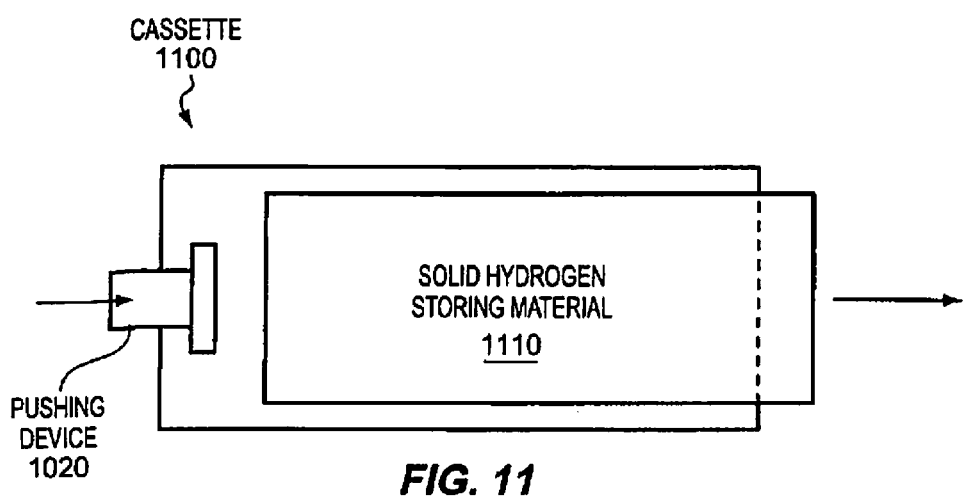
FIG. 11 shows a cassette that allows a solid hydrogen storing material to be pushed from the cassette into a hydrogen recovery system, according to embodiments of the invention.

FIG. 11 shows a cassette 1100 that allows a solid hydrogen storing material 1110 to be pushed from the cassette into a hydrogen recovery system, according to embodiments of the invention. The cassette may contain sealants at both ends. Suitable sealants include foil end covers, caps, tapes, or the like. The sealants may be removed to form openings at both ends and the cassette may be properly inserted and configured in a hydrogen recovery system. Next, a plunger, push rod, or other pushing device 1020 that is manipulated by the hydrogen recovery system may be used to push the solid hydrogen storage material out of cassette and into subsequent hydrogen recovery processes within the recovery system.

Figure 12:
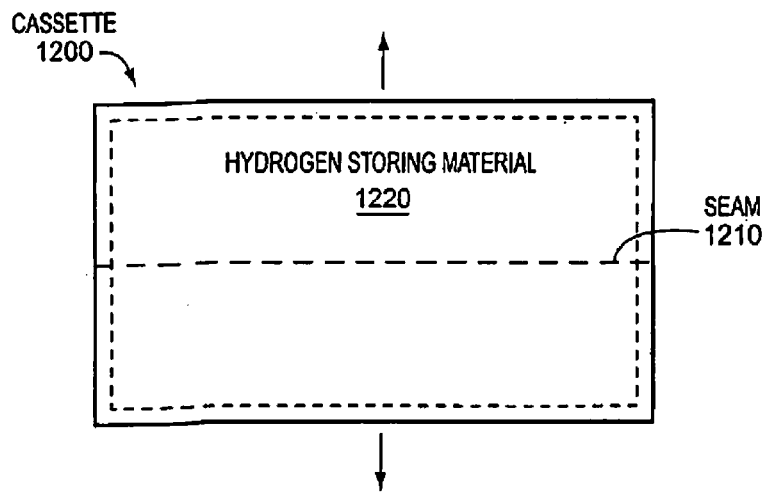
FIG. 12 shows a cassette that contains a predefined seam that allows the cassette to be split open to release a hydrogen storing material contained therein, according to embodiments of the invention.

FIG. 12 shows a cassette 1200 that contains a predefined seam 1210 that allows the cassette to be split open to release a hydrogen storing material 1220 contained therein, according to embodiments of the invention. The seam may comprise perforations, a comparatively weak material, an adhesive that connects separate portions of the cassette housing that may be torn apart, or others. The seam may be broken manually be an operator or systematically by a hydrogen recovery system, as desired. The hydrogen recovery system may have a mechanism for opening the cassette at the seam.

Figure 13:
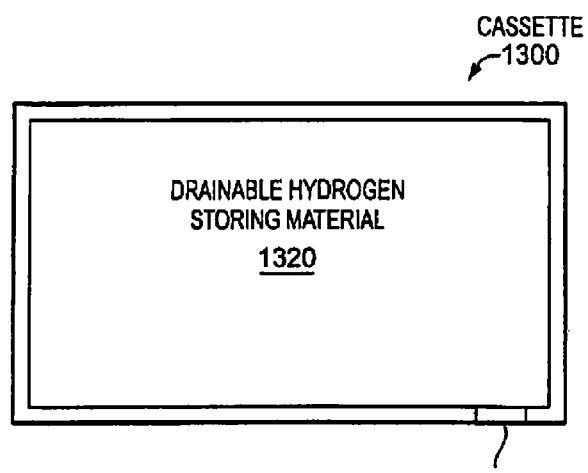
FIG. 13 shows a cassette containing a fluid hydrogen storing material that contains an outlet drain or other opening to allow the fluid to drain or otherwise leave the cassette, according to embodiments of the invention.

FIG. 13 shows a cassette 1300 for containing a fluid hydrogen storing material 1320 that contains an outlet drain 1310 or other opening to allow the fluid to drain or otherwise leave the cassette. The fluid material may be a gas, liquid, slurry, or finely divided powder that may be fluidized. In one embodiment of the invention, the fluid material is a water or catalyzed water, for example a catalyzed water. The cassette and hydrogen recovery system may also provide for the use of a hydrogen storing slurry material, such as a sodium hydride in a non-reactive liquid. The slurry may protect the hydride from contact with moisture and allow the hydride to be transported through tubing, pipes, or conduits. The outlet drain may be configured as closed while the cassette is outside the hydrogen recovery system and upon proper insertion of the cassette into the hydrogen recovery system the system may open the outlet drain to allow the fluid hydrogen storing material to exit the cassette. Suitable drains include openings that may be sealed, openings with lids, caps, or stoppers, openings with flow regulation devices, openings with valves, and the like.

According to embodiments of the invention, water may be altered to improve its functioning as a hydrogen storage material or reactant for a solid hydrogen storing material (e.g., sodium hydride). According to one embodiment of the invention, a normal distilled or tap water may be altered by a method that includes purifying the water, ozonizing the water, adding catalysts that are known to improve the kinetics for recovering hydrogen, for example by reducing the activation energy of a reaction between the water and a hydrogen storing material (e.g., a metal hydride), of the hydrogen producing process, and ionizing or polarity adjusting the water (e.g., by adding trace amounts of calcium chloride, magnesium sulfate, or the like). Ruthenium is one exemplary catalytic metal that may be added, although others are known in the arts. The water formulation may also be exposed to ultraviolet irradiation. In one instance, the catalyst may be ruthenium, or another known catalyst for the reaction. The ozonation may improve the bond angle between hydrogen atoms in a water molecule and may make the water molecule more conducive to recovering hydrogen. Advantageously, such modifications may provide low energy input, high hydrogen output, and safe recovery of hydrogen. As used herein, water that has been altered according to such a method or its equivalents will be termed massively catalyzed water (MCW). MCW contains water combined with ozone and various catalysts that are known in the arts to improve hydrogen recovery.

Figure 14:
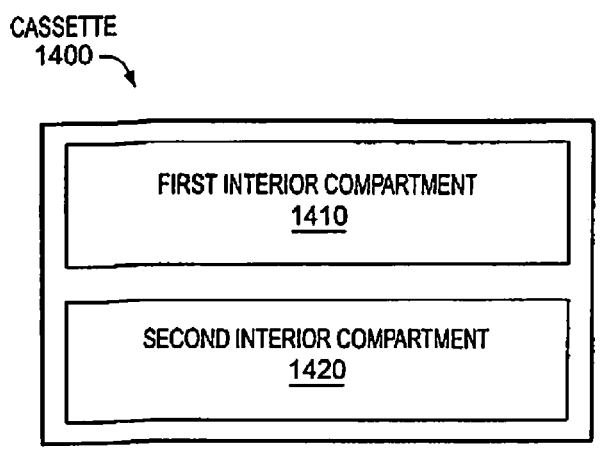
FIG. 14 shows a cassette that contains a plurality of separate internal compartments or regions, according to embodiments of the invention.

FIG. 14 shows a cassette 1400 that contains a plurality of separate internal compartments or regions, according to embodiments of the invention. The particular cassette shown contains a first compartment 1410 and a second compartment 1420, although in other instances the cassette may contain any desired number of compartments. According to one embodiment of the invention, the first compartment may store a solid hydrogen storing material, for example sodium hydride, and the second compartment may store a material that may react with the material in the first compartment, for example water with any desired additives (e.g., catalysts, ozone, etc.). This cassette may allow storing different materials, potentially mutually reactive materials, within the same cassette, for later use in a hydrogen recovery system.

Figure 15:
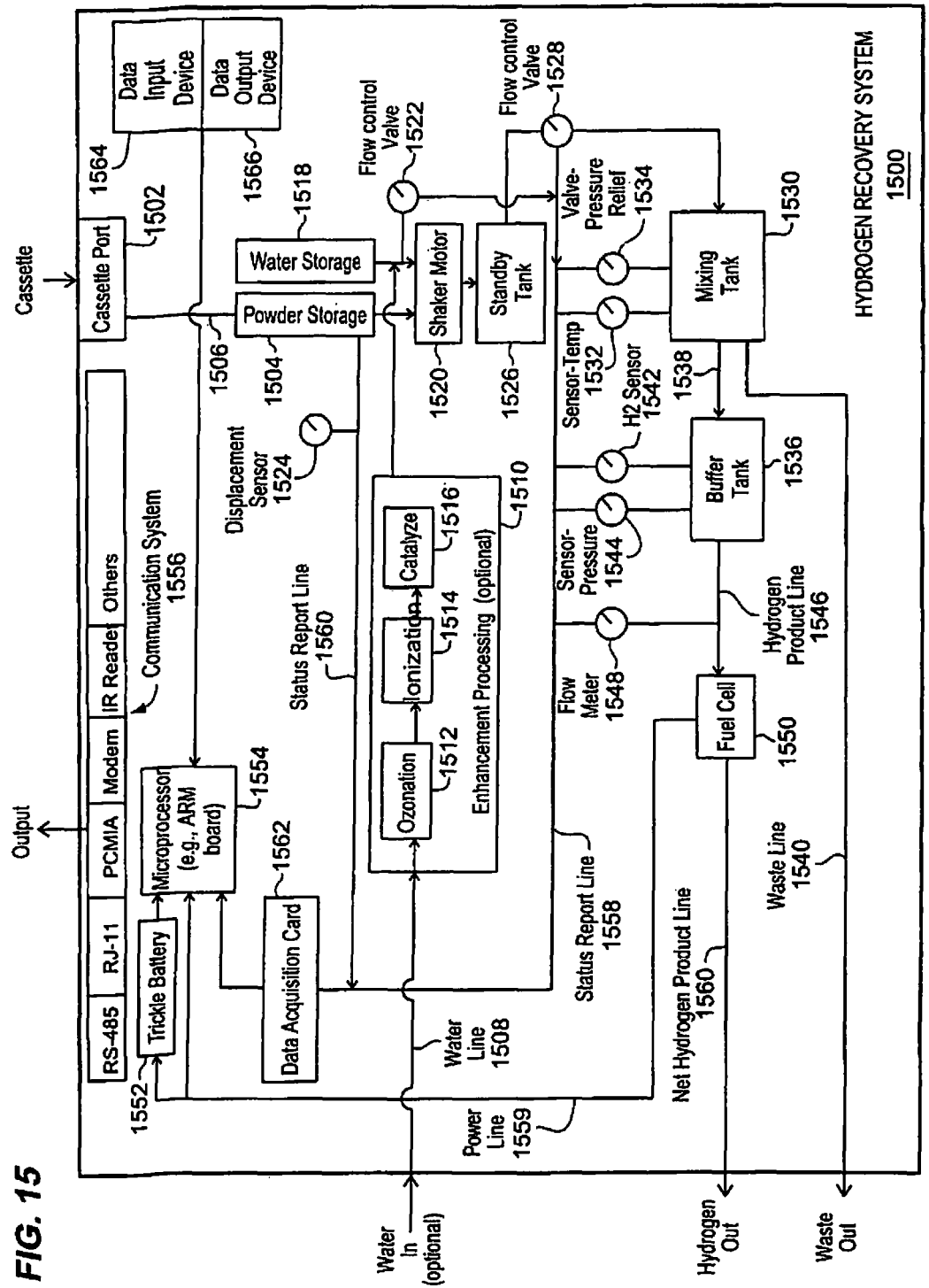
FIG. 15 shows a process diagram for a hydrogen recovery system for recovering hydrogen from a powdered hydrogen storing material provided in a cassette through reaction of the material with water or an enhanced water formulation, according to embodiments of the invention.

Returning now to the hydrogen recovery system and to the processes for recovering hydrogen from the hydrogen storing material. FIG. 15 shows a process diagram for a hydrogen recovery system 1500 for recovering hydrogen from a powdered hydrogen storing material provided in a cassette through reaction of the material with water or an enhanced water formulation, according to embodiments of the invention. The hydrogen recovery system incorporates a variety of optional features that are not needed to implement other embodiments of the invention, including for example a communication system and an enhancement processing system.

A cassette containing a powdered or otherwise finely divided solid hydrogen storing material, such as a powdered sodium hydride, is inserted or otherwise coupled with a cassette port 1502. In some embodiments, the system may receive cassettes from a multiple cassette module, such as a linear or radial pack of any desired number of cassettes. The use of the finely divided material, which could also be a sliced or diced material, may be desired to avoid needing to finely divide the material within the recovery system. Alternatively, it will be appreciated that a recovery system may have electromechanical systems to scrape, slice, dice, crush, or otherwise divide a solid material received from the cassette so that hydrogen recovery may be incremented and controlled. The hydrogen recovery system may store the solid hydrogen storing material from the cassette out of immediate or accidental contact with water, which could cause an overpressure or explosion. The system recovers the powder from the cassette and conveys the powder to a storage compartment 1504. The powder may be conveyed by a chute, duct, channel, or pipe 1506, although this is not required. Water may optionally be added to the system from an external source through a water line 1508. A metal pipe or flexible plastic or rubber tubing are suitable for the water line. As an additional option, the water may be processed for enhanced performance in an enhancement processing system 1510. The enhancement processing system may include one or more of an ozonation system 1512, an ionization system 1514, and a catalyzation system 1516 to alter, typically enhance, the performance of the water for reacting with the hydrogen storing material. If a simpler system is desired water or an enhanced water produced externally may be added manually to a water storage compartment 1518 for use by the system. As another option, the water obtained through the water line may be used to fill the water storage chamber if both are present in the system.

A reaction between the hydrogen storing material and water is used to recovery hydrogen. The recovery system may provide a system to move the hydrogen storing material into contact with the water in a controlled manner so that hydrogen gas is desorbed or produced via the reaction. Powdered hydrogen storing material and water may be controllably combined by a process control system of the recovery system. A shaker motor 1520 using technology that is conventionally used in solids or powder processing and a flow control valve 1522 that may control the flow from the water line and/or from the water storage compartment may be used in combination to achieve a desired mixing ratio of the hydrogen storing material and the water. The shaker may be controlled based on measurements from a displacement sensor 1524 that measures the displacement of powder in the storage compartment. In an embodiment where sodium hydride powder is used the recovery system may provide for approximately a 2:1 ratio of water to powder. The powder and the water may be combined in a stand-by tank 1526 and may be removed according to flow control valve 1528 to a mixing tank 1530.

The mixing tank may have a temperature sensor 1532, a pressure sensor and pressure relief valve 1534 to keep pressures in tolerance, and a temperature control system (not shown). Hydrogen recovery may occur predominantly in the mixing tank or reaction chamber due to reactions between the hydrogen storing material and the water. An optional thermal system may be used to heat the chamber to enhance the recovery of hydrogen through reaction. The recovery system may contain a sub-module for containing pressurized hydrogen gas. The recovered hydrogen gas may separate from the liquid and residual solids in the tank, and may be removed to a buffer tank 1536 via a hydrogen line 1538. Wastes typically in the bottom of the mixing tank may be discharged from the hydrogen recovery system via a waste line 1540 for suitable disposal. The buffer tank may contain a hydrogen sensor 1542, a pressure sensor 1544, and potentially a relief valve (not shown). The recovery system may have hydrogen relief valves and pressure controls in all sections that contain hydrogen gas. The buffer tank may have any desired capacity for storing hydrogen, for example to accommodate for peak periods of hydrogen need, or to allow storing hydrogen for use between cassettes. Hydrogen may be removed from the buffer tank through a metered hydrogen product line 1546 that may contain a flow meter 1548 to measure the flow of recovered hydrogen leaving the buffer tank. This may allow the system to keep accurate account of hydrogen inventory.

The particular hydrogen recovery system shown contains an internal fuel cell 1550, although this is not required in other embodiments. Any desired amount of hydrogen from the buffer tank may be passed through the fuel cell for conversion into power for the shaker motor, the sensors and controls, a trickle battery 1552, a microprocessor 1554, a communication system 1556, and other electronics of the hydrogen recovery system (e.g., pumps, data output device, etc.). The power may be provided through a power line 1558. The recovery system may also have positive and negative power-out connections from the fuel cell. As shown, the hydrogen fuel cell may provide a trickle charge to trickle charge battery, so that the recovery system may be self powered. Of course, the hydrogen recovery system may be self powered with other power supplies such as a solar cell or others. Alternatively, the hydrogen recovery system may receive power from an external source, such as an outlet. The hydrogen recovery system provides a system to move the gaseous state hydrogen to the hydrogen outlet port where it may be received by a hydrogen utilization system. Hydrogen that is not used by the fuel system may be removed from the system through a net hydrogen product line 1560. This hydrogen may be provided to any suitable hydrogen utilization system. In one particular non-limiting example, the hydrogen recovery system may provide any desired amount (e.g., 0.1-10.0 Nm$^3$/h) of dry high purity hydrogen at a pressure that is in the range of approximately 10-250 psig.

The hydrogen recovery system contains the internal microprocessor 1554 for data processing. One suitable microprocessor is an ARM microprocessor, such as a StrongArm microprocessor. The ARM microprocessor may implement a Microsoft® Windows® CE operating system and may store data and execute instructions associated with hydrogen recovery or other operations such as communicating with the hydrogen network through a communication system 1556. The instructions may be written in Visual Basic, C++, or other languages. The microprocessor may receive and process data from various sensors, controls, and meters of the hydrogen recovery system through status report lines 1558 and 1560 via a data acquisition card 1562. The microprocessor may also receive and process data from a data input device 1564, such as a keyboard comprised of one or more buttons or dials associated with operating the hydrogen recovery unit (e.g., on/off, eject, test cycle, menu, >, <, sleep, etc.), and process and provide data to data output device 1566 such as a monochromatic liquid crystal display or printer.

The communication system 1556 may contain one or more conventional and known electrical devices to provide a connection to a hydrogen network. The particular communication system shown includes a RS-485, a RJ-11, a PCMCIA card, a modem, and an IR reader, although all of these are not required for other embodiments and any conventional combination of these or other devices may be used. The RS-485 is an Electronics Industry Association (EIA) standard for multipoint communications that supports several commonly used types of connectors. The RJ-11 is a four or six-wire connector often used to connect telephone equipment and local-area networks (LANs). Of course other registered jacks may also be used, such as an RJ-45 an eight-wire connector that is commonly used to connect computers to local-area networks, such as Ethernets. The RJ-11 and the modem may be used to send data to a network, such as the Internet. The PCMCIA (Personal Computer Memory Card International Association) card is a small credit card sized card device, often referred to as PC cards, that may add memory, ROM or RAM, or be used for modem or fax cards. It may be used to send data as output to a network for example through a mem-tel wireless device such as CDPD wireless. The modem is a device or software that enables the hydrogen recovery system to transmit data over a telephone line. The hydrogen recovery system may store data digitally and use the modem to convert the data to analog for transmission as analog waves over the telephone line and visa versa. The IR reader may allow the hydrogen recovery system to exchange data as infrared signals with a proximate external device, such as a handheld personal computer system (e.g., a personal digital assistant). The hydrogen recovery system may use the communication system to communicate information associated with hydrogen storage, inventory, recovery, or utilization to a hydrogen network or other interested recipients, as described elsewhere herein.

Accordingly, a hydrogen recovery system of one embodiment of the invention may recovery hydrogen from a solid hydrogen storing material, that avoids may of the prior art problems associated with liquid or pressurized hydrogen storage, may not need to use caustic electrolytes or other harsh chemicals to recover hydrogen, may have small if any negative environmental impact, may be compact, may have a number of automatic controls to reduce the need for operator intervention, may in some embodiments be self powered to avoid needing external power (which may make the system desirable for remote locations and other environments), may produce insignificant EMF (which may be desirable in ambulance and other environments), may be easy to use, portable, and vehicle mountable. Additional details regarding prevailing practices, applicable codes, standards, guidelines, and regulations that govern the use of hydrogen fuel and that may provide options for designing a particular system as described above may be found in "The Sourcebook for Hydrogen Applications", available from the U.S. Department of Energy through the National Renewable Energy Laboratory (NREL). The Sourcebook contains information relevant to designing, building, and operating hydrogen systems. Other standards and codes are available from the International Standards Organization (ISO).

Of course this hydrogen recovery system is not required. It contains several optional features that may not be included in other recovery systems. Additionally, these other recovery systems may include additional components such as a heating system, a cooling system, a recycle system, an intensifier, and other desired systems. In one embodiment, the waste products may be removed to a recycle module of the hydrogen recovery system that may process or simply store the waste products. As one example, the recycle module may process waste sodium hydroxide (NaOH) into sodium hydride (NaH). Alternatively, the recycle module may store and allow appropriate disposal of the waste sodium hydroxide or other byproducts. In another embodiment, the waste products may be sent directly to an external waste container or treatment facility. As yet another embodiment, the waste products may be directed to an emptied cassette for storage and delivery to an appropriate disposal center. The cassette may have a designated interior region for the waste products or they may be stored in the same regions where the hydrogen storage material has been removed. In one embodiment, a hydrogen recovery system may provide various configurations for receiving cassettes. In some embodiments, the cassette receiving portion of the hydrogen recovery system can be modularized for swap out and easy reconfiguration. In one embodiment of the invention, in order to allow the system to operate with different types of cassettes, the hydrogen recovery system may have modular components that may be switched out and reconfigured to receive and process materials associated with these different cassettes.

A method according to one embodiment may include obtaining a cassette and inserting the cassette into a hydrogen recovery system. This may include obtaining a cassette from the bottom of a linear multiple cassette system. The recovery system may obtain some or all of the hydrogen storage material from the cassette. In an embodiment where all of the material is loaded into the hydrogen recovery system, the empty cassette may be ejected from the hydrogen recovery system, and for example returned to the top of the multiple cassette system. The hydrogen storing material obtained from the cassette may be processed within the hydrogen recovery system to recovery hydrogen. In some embodiments, the hydrogen recovery system may have a conventional solid dividing device, such as a crusher, grinder, pulverizer, shreader, cutter, or other device, to form the solid hydrogen storage material into smaller portions. Alternatively, a simpler hydrogen recovery system may be designed if a powdered or otherwise finely divided solid, liquid or slurry is provided from the cassette. The dividing and inserting of the solid into the hydrogen recovery system may also be done manually by an operator, as desired. The hydrogen recovery system may also contain a material addition system to controllably add material and reactants and a reaction chamber to controllably react the material with the reactants. The reactions may produce hydrogen. The recovered hydrogen may be stored in a buffer tank or other hydrogen storage container or provided to a hydrogen utilization system, such as a fuel cell, which may be contained within the hydrogen recovery system or may be external. Byproducts or waste products may be removed from the reaction chamber to a suitable repository or processing.

IV. Storing Information in a Hydrogen Fuel Material within a Cassette

Embodiments of the invention relate to a system that includes a hydrogen fuel container, a hydrogen fuel material within the container, and information stored within the material. The material may comprise a magnetic material, such as a metal hydride, that has magnetic properties. Virtually any information of interest may be stored as a magnetic pattern in the material by subjecting different portions of the material to different intensity of magnetic field. Accordingly, a magnetic pattern within a hydrogen storage or hydrogen storing material may serve as an information storage system for a hydrogen fuel container. Other embodiments of the invention relate to a method for storing information in a hydrogen fuel material within a hydrogen fuel container. Still other embodiments of the invention relate to a method for reading stored information from a material within a hydrogen fuel container.

Figure 26:
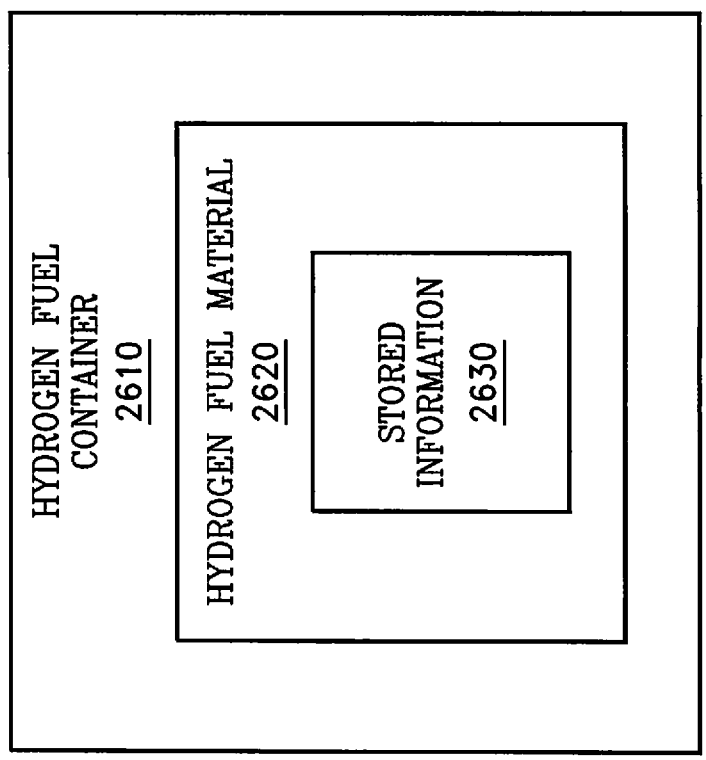
FIG. 26 shows a hydrogen fuel container containing a hydrogen fuel material having information stored therein, according to embodiments of the invention.

FIG. 26 shows a hydrogen fuel container 2610 containing a hydrogen fuel material 2620 having information 2630 stored therein, according to embodiments of the invention. The container may comprise a cassette as discussed elsewhere herein, although this is not required. The material may comprise a magnetic material. Exemplary magnetic materials include but are not limited to metals capable of forming hydrides with hydrogen, metal hydrides, doped metal hydrides, and metal hydride nanomaterials. The magnetic material may have a magnetic property that may be controllably modified or adjusted in order to program or write information into the material. Information may be stored in the magnetic material by applying a magnetic field to the material. Storing information in magnetic strips containing magnetic materials are known in the arts. Magnetic strip writers and magnetic strip readers are known for respectively writing information to and reading information from magnetic strips.

A magnetic pattern may be formed in the material by applying a magnetic field that subjects portions of the material at different locations within the cassette to different strengths of magnetic field. The application of the magnetic field may be position dependent so that the magnetic properties of the material are modified according to a pattern that represents information. The magnetic pattern may comprise an area or region of material having a pattern of differing magnetic properties or modifications according to the externally applied magnetic field. The magnetic pattern may represent virtually any information of interest. Examples of information that may be stored and read include but are not limited to hydrogen fuel container identification information, unique hydrogen fuel cassette identification information, hydrogen quantity information, quality control information, and manufacturing batch information.

One way of storing the information within the material by applying an external magnetic field may include swiping the cassette containing the material through equipment similar to a magnetic strip writer in order to write and store the information in the material. The different magnetic fields may induce different modifications in the magnetic properties of the material and thereby store the pattern or sequence of information of interest in the material. Information may be written or stored along a track or length of material within the cassette. Desirably the material within the cassette is fixed, so that it does not significantly shift or move and thereby alter the patter of magnetic information formed therein. The outer housing of the container or cassette may have indicia that identify the location of the magnetic pattern, so that it may be easily located, and the information stored therein read and utilized. The information may be read by a user, hydrogen recovery system, hydrogen powered vehicle, hydrogen utilization system, cassette exchange system, or virtually any other system with access to a magnetic reader.

VII. Interrogating a Material within a Hydrogen Fuel Container

Embodiments of the invention relate to a system containing a hydrogen fuel container, a material within the container, and a probe to interrogate the material. The container may comprise a hydrogen fuel cassette and the material may comprise a hydrogen storing material, such as a metal hydride. The probe may have one or more portions, such as one or a plurality of conductive tips, coils, transducers, or microphones, in contact with the material, to apply a signal to the material and detect a response to the applied signal. The signal may be an electrical signal, a magnetic signal, an electromagnetic signal, sound, ultrasound, or other detectable physical quantities. The probe may be contained within the container or the probe may be attached to another system, such as a hydrogen recovery system, a hydrogen powered vehicle, or other hydrogen utilization systems. Other embodiments of the invention relate to a method that includes interrogating a material, such as a metal hydride, within a hydrogen fuel container, such as a cassette, by applying a signal to the material and detecting a corresponding response. The hydrogen content of the material may be determined based on the interrogation. The determined hydrogen content may be reported to a hydrogen recovery system, a hydrogen powered vehicle, a hydrogen utilization system, or other desired systems.

The probe may serve as an interrogation device for the material. The probe may interrogate the material by applying a signal to the material and detecting a corresponding response. Suitable signals include but are not limited to electrical signals (e.g., voltage, current), magnetic signals (e.g., magnetic field strength), electromagnetic signals (e.g., an x-rays or other electromagnetic radiations), sounds, and ultrasounds. Other detectable physical quantities that may induce a response in the material, such as a response that depends upon the hydrogen content of the material, may also be used. The probe may have one or more portions in contact with the material, or at least proximate the material, to apply a signal to the material and detect a response to the applied signal. The probe may contain a first transponder portion to convert electrical energy into a detectable physical quantity, such as sound, and a second transponder portion to convert response sound into electrical current. The probe may contain conductive metal tips, conductive coils, transducers, sound generators (e.g., speakers), sound detectors (e.g., microphones), or other devices to contact the material and provide interrogating signals. The applied signal may interact with the material in a way that depends upon the particular state of the material. The state of the material may include factors as composition, hydrogen content, microstructure, temperature, pressure, and the like. In some embodiments of the invention electrical or magnetic properties of the material may be used to evaluate the state of the material (e.g., its composition, microstructural features, temperature, etc.). The probe may be contained within the container or the probe may be attached to another system, such as a hydrogen recovery system, a hydrogen powered vehicle, or other hydrogen utilization systems.

In one non-limiting embodiment, an exemplary hydrogen fuel container may contain a probe comprised of one or more conductive coil portions disposed within a material within the container. Electrical signals, such as currents, may be applied to the coils. The impedance of a coil carrying an alternating current proximate a conductive material is modified by the formation of eddy currents in the material. Thus, the material has an affect on the impedance. That is a first impedance may be measured when the material is charged with hydrogen and a second different impedance may be measured when the material is depleted of hydrogen. In addition, variation in the material properties has an affect on the impedance. Any variation inside the material, for example variation in conductivity or permeability, may modify the intensity and course of the eddy currents, and consequently modify the coil impedance. Accordingly, a material may be interrogated with an electric current passed through the one or more coils disposed in the material in order to characterize the hydrogen content of the material via impedance measurements. In the case of multiple coils, the impedance measurements may be averaged or otherwise combined in order to represent different portions of the material in concert.

Of course different probes may be used in other embodiments of the invention. For example, in embodiments of the invention the probe may comprise a first pointed metal tip portion to contact a portion of the material (e.g., to be inserted into the material) and to supply an accurately known electrical signal, such as an electrical current, to the contacted material, and a second pointed metal tip portion proximate the first metal tip portion to receive a response to the signal comprising an accurately known portion of the electrical signal, in a way that depends upon the hydrogen content of the material. The probe may transmit information associated with the response to a desired receiver, such as a hydrogen recovery system. In other embodiments of the invention, the probe may comprise a first sound or ultrasound generator portion to interrogate the material with ultrasound and a second microphone portion to detect a response of the material to the sound or ultrasound.

In still other embodiments of the invention the probe may comprise a sensor. The sensor may respond to one or more physical stimulus associated with the material and transmit a corresponding signal to an intended receiver. Any hydrogen sensor is potentially suitable, such as solid-state film hydrogen sensors. The sensor may detect hydrogen content, chemical activity, electrochemical properties, or other properties of the hydrogen storing material that depend upon hydrogen content.

It is an aspect of embodiments of the invention that the signal be used to interrogate the material to determine a hydrogen content within the material. Many properties of the material may depend upon the hydrogen content including electrical properties, conductivity, resistivity, magnetic properties, density, permeability, porosity, ultrasound propagation, and others. Accordingly, the probe may apply the signal to the material, and determine (e.g., measure) some interaction between the signal and the material, which may depend upon characteristics of the material, such as the hydrogen content of the material, the temperature of the material, and others. Examples of measurements that may be made based on the signal include but are not limited to electrical measurements, conductivity, resistivity, impedance, magnetic measurements, signal propagation, signal decay, and the like. Based on such measurements or response the hydrogen content of the material may be determined. A calibration curve, correlation, or other relationship may be used for this purpose. As an example, a calibration curve may be created, without undue experimentation, by measuring responses of a metal hydride to a signal when the metal hydride has approximately 100%, 80%, 60%, 40%, 20%, 10%, and 0% of its stoichiometric hydrogen content. This predetermined response versus hydrogen content relationship may allow determining unknown hydrogen content of a material by mapping a response known by interrogation to the relationship.

The determined hydrogen content may be used for a number of purposes. In embodiments of the invention the determined hydrogen content may be reported to other systems of interest, such as a hydrogen recovery system, a hydrogen powered vehicle, or a hydrogen utilization system. In the case of a hydrogen powered vehicle, the hydrogen content may be used to display hydrogen inventory VIII. Cassette Distribution The present inventor has discovered systems for safe, efficient, and informed distribution of a hydrogen fuel cassette. During distribution the hydrogen fuel cassette may contain a hydrogen storage or a hydrogen storing material. Systems and methods for distributing cassettes containing hydrogen storing materials and returning depleted cassettes are disclosed in U.S. patent application Ser. Nos. 10/099,274 and 10/099,771 filed on Mar. 15, 2002 by Scott D. Redmond and both entitled "Method And Apparatus For A Hydrogen Fuel Cassette Distribution And Recovery System". Prior to the developments of the inventor there has been no adequate solution for storing, transporting, and distributing large volumes of hydrogen to energy consumers. The cost and logistics of hydrogen fuel distribution and storage have always been significant impediments to the development and proliferation of fuel cells as a viable alternative energy source.

The cassettes may be portable and allow the storage and transportation of hydrogen in a safe to transport, non-pressurized, non-liquid form that complies with all relevant regulations associated with the transport. A cassette may be deposited with a distributor. The cassette may contain either a hydrogen storage material or a hydrogen storing material. In embodiments of the invention a material within a cassette may be identified as a hazardous material. As used herein, hazardous material refers to a material designated by a governmental organization, the United States DOT unless stated otherwise, as being capable of posing an unreasonable risk to health, safety, and property during transportation. Unless otherwise stated, as used herein a hazardous material is one identified in the Hazardous Material Table of 49 CFR 172.101, or otherwise identified as a hazardous material in Title 49 of the Code of Federal Regulations. The lack of hydrogen in the hydrogen storage material, compared to that in the hydrogen storing material, which may allow the cassette to be distributed as a non-hazardous material (e.g., a non-flammable material in the case of metals capable of combining with hydrogen to form metal hydride hydrogen fuel materials) under relevant regulations. The distributor may distribute the cassette to a different location. In the case of a hydrogen storing material the distributor may distribute the cassette to a hydrogen recovery location (e.g., a location of a hydrogen recovery system), or a retail store. Alternatively, in the case of hydrogen storage material the distributor may distribute the cassette to a hydrogen charging location (e.g., a location of a hydrogen charging system), or a retail store. For example, the charging system may be located at a filling station, a grocery store, a home, or the like. The charging system may add hydrogen to the storage material within the cassette to form a hydrogen storing material. After any needed charging, the cassette may be coupled with a hydrogen recovery system, and hydrogen may be recovered from the cassette. The hydrogen recovered from the cassette may be provided to a hydrogen utilization system.

In embodiments of the invention a hydrogen fuel cassette containing a hazardous material may comply with one or more applicable regulations to allow it to be distributed to a desired domestic or foreign destination via a common carrier. The cassettes and the distribution of the cassettes may conform to and be approved and certified to meet safety specifications of governmental organizations such as Department of Transportation (DOT), Federal Aviation Administration (FAA) and/or National Transportation Safety Board (NTSB). Exemplary regulations include the DOT Hazardous Material Regulations in 49 CFR 100-185 (available at the website: www.text-trieve.com/dotrspa/). These regulations are hereby entirely incorporated by reference. These regulations include different standards for different hazardous materials, whether they are explosive, flammable, or non-hazardous. According to embodiments of the invention distribution of the cassettes may meet the containment functions and the codified regulations of 49 CFR 100-185, or some subset thereof (e.g., 49 CFR 100-179 or 49 CFR 171-180, or the Hazardous Material Table of 49 CFR 172.101). For each hazardous material, the Hazardous Material Table lists a shipping name, hazard class or division, identification number, packaging group, label code, any special provision, packaging provisions (exceptions, nonbulk, and bulk), quantity limitations (passenger aircraft/rail, cargo aircraft), vessel stowage (location and other), and other relevant information. There are other regulations for air transport of hazardous materials. Exemplary regulations include International Air Transport Association (IATA) Dangerous Goods Regulations (DGR). These regulations are hereby entirely incorporated by reference. The cassettes may contain hazardous materials and comply with these regulations. In addition, the cassettes may comply with policies or rules of common carriers (e.g., USPS, UPS, FedEx, etc.). The conditions of preparation and packaging under which such materials are acceptable for distribution by the U.S. Postal Service (USPS) are stated in Poster 76 Hazardous Materials, Notice 107 Hazardous Materials, Domestic Mail Manual (DMM), and in Publication 52 Acceptance of Hazardous, Restricted, or Perishable Matter. Conditions applicable to mailing of hazardous materials to foreign addresses are stated in International Mail Manual. These five documents are hereby incorporated entirely by reference. In embodiments of the invention hydrogen fuel cassettes may represent articles which are not outwardly or of their own force dangerous or injurious to life, health, or property, and may have packaging and preparation that conform to the rules and regulations of the U.S. Postal Service, so that the hydrogen fuel cassettes may be transmitted through U.S. Postal Service mail as prescribed under 18 U.S.C. 1716(b).

A cassette may contain a quantity of a hydrogen storage or storing material that meets a quantity limitation codified in Title 49 of the Code of Federal Regulations, or codified in 49 CFR 100-185, or codified in the Hazardous Material Table of 49 CFR 172.101. In embodiments of the invention a hydrogen fuel cassette may contain a quantity of a hazardous material that affords relaxed regulations for distribution. In embodiments of the invention a material within a hydrogen fuel cassette may be distributed as a limited quantity. A limited quantity is a maximum amount of a hazardous material that is exempt from labeling and packaging requirements of Title 49 of the Code of Federal Regulations. In embodiments of the invention a material within a hydrogen fuel cassette may be distributed as an other regulated material (ORM), for example an ORM Class D (ORM-D) material. An ORM-D material is a type of a limited quantity of a hazardous material that presents a limited hazard during transportation due to its form, quantity, and packaging. The quantity of the material within the cassette and the packaging and containment function provided by the cassette may comply with the codified requirements of an ORM material or ORM-D material for distribution. To be distributed as an ORM-D material, a hydrogen fuel cassette may contain an amount of a hydrogen storing material that is not greater than a regulated amount for an appropriate hazard class. As an example, a hydrogen fuel cassette serving as a secure primary receptacle may contain not greater than 1 pound of a flammable solid and may be distributed with domestic mail via surface transportation when packaged in a strong outer packaging with a total weight of 25 pounds or less, with the outer package plainly and durably marked on the address side with "Consumer Commodity", "Surface Mail Only" and "ORM-D" proximate or below the proper shipping name for the matieral. Some hydrogen fuel cassettes may be distributed by air and may have a label that comprises "ORM-D AIR". In the case of many metal hydrides, such as lithium borohydride, lithium aluminum hydride, and others identified in the hazardous materials table, the class may be 4.3, namely flammable solids that are dangerous when wet, and the cassette may provide a water proof container for the material. In embodiments of the invention a material within a hydrogen fuel cassette may be distributed as a consumer commodity. The hydrogen fuel cassette containing the material therein may be classified as a consumer commodity. A consumer commodity is a common type of a limited quantity and ORM-D material. The consumer commodity is a hazardous material that is packaged and distributed in a quantity and form intended or suitable for retail sale through retail sales agencies or instrumentalities and designed for consumption by individuals for purposes of personal care or household use.

In embodiments, the cassette may be considered a material of trade (MOT) that may be carried on board a motor vehicle, during distribution, use, or both. This may allow the cassette for example to be distributed and to be used to power a hydrogen powered vehicle (e.g., be vehicular auxiliary equipment). The size of this container, by regulation, may be not exceed 8 gallons of consumer commodity materials and aggregate gross weight may be not exceed 440 pounds.

The cassette may contain labels, for example designating its contents and handling instructions. As is known in the arts the information provided on the label may depend upon the hazards posed by the material (e.g., ORM-D materials have relaxed labeling requirements). The cassettes may be distributed with readily available shipping papers (including e.g., proper shipping name as listed in the hazardous material table or other identification of the material, a hazard class, an identification number (UN or NA), a packing group identification, a total quantity of the material, a certification statement (e.g., "I hereby declare that the contents of this consignment are fully and accurately described above by proper shipping name and are classified, packed, marked, labeled/placarded, and are in all respects in proper condition for transport according to applicable international and national governmental regulations"), marking/labeling (e.g., including each hazard class of the material), placecards, and in suitable packaging.

The cassette may have a maximum internal pressure not greater than ten atmospheres so that in the event of an unintended over-pressuring the cassette does not explode at a high pressure. The cassette may be puncture resistant to avoid puncturing during distribution and use and potentially introducing air or other materials into the cassette. The cassette may be insulated to sufficiently reduce entry of heat during distribution. The insulation may be sufficient to avoid generating an unacceptable pressure of hydrogen gas when the cassette is subjected to a standard test protocol of the common carrier, for example if the cassette is exposed to heat from the sun for a predetermined period of time, or exposed to a predetermined externally applied heat for a predetermined period of time. The cassette may have a size, shape, weight, and other characteristics that are sufficient to allow distribution by one or more common carriers. For example, the cassettes may have a moderate size and weight that allows them to be easily carried and a standard shape that facilitates stacking and efficient packing in a distribution vehicle. In one aspect, the cassette housing may be performance oriented packaging for the material within the cassette, so that a material within the cassette that is classified as hazardous may be distributed either without additional outer packaging, or with additional outer performance oriented packaging enclosing the cassette during distribution (e.g., the cassette is mailed in an ordinary FedEx envelope). The cassette housing may comprise performance oriented packaging sufficient to allow the hydrogen fuel cassette to be distributed as a limited quantity, other regulated material, consumer commodity, or material of trade. The cassette housing in such case may comply with standards of the United Nations recommendations on the transport of dangerous goods. In one aspect, the cassette housing contains a certification identifying that he cassette complies with these provisions. The cassette may also be able to sense or monitor its status, for example its temperature and pressure, and may be able to report these conditions to the distributor with a cassette communication system, such as a telemetry device.

In embodiments of the invention a hydrogen fuel cassette may be contained within one or more packages during distribution by a common carrier. In some embodiments of the invention, the cassette may be added to a secondary package and the secondary package may be added to an outer package. The secondary package may provide additional protection and safety during distribution of the cassette. The outer package may contain cushioning and perhaps hydrogen absorbent material. The outer packaging may contain address and marking information consistent with regulations by DOT and others. In other embodiments of the invention, the cassette may be added to an outer package without first being added to a secondary package. As discussed above, in embodiments of the invention, the cassette housing may comprise performance oriented packaging for a hazardous material that allows the hazardous material to be distributed by a common carrier as a limited quantity, ORM, consumer commodity, or other material with eased restrictions governing distribution. Alternatively, the secondary or outer package may comprise such performance oriented packaging.

In certain embodiments of the invention, a cassette containing a hydrogen storing material may be distributed using standard shipping methods and commercial services offered by a common carrier. As used herein, the term common carrier will be used to refer to a business or agency that is available to the public for transportation of goods or freight. Hydrogen fuel cassettes may be transported by air transportation and surface transportation. Air transportation is common for First-Class mail, Priority Mail, and Express Mail delivery. Surface transportation is common for Standard Mail or Package Services delivery. Non-limiting examples of common carriers include among others air carriers (e.g., Delta, Flying Tigers), full-truckload carriers (e.g., Hunt, Schneider), less-than-truckload carriers (e.g., Consolidated Freightways, Roadway, Yellow), ocean carriers (e.g., American President Lines, SeaLand), parcel/express carriers (e.g., U.S. Postal Service, United Parcel Service (UPS), Federal Express (FedEx), DHL Worldwide Express, Airborne), and rail carriers (e.g., Norfolk Southern). In some instances, the cassettes may be designed so that they are classified as non-hazardous under the pertinent regulations, for example by placing limits on the amount of material, the maximum pressure in the cassette, and the like, so that the cassettes may be distributed by the common carrier as a non-hazardous material, for example by the U.S. Postal Service along with normal mail.

Figure 16:
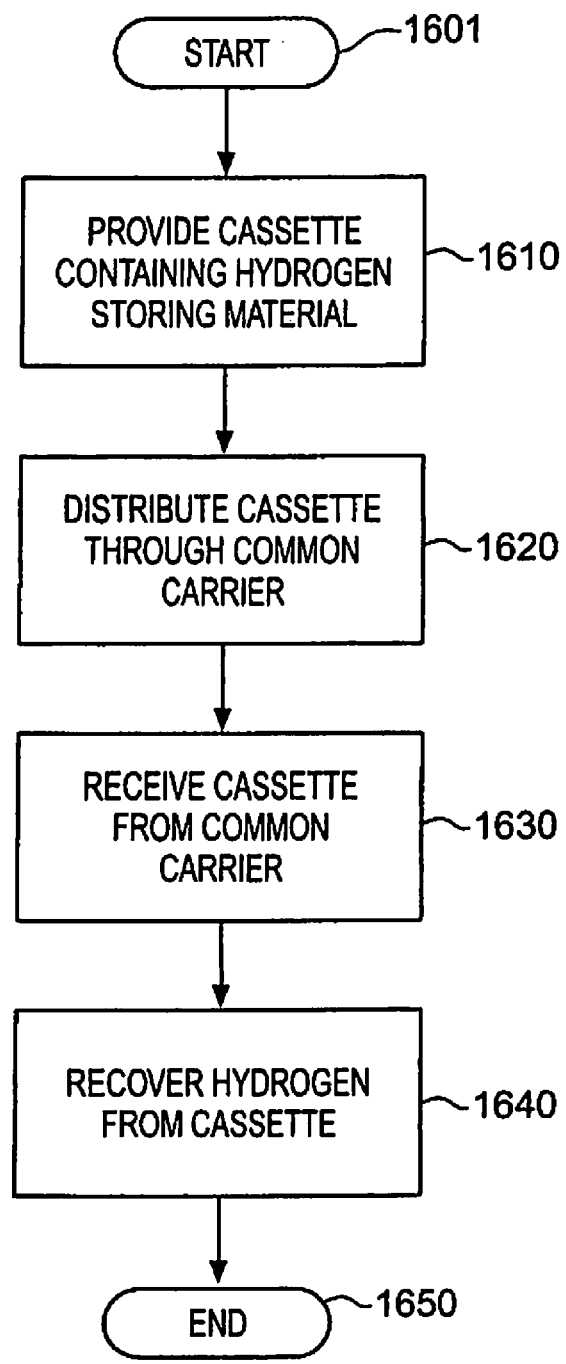
FIG. 16 shows a method for distributing a cassette through a common carrier, according to embodiments of the invention.

FIG. 16 shows a method for distributing a cassette through a common carrier, according to embodiments of the invention. After initiating at block 1601, a cassette containing a hydrogen storing material is provided at block 1610, for example from an inventory. The cassette is distributed through a common carrier at block 1620. This may include adding the cassette to a package or other container of the common carrier for distribution by the common carrier. For example, the cassette containing the hydrogen storing material may be inserted into a FedEx envelope, a box marked for delivery, other container, and sealed. The common carrier may deliver the cassette in the package or container by conventional ways, in one embodiment as a non-hazardous material, and in another embodiment as and with standard normal parcels or mail. The cassette may be received in the package or container at the hydrogen recovery unit at block 1630. The package may bear a mark indicating it was distributed or delivered by the common carrier. As used herein, the term mark will be used to designate any text, graphic, or other indication that a package containing a cassette has been distributed. For example, the U.S. Postal Service may affix a postmark to the package or a stamp thereof indicating that the package and its contents have been delivered through the mail. The postmark may include a cancellation of a stamp with a post office and date the package was mailed, although this is not required. The user may open the package, remove the cassette from the package, inserting the cassette into a hydrogen recovery system; and recover hydrogen from the cassette at block 1640. The method may terminate at block 1650.

In embodiments of the invention a cassette may be distributed by a common carrier without being enclosed in an outer container, package, or envelope, according to embodiments of the invention. The cassette may have a material contained therein, a label location, and a postage location. The material may comprise a hydrogen storage material or a hydrogen storing material. The cassette may represent performance oriented packaging for the material contained therein that satisfies the codified containment requirements of applicable governmental and common carrier regulations to allow the material within the cassette to be distributed by the common carrier without external packaging or containers. The cassette may be classified as ORM-D material, or another material recognized as posing a sufficiently minor hazard that it qualifies for relaxed transportation regulations.

The cassette housing may be rigid or flexible. In embodiments of the invention a flexible cassette housing may be desired. For example, impact with a pointed object may be less likely to puncture a material that may conform. Also, the flexible material may contain less material, in general, than a rigid material, and may help to reduce manufacturing costs. The flexible housing may comprise a flexible, protective, hydrogen fuel cassette envelope that may be manufactured cost effectively and may provide protection to the hydrogen storing material therein during distribution. The flexible cassette housing may comply with pertinent transportation regulations to allow a hydrogen storing material, such as glass microspheres, metal hydrides, sodium alanate, metal hydride nanoparticles, and the like to be distributed via USPS, FedEx, UPS, or other common carriers. The flexible cassette, or protective envelope, may comprise one or more flexible layers. One or more layers may provide puncture protection and thermal protection to a material contained within the one or more layers. The layers may protect the material from exposure to the environment, including exposure to water, and exposure to heat. A layer may provide thermal reflectivity and/or thermal insulation. The one or more layers may comprise materials such as foil, metal foil, plastic foil, Mylar™, Kevlar™, metallized fabric, SpectraFabric™ antiballistic woven mesh fabric or similar robust yet lightweight thin skin or sheath housing, or others.

In embodiments of the invention, the flexible cassette may contain an inner layer of a flexible metal, plastic, or metallized plastic material, an intermediate gas space, and an outer layer of a flexible metal, plastic, or metallized plastic material. The outer layer may provide puncture protection. The intermediate gas space may contain a gas and may provide cushioning as well as thermal insulation. The gas space may contain a spacing material, such as a foam, packing, air filled plastic bubbles, and a gas within the spacing material. The gas may be an inert gas, such as nitrogen or argon, or else the gas may be air, oxygen, or the like. The inner layer may provide material compatibility to the hydrogen storing material and hydrogen that may be contained within the cassette. In the case of metal hydrides and other thermally sensitive hydrogen storing materials, the outer layer, the inner layer, or both, may be thermally reflective in order to thermally protect or shield the material within the cassette from the surrounding environment. In one particular embodiment of the invention, the flexible cassette may contain an innermost thermally reflective flexible layer, an insulation layer (e.g., Mylar™) outside the thermally reflective layer, a puncture resistant (e.g., Kevlar™) layer outside the insulating layer, a nitrogen filled plastic bubble spacing material outside the puncture resistant layer, and a second puncture resistant (e.g., Kevlar™) layer outside the spacing material. In one instance, the cassette may be an A2 size cassette having one or more internal compartments that collectively hold approximately 1 liter of hydrogen storage material, of course this is not required.

Of course, the cassette may have other features and components as described elsewhere herein. For example, the cassette may contain a heating system, an internal electrical resistance heater, an opening to allow insertion of a heating element, a sensor, a temperature sensor, a pressure sensor, an electrical contact to an external system, an electrical outlet, an opening of the cassette to allow hydrogen to leave the cassette, a hydrogen flow regulator, a valve, an electronic device, a microelectronic device, a microelectronic device with a memory to store information, a microelectronic device with communication capability, a telemetry device, or other desired components.

Such a cassette may be distributed via a common carrier. Label information may be added to the cassette. In one aspect, the cassette may contain a label attachment location where a label may be attached. A user may fill out a label with appropriate information. The label may represent paper, such as is conventionally used in package mailing, having fields where customer, address, and delivery information may be entered. The label may contain an adhesive or adhesive strip on its backside that may be used to attach the label to the label attachment location. Glue, or other fasteners may also be used to attach the label. In another aspect, the cassette may contain a label entry location where label information may be written plainly and durably on the cassette housing. The label entry location may comprise a material on the external surface of the cassette housing for receiving and durably supporting ink, pencil, or the like. Suitable materials include those commonly used for the signature block on the backside of credit cards.

The cassette may contain postage or a postage attachment location. The postage represents a fee for postal service associated with delivery. Non-limiting examples of postage include an adhesive stamp, printed indicia, meter strip, and other representations of postal fees. The postage may be attached at a postage location on the outside of the cassette. For example, an adhesive stamp may be attached to the outside of the cassette at the postage attachment location. Alternatively, the cassette may contain text, printing, painting, markings, decorations, or other indicia of postage on its outside. For example, the cassette may have painting similar to the painting on a FedEx envelope, a USPS Express Mail envelope, or decorations similar to those displayed on other conventional common carrier packaging. These indicia may allow a common carrier to recognize the cassette and may represent postage sufficient to allow distribution of the cassette. In embodiments of the invention, the cassette may have a flat rate for delivery. This may allow the cassette to be distributed for a fixed rate in a hydrogen charged or hydrogen depleted state.

After adding a label to the cassette and providing any needed postage, the cassette may be deposited with a common carrier. The common carrier may distribute the cassette in conventional ways, using conventional distribution infrastructure. The cassette may be received from the common carrier at its intended destination location. The intended destination may comprise a retail location, a hydrogen utilization location (e.g., a home or business), or other locations. The cassette may bear a mark indicating it was distributed or delivered by the common carrier. The mark may indicate that the cassette has been distributed. A user may couple the cassette with a hydrogen recovery system and begin to recover hydrogen from the cassette. After the cassette has been depleted of hydrogen, the cassette may be returned via the common carrier, as desired.

Accordingly, in certain embodiments, a compact cassette may contain a safe, non-pressurized, non-liquid hydrogen storing material and may be transported via mail services anywhere in the world as non-hazardous material. These technologies make it convenient, safe and cost effective for a parcel delivery company or other common carrier to distribute and deliver fuel to a end-user location, for example door-to-door. This is a significant advantage over prior art ways of storing hydrogen fuel, often as a liquid or pressurized gas, which may not be transported as non-hazardous materials by a common carrier. Such distribution may help overcome many of the prior art problems associated with the unsafe and costly distribution of hydrogen and may help promote the use of hydrogen for fuel. Thus, embodiments of the invention enable the widespread distribution of cassettes containing hydrogen storing material using inexpensive and currently available conventional package delivery infrastructure. It is estimated that hydrogen fuel may be distributed in cassettes of the invention at costs that are significantly less than those associated with pressurized hydrogen tank distribution. Of course, distribution through a common carrier is not required, and in alternate embodiments of the invention, any other method of providing charged cassettes may potentially be used. For example, in various embodiments, cassettes containing hydrogen storing materials may be distributed through existing service stations, gasoline stations, specialized hydrogen refueling stations, distribution centers, and/or commercial wholesale or retail outlets.

IX. Hydrogen Network

According to some embodiments of the invention a hydrogen management network may be used to manage tasks associated with storing, distributing, and recovering hydrogen. The network may comprise a hydrogen network management software system and a plurality of networked components coupled to the network. Cassettes, distributors (e.g., common carriers), hydrogen recovery systems, hydrogen utilization systems, and systems and environments in which the hydrogen utilization systems are employed, or any subset thereof, may be connected with the network, and each of these components may provide and/or receive information in order to implement a variety of business methods associated with storing, distributing, and recovering hydrogen. The software may receive and aggregate information from remote geographically dispersed cassettes, hydrogen recovery systems, hydrogen utilizing systems, and their environments in order to manage various aspects of hydrogen storage, distribution, and recovery. As one example, the software may manage the flow of hydrogen containing cassettes to a hydrogen consumer, for example by managing the distribution by a common carrier. It will be appreciated by a person having an ordinary level of skill in the art and the benefit of the present disclosure that the network may utilize conventional data network infrastructures and devices, including computer systems, servers, network software, and the like. These conventional data network infrastructures, devices, and software will not be discussed in detail in order to avoid obscuring the concepts of the invention.

Figure 17:
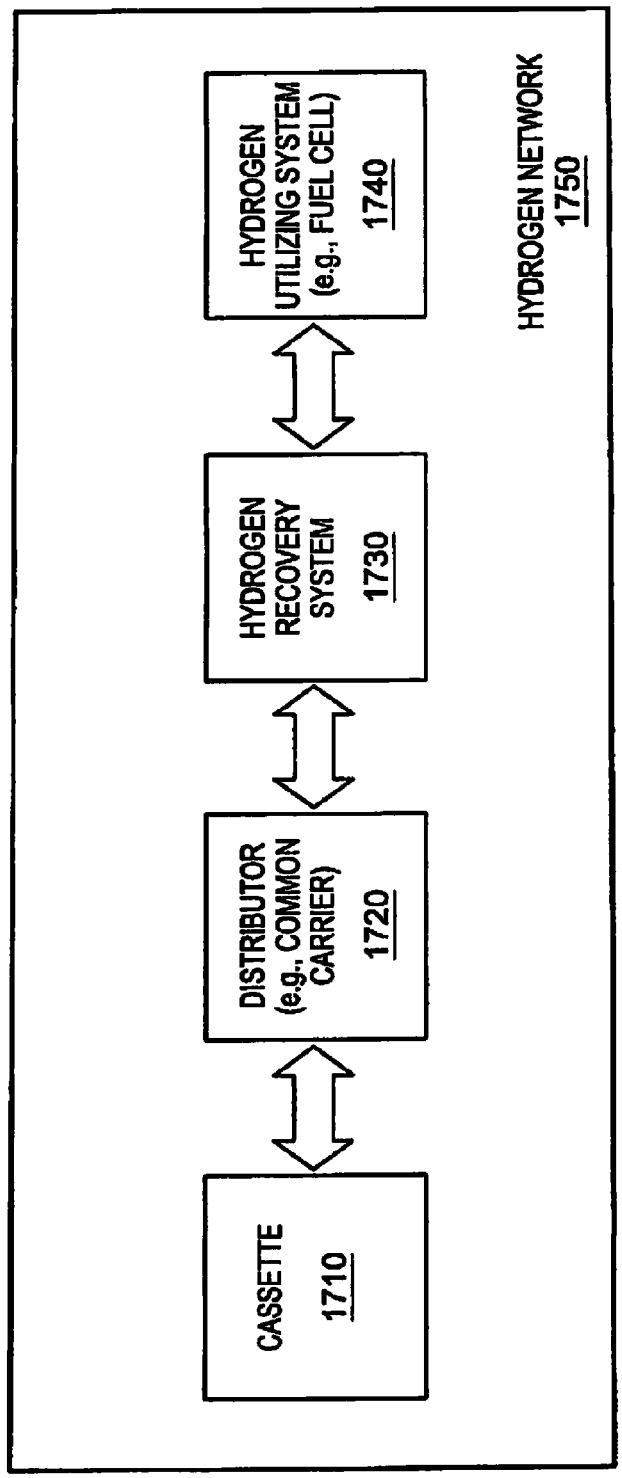
FIG. 17 shows a cassette, a distributor such as a common carrier, a hydrogen recovery system, and a hydrogen utilization system contained in an operating within a hydrogen network, according to embodiments of the invention.

FIG. 17 shows a cassette 1710, a distributor such as a common carrier 1720, a hydrogen recovery system 1730, and a hydrogen utilization system 1740 contained in an operating within a hydrogen network 1750, according to embodiments of the invention. The cassette and the hydrogen recovery system may have features as previously described and may additionally contain other features that are described in more detail below that allow them to participate in the network. The cassette may retain and communicate information associated with its unique identification, present location, distribution information, present status or conditions (e.g., hydrogen inventory, temperature, pressure, etc.), and other information. The recovery system may also retain some or all of this information along with recovery information, utilization information, network access information, hydrogen inventory sufficiency information, and the like. The network may exchange information with one or more of the cassette, the recovery system, the utilization system, and the distributor. As one example, the recovery system may receive information from the cassette and communicate the information to the network. The recovery system may communicate a request for a cassette, which as used herein will be regarded as one embodiment of hydrogen inventory sufficiency information, to the network. The network may arrange for the distributor or common carrier to distribute the cassette based on network information, such as the hydrogen inventory sufficiency information obtained from the remote hydrogen system and delivery information maintained by the network.

In some embodiments of the present invention, the hydrogen recovery system may connect to the network autonomously meaning that it may be capable by way of instructions or software to independently and without the need of outside control by an operator connect to the network and for example provide information or order a cassette. In this way, the recovery system may, based on hydrogen inventory sufficiency information, govern its hydrogen supply. In this way, the system may be self-reliant or self-directed in order to reduce demands on operators or users. Of course the user or operator may play some role, such as entering connection preferences, entering connection times, schedules, or otherwise configuring the system to act autonomously.

Figure 18:
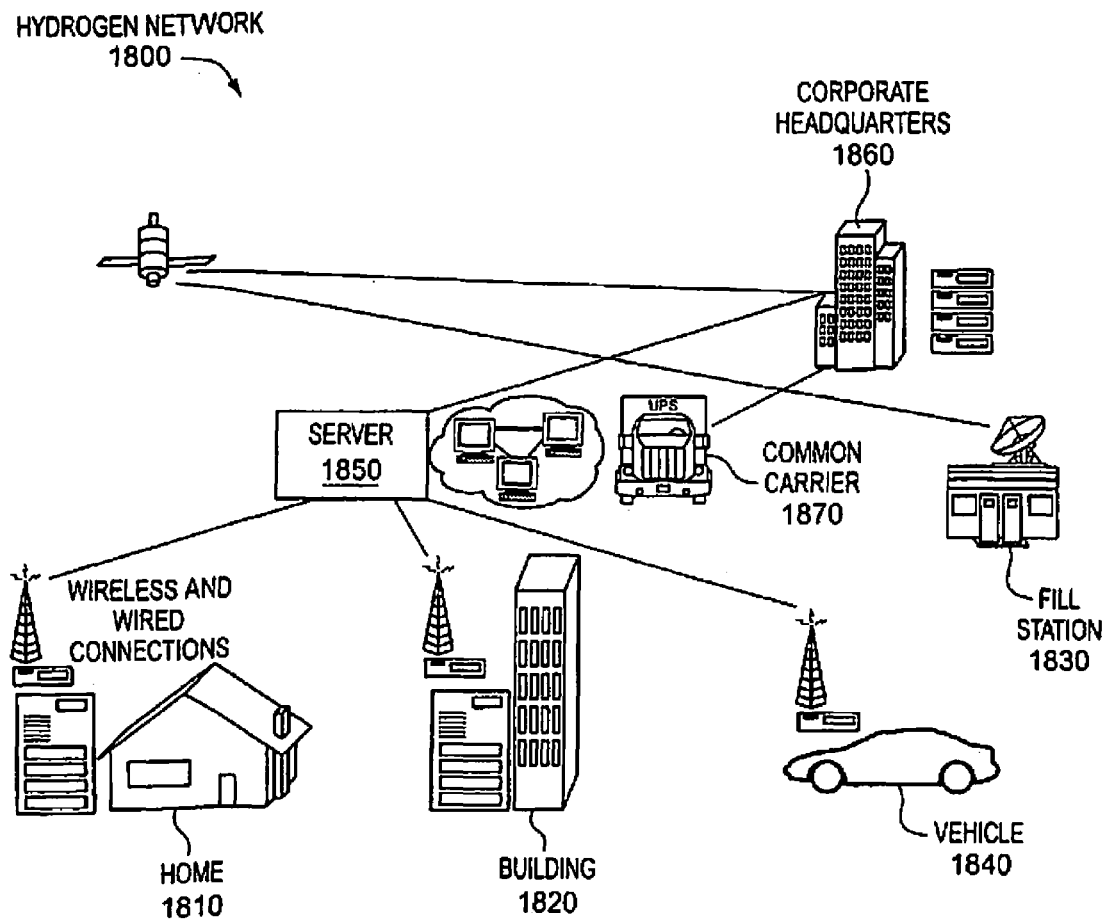
FIG. 18 shows a hydrogen network containing stationary and mobile hydrogen recovery systems equipped with communication devices to transmit relevant information to a network management system, according to embodiments of the invention.

FIG. 18 shows a hydrogen network 1800 containing stationary and mobile hydrogen recovery systems equipped with communication devices to transmit relevant information to a network management system, according to embodiments of the invention. Stationary hydrogen recovery systems at a home 1810, a building 1820, and a filing station 1830, and a mobile hydrogen recovery system in a vehicle 1840 may each contain wired or wireless communication devices to convey hydrogen fuel cassette information to a World Wide Web server computer system 1850 using various known and conventional data communication techniques. In embodiments the communication systems may contain memory and telemetry devices. The telemetetry device may be a conventional electrical device for transmitting data by radio or otherwise. Information from these network components may be aggregated by the server and communicated to and utilized by a corporate central management facility or software 1860 that manages the overall hydrogen network. For example, this aggregated information, alogn with other fuel distribution related information (e.g., production, inventory, etc.) may be used to efficiently dispatch and control delivery and manage inventory of cassettes throughout a fuel distribution network. As an example, distribution through a common carrier 1870 such as UPS may be managed through a network.

Figure 19:
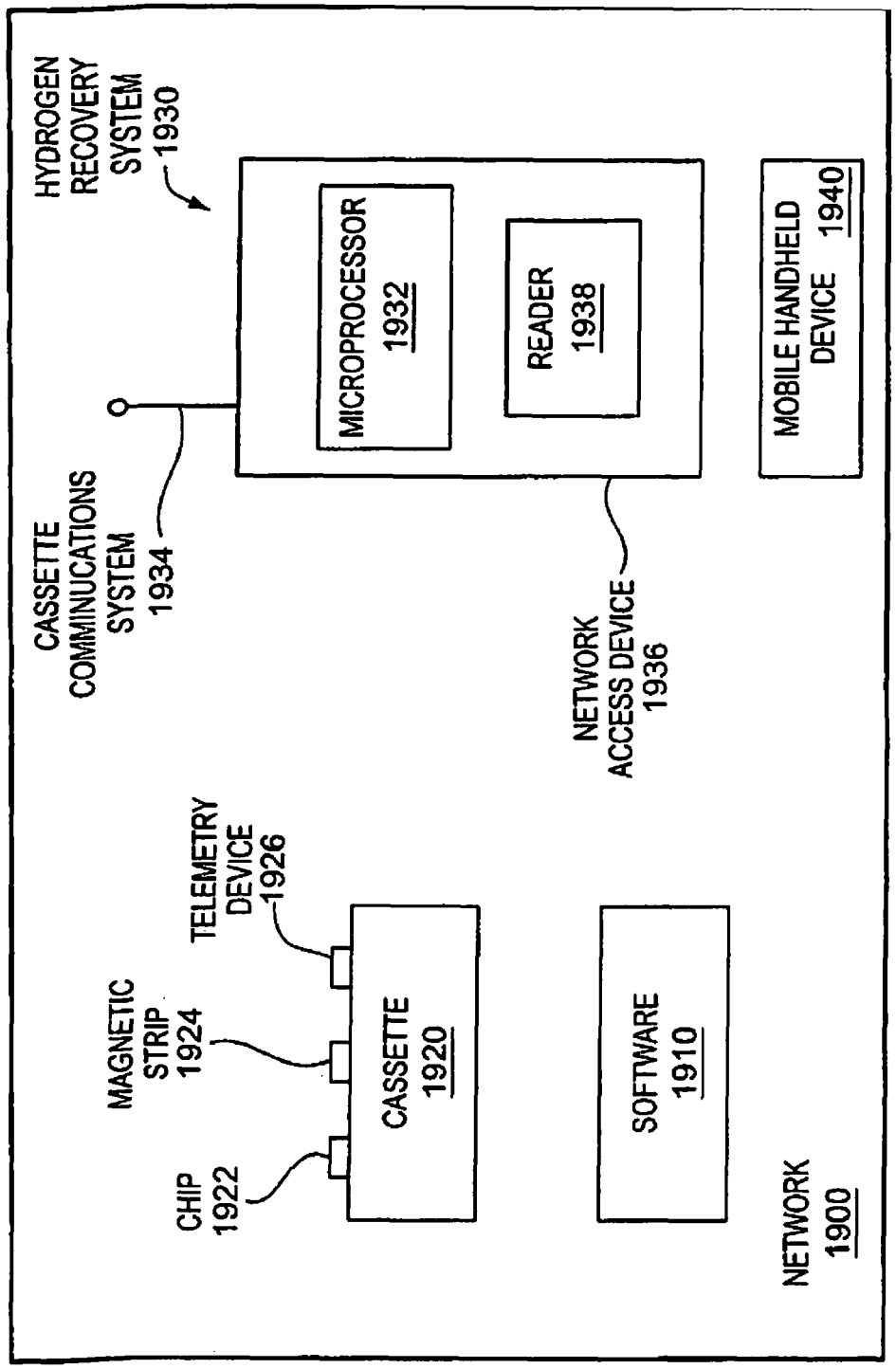
FIG. 19 shows a network containing hydrogen network management software system, a cassette, a hydrogen recovery system, and a mobile handheld device, according to embodiments of the invention.

FIG. 19 shows a network 1900 containing hydrogen network management software system 1910, a cassette 1920, a hydrogen recovery system 1930, and a mobile handheld device 1940. The cassette and the hydrogen recovery system may both contain information storage and communication systems in order to allow them to store, potentially process, and communicate information with the network. In one embodiment of the invention, the cassettes information storage system includes a chip 1922 and a magnetic strip 1924, the cassettes communication system includes a telemetry device 1926, the recovery systems information storage system includes a microprocessor 1932, and the recovery systems communication system includes an antenna 1934 to receive telemetry signals from the cassette, a network access device 1936 (e.g., a modem, telephone jack, and telephone line to access the hydrogen network), and an infrared reader 1938 to communicate with the mobile handheld device.

The cassettes information storage system may include any conventional device to store and/or process information, such as a microelectronic device. The microelectronic device may be a chip or integrated circuit. Virtually any type of information associated with hydrogen storage, distribution, or recovery may be stored and/or processed by the microelectronic device. Non-limiting examples of information include cassette information, type of cassette, version number, production batch, production number, hydrogen storage information, hydrogen storage material, hydrogen content, initial hydrogen content, current hydrogen content, date, source identification data, distribution information, distribution address, distributor identification, distribution date, hydrogen recovery information, hydrogen recovery system identification, and other information associated with storage, distribution, or recovery of hydrogen. In one embodiment, a microelectronic device such as an integrated circuit may be used to store and/or process information. Electronic devices suitable to store information include electronic memory devices, solid-state memory devices, PROM (programmable read-only memory), EEPROM (electrically erasable programmable read-only memory), flash memory, and others. Microelectronic devices suitable to store and process information include microprocessor integrated circuits, application specific integrated circuits (ASICs), and others. These electronic devices are commercially available from numerous sources including 3COM, AVL Technologies Corporation, Hewlett-Packard, Hitachi, IBM Corporation, NEC, Samsung Corporation and many others. The information storage electrical device may be affixed to the cassette housing, embedded within the housing, or contained within the cassette, as desired. In one embodiment, a cassette may contain one or more integrated circuits similar to those found on smart card credit cards. In another embodiment, the cassette may contain a smart card from Lexar Media of Fremont, Calif., or an equivalent card. These integrated circuits have both memory capabilities, for example to store data associated with the user, and processing capabilities, for example to generate encryption parameters. In one embodiment of the invention, the information storage electrical device may have exposed contacts that may electrically couple with corresponding contacts on a hydrogen recovery system when the cassette is properly inserted so that the recovery system may read and potentially store data on the microelectronic device. In some embodiments, the cassette may also include other types of information storage devices, such as bar codes, or magnetic strips, to store information in a machine-readable format. These devices are often affixed to the outside of the cassette housing so that they may be accessed by an appropriate reader. Of course, such devices are optional, and the information may alternatively be stored in the electrical storage device. The microelectronic device on the newly fabricated cassette may be programmed and read and related information transferred to a management database. The cassette may be logged as inventory and queued for distribution as needed.

The cassettes communication system may include any conventional communication device to communicate or transmit information. The communication device may be incorporated with or electrically connected with the previously described information storage system or electrical device to receive information. Virtually any information may potentially be conveyed to the communication device and transmitted, including information associated with the cassette, information stored in an microelectronic device, information obtained from a sensor, and other information. Conventional communication devices such as telemetry devices, radio frequency transmitters, radio transceiver circuits, and others are suitable. As an example, information stored in the microelectronic device may be conveyed to a radio frequency transmitter and transmitted to a proximate hydrogen recovery system, or another system, which does not have a direct electrical connection to the microelectronic device. Alternatively, the cassette may contain one or more wires, electrical leads or other electrical contacts that attach the microelectronic device and any other internal electrical components (e.g., electrical heating element) to an electrical connector on the other system. The cassette may use the communication device to communicate relevant information to a proximate hydrogen recovery system, a hydrogen utilizing system (e.g., a fuel cell), a system or environment in which a hydrogen utilizing system is employed (e.g., a vehicle, or a filing station environment), to a hydrogen network management system, or any combination. Additionally, in one embodiment of the invention, the cassette provides information to a hydrogen recovery unit that in turn provides information to a hydrogen network management system thus allowing information associated with a cassette to be sent remotely to the hydrogen network management system and combined with other system information.

The hydrogen recovery systems information storage system may include various conventional electrical storage devices including but not limited to those discussed for the cassette. Often, the information storage system may include a microprocessor to store and process data. The information storage system may be used to store information received from a cassette or the hydrogen network. In one embodiment of the invention, upon receiving a cassette, an operator may scan a bar code or magnetic strip of the cassette to enter information stored thereon into the information storage system of the hydrogen recovery unit. This information may include information identifying the cassette and the amount of hydrogen stored therein. Next, the cassette may be inserted into the hydrogen recovery system.

The hydrogen recovery systems communication system may include an appropriate receiver to receive a transmission from the communication system of the cassette. For example, the communication system may include a telemetry receiver to receive information sent wirelessly from a telemetry device of the cassette. As another example, the communication system may include an antenna to receive a radio frequency transmission from a cassette. At some point, the hydrogen recovery system may begin receiving information from the communication system of the cassette and may store the information in its information storage system. The hydrogen recovery system may alternatively directly access and read information from the cassettes information storage system. The communication system may also contain a network access device to access the hydrogen network. One example of a network access device includes a mem-tel device, a phone line or other data link, and appropriate software to access the Internet or another network and exchange information with a network information source or server. The communication system may also contain an infrared reader to read infrared signals from remote or mobile handheld computing devices, such as a personal digital assistants, IPAQ, palm and similar handheld computers, which may be used by an operator to interact with the hydrogen recovery system. This may allow a user to be their own "gas reader" and to interface with software on those devices for planning, management, billing and interaction with the network software.

In addition to receiving information from cassettes and hydrogen recovery units, the hydrogen network may also receive information related to the fabrication or creation of new sets of each fuel cassette. Information related to raw materials and the fabrication of raw materials into core fuel goods may be conveyed to the software. Further, the management software may receive information related to the core material inserted into cassettes and ready for distribution in inventory. In this manner, the management software may retain information related to sets of fuel cassettes in inventory and ready for use by consumers. Additionally, the management software may also receive and/or convey information between web and Internet data sources or other customer or supplier information sources.

The cassettes in inventory may be consumed by consumers through various channels. Consumers may explicitly order cassettes by phone (e.g., a 1-800 telephone number), the Internet (e.g., an interne accessible website), or other conventional direct order techniques. In some embodiments, the ordered cassettes may be distributed by small parcel common carriers. A hydrogen network management software system may manage one or more aspects of cassette distribution, through common carriers or otherwise. Additionally, consumers may order or obtain cassettes via conventional filling stations.

In certain embodiments of the invention a hydrogen system (e.g., a cassette, a hydrogen recovery system, a hydrogen utilization system, or some combination) may automatically convey information to the management software that allows the software to order a replacement cassette and potentially manage the distribution of the cassette through a common carrier. In this way, a hydrogen user may receive a cassette containing a hydrogen storing material before the cassette is needed, based on an automatic exchange of information between a hydrogen system associated with the user and a management system of the network, so that the hydrogen system may automatically maintain a sufficient hydrogen inventory for operation.

Figure 20:
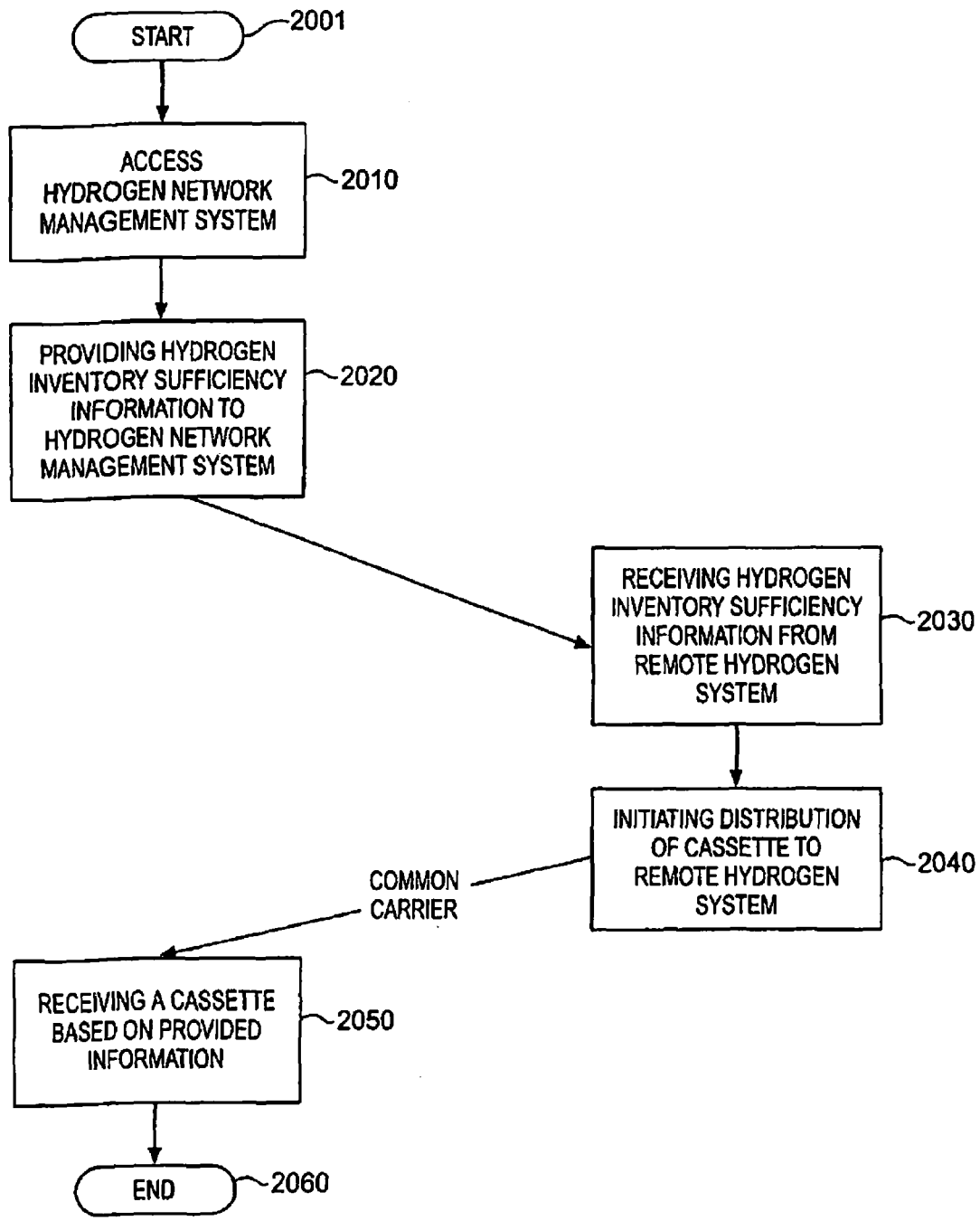
FIG. 20 shows a method for receiving a hydrogen fuel cassette containing a hydrogen storing material based on hydrogen inventory sufficiency information provided to a hydrogen network, according to embodiments of the invention.

FIG. 20 shows a method for receiving a hydrogen fuel cassette containing a hydrogen storing material based on hydrogen inventory sufficiency information provided to a hydrogen network, according to embodiments of the invention. After initiating at block 2001, a plurality of remote hydrogen systems may use conventional network access devices to access a hydrogen network management system at block 2010. The remote hydrogen systems may be cassettes, hydrogen recovery systems, hydrogen utilization systems, hydrogen cassette distribution centers, some combination, or other hydrogen systems. The hydrogen system may monitor the hydrogen inventory in one or more available cassettes. Sensors, hydrogen flow meters, energy meters, and other conventional devices may be used to monitor the hydrogen inventory. The hydrogen systems each provide hydrogen inventory sufficiency information to the network at block 2020. The hydrogen inventory sufficiency information may contain any information that indicates the quantity of hydrogen available to the remote hydrogen system and whether this quantity is adequate or inadequate to meet the existing or anticipated needs. Non-limiting examples of hydrogen inventory sufficiency information include information constituting a request for a cassette (e.g., an explicit request, or information indicating an existing cassette is almost depleted), information constituting a decline of a cassette (e.g., an explicit decline, or information indicating an existing cassette is almost fully charged, or information indicating a new cassette has been received), information constituting an increase in hydrogen utilization, information constituting a decrease in hydrogen utilization, or many others that will be apparent to a person having an ordinary level of skill in the art and the benefit of the present disclosure. Accordingly, in some instances the hydrogen system may automatically convey cassette ordering information to the hydrogen management network software system via its communication device. This may allow the hydrogen network to oversee distribution of cassettes based on demand or responsiveness to hydrogen recovery or utilization loads.

The hydrogen network management system may receive the hydrogen inventory sufficiency information from each of the remote hydrogen systems at block 2030 and may take appropriate action based on the received information. The hydrogen network management system may carry out a number of business methods associated with storing, distributing, and recovering hydrogen. In one embodiment of the invention, the management system may initiate the distribution of a cassette to the remote hydrogen system at block 2040. For example, the software may interface with an inventory system to place an order for a cassette, contact a common carrier, arrange for the common carrier to pick up the cassette and distribute the cassette to the remote hydrogen system, notifying the remote hydrogen system that the cassette is to be distributed to the remote hydrogen system on a particular day, and monitor the distribution of the cassette. Accordingly, in one embodiment a common carrier may distribute the hydrogen fuel cassette to the remote hydrogen system based on the initiation from the hydrogen network management system. The hydrogen system may receive the cassette based on the earlier provided hydrogen inventory sufficiency information at block 2050.

Accordingly, at least in some embodiments, network components, such as a cassette, a hydrogen recovery unit, or a hydrogen utilizing system, may automatically communicate with the network. Additionally, the network components working alone or in combination may automatically order a new cassette from the network so that the user does not need to explicitly order a new cassette when supplies of hydrogen have been exhausted. Of course, the ability for the network component to automatically communicate with the network and order a cassette is optional. In alternate embodiments, it may be possible for the user to configure the network components so that these features are enabled or disabled, as desired.

Of course, the network offers a number of other business methods and advantages that will be apparent to a person having an ordinary level of skill in the arts and the benefit of the present disclosure. In various embodiments of the present invention, the network may assist with or perform advanced planning and systems integration, shipping of cassettes to consumers, wireless communication of information with consumers, enterprise resource planning of cassette manufacturing and raw materials inventories, enterprise cassette shipping and inventory management, and energy exchange or trade between network participants.

Figure 21:
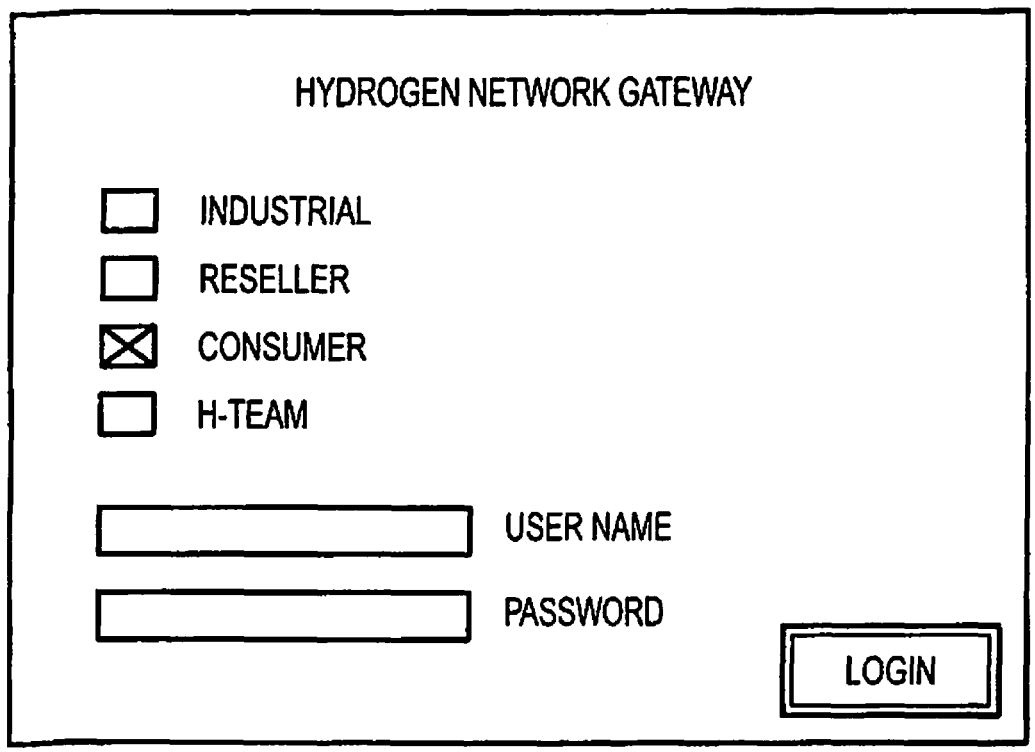
FIG. 21 shows a conventional HTML format web page that may be presented to a user attempting to connect to a hydrogen network, according to embodiments of the invention.

The hydrogen network may allow a user to access the network with a suitable network access device and utilize a variety of functions supported by the network such as receiving information, or affecting the ordering or distribution of cassettes. FIGS. 21-22 show conventional HTML format web pages, according to embodiments of the invention, which may be presented to a user that accesses the hydrogen network with a browser equipped network access device. The particular web pages shown are typical of those expected for a desktop or laptop personal computer, although similar interfaces are available for other suitable network access devices such as personal digital assistants, Palm, iPAQ, cell phones, and the like. Additionally, well-known interfaces other than HTML web pages may also be used.

Initially, upon accessing the hydrogen network gateway, the user may be presented the web page shown in FIG. 21. The user may select to enter one of the access groups, Industrial, Reseller, Consumer, or H-Team. Each of these groups may have different functions. In this particular case, the user has elected to enter the Consumer group and may enter a username and password created during registration.

Once logged into the network, the user may be presented the web page 2200 shown in FIG. 22. At this point, the network may present virtually any information associated with hydrogen storage, distribution, and recovery that is desired to be stored within the hydrogen network in a particular implementation. In the particular web page shown, the user is presented a greeting and is informed of relevant news, such as next scheduled reload, maintenance, and cleaning schedules for various of the users hydrogen recovery systems or "units". The user is also presented with a number of options to check daily usage, check monthly usage, expedite energy delivery, delay energy delivery, produce printable charts, offer overflow energy for sale, produce detailed reports for lab unit, home unit, BMW 7451 unit, access education resources, access today's information, as well as a number of other options. The user may also obtain cassette reload status, time and date of next cassette reload, current hydrogen capacity, and other information for a particular hydrogen system.

In another embodiment, a user may access the hydrogen network with a network access device and manage various aspects of hydrogen storage, distribution, or recovery. In one embodiment of the invention, it is contemplated that a user may access the network from a mobile network access device enabled with a geographic positioning system (GPS) and provide geographic location data to the network and request and receive a location of a cassette supplier. For example, the user may order a cassette, select a particular distributor, select a speed or rate of delivery, allow distributors and users to track an order, allow a user to pay a bill, allow a user to pre-order a cassette, and other functions. Many other functionalities are contemplated.

It will be appreciated that there is a symbiosis in combining distribution information from a hydrogen network with distribution through a common carrier. The network may automatically gather cassette distribution information from the components of the network, for example recovery systems, and provide automatic targeted distribution of cassettes to a particular end user location through the common carrier, who may also be part of the network. This represents an efficient approach for delivering cassettes on demand with little or no time commitments from the user.

X. Exemplary Use in Hydrogen Powered Vehicles

Figure 23:
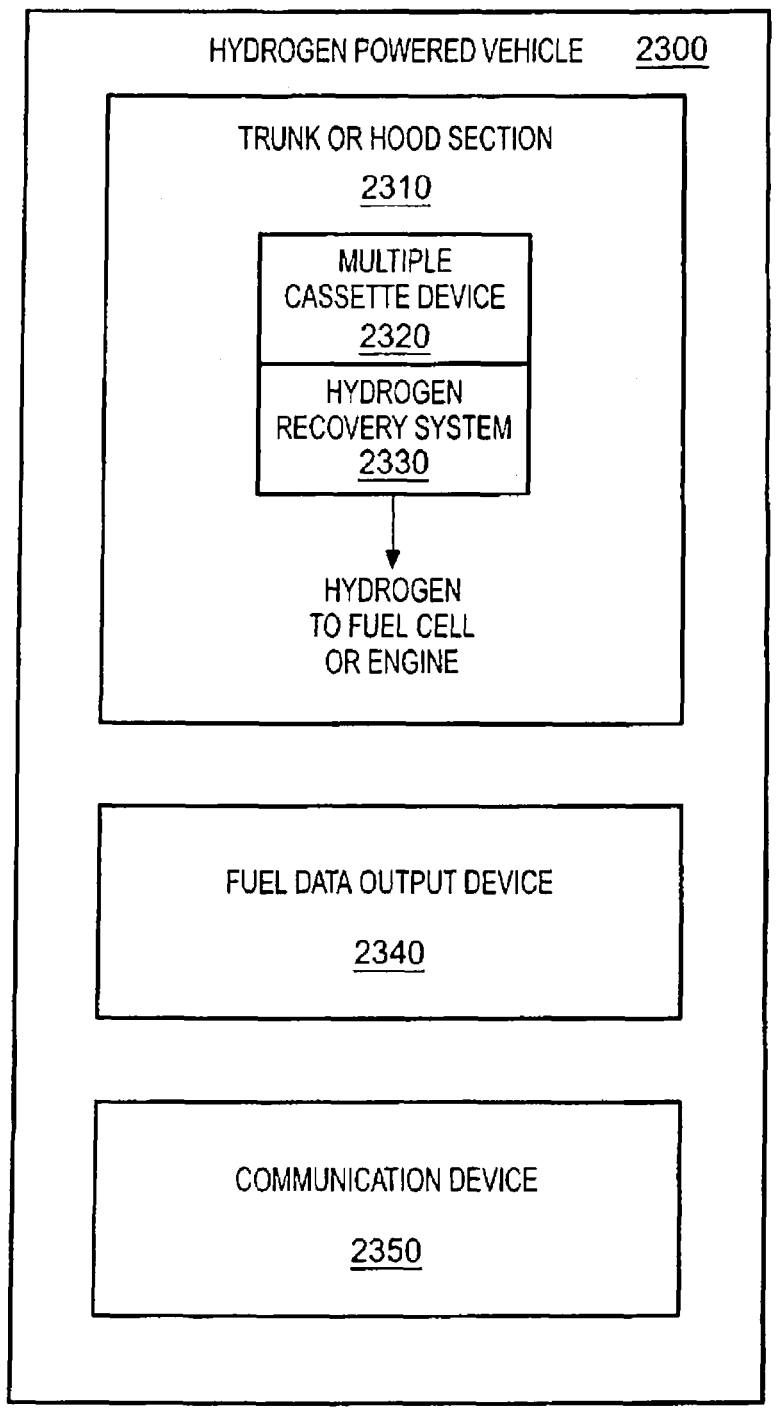
FIG. 23 shows a hydrogen powered vehicle that may be powered by hydrogen recovered from a cassette, according to embodiments of the invention.

A hydrogen recovery system and cassette may be contained within a hydrogen powered vehicle to allow recovery of hydrogen fuel from the cassette on-vehicle to allow powering of the vehicle with hydrogen. FIG. 23 shows a hydrogen powered vehicle 2300 that is powered by hydrogen recovered from a cassette, according to embodiments of the invention. The vehicle contains a multiple cassette device 2320, a hydrogen recovery system 2330, an optional fuel data output device 2340, and an optional communication device 2350. The multiple cassette device and the hydrogen recovery system are often contained within a trunk or hood section 2310 along with a fuel cell or engine and other associated conventional vehicular components such as a battery. The multiple cassette device may be a linear or rotary multiple cassette device as previously described. The multiple cassette device may automatically load or insert cassettes sequentially into the recovery system. The cassettes and recovery system may be any of those described elsewhere herein. The recovery system recovers hydrogen from the cassette and may provide the hydrogen to a fuel cell or internal combustion engine. It is estimated that each kilogram of hydrogen recovered from the cassette may be sufficient to power a vehicle operating at approximately 0.2-0.4 kWh/km for approximately 100 kilometers. The hydrogen recovery system may be load responsive in that it produces hydrogen based upon demand. The recovery system may receive demand information from the vehicle, for example through its communication system. As an example, a minimum inventory or pressure of hydrogen may be maintained in a buffer tank within the recovery system. In this way the hydrogen recovery system may recovery hydrogen from a plurality of cassettes fed from the multiple cassette device in succession in order to supply a steady supply of hydrogen for conversion to power via a fuel cell or directly in the vehicles engine. In one particular embodiment of the invention it is contemplated that three small attaché case size cassettes, for example approximately fourteen liters or about one-third the size of a conventional gasoline tank, may power a typical fuel cell vehicle approximately three-hundred miles, or more.

In certain embodiments, the hydrogen utilizing vehicle may comprise potentially any type of hydrogen fuel cell. A variety of hydrogen utilizing fuel cell designs are known in the art, including but not limited to the polymer electrolyte membrane (PEM) fuel cell, the phosphoric acid fuel cell, the molten carbonate fuel cell and the solid oxide fuel cell. Non-limiting examples of known hydrogen-powered vehicles include the Mazda HRX-2 and MX-5 and the BMW 750hL. Other hydrogen-powered vehicles are being developed or tested by most of the major automobile manufacturers, including General Motors, Daimler-Benz, Ford, Toyota and Honda. Conventional ICE vehicles may also be retrofitted to burn hydrogen instead of gasoline. (E.g., U.S. patent application Ser. No. 10/178,974, entitled "Methods and Apparatus for Converting Internal Combustion Engine (ICE) Vehicles to Hydrogen Fuel"). See also, Quantum Impco-Gaseous Fuel Metering System, Quantum Technologies, Inc., Irvine Calif.). This may also help improve the energy efficiency of operating a motor vehicle. In internal combustion engines, well-to-wheel efficiency is a common measure of how much energy is lost in the process of producing, refining, formulating and consuming a fuel. Our testing to date indicates that an internal combustion engine consuming hydrogen distributed from a cassette may provide a vehicle with significantly higher well-to-wheel efficiency than that of gasoline, while reducing greenhouse gas emissions, and providing other benefits. The present inventor estimates that the use of hydrogen in a modified ICE vehicle may provide about a three-times improvement in efficiency over gasoline. Thus, in one instance, a cassette, a hydrogen recovery system, and a fuel cell or engine may be used to power a vehicle.

Accordingly, a method according to one embodiment of the invention includes receiving a cassette containing a hydrogen storing material potentially from a common carrier, inserting the cassette into a cassette port of a mobile hydrogen recovery system contained within and affixed to a vehicle, either a fuel cell vehicle or a modified internal combustion engine vehicle, recovering hydrogen from the cassette, and utilizing the recovered hydrogen to power the vehicle. The cassettes may be received in a number of different ways. The cassette may be distributed to a home or other stationary location associated with the vehicle through a common carrier based on an explicit order, a scheduled order, or based on an order performed automatically by some aspect of the vehicular hydrogen system based on hydrogen inventory information. Alternatively, the cassette may be purchased at a filling station or other stationary cassette distribution center. The filling station may also allow filling or recharging the plurality of cassettes in the multiple cassette device. Other approaches are contemplated.

In embodiments of the invention, a hydrogen powered vehicle may contain information about how much hydrogen inventory is available to power the vehicle and may alert a user when the amount of hydrogen inventory drops below a predetermined threshold. The vehicle may obtain the hydrogen inventory information in a number of ways. In one embodiment the vehicle may receive the information through a wireless or wired connection to one or more cassettes or a hydrogen recovery system. As one example, the cassette or the hydrogen recovery system may contain a probe or sensor to interrogate or sense the amount of hydrogen available in a hydrogen storing material. This information may then be communicated to the vehicle. As another example, a cassette or a hydrogen recovery system may communicate an initial hydrogen inventory to a vehicle and then the vehicle may maintain an account of the available hydrogen inventory by subtracting amounts of hydrogen recovered or amounts of hydrogen utilized from the initial hydrogen inventory. Other approaches are contemplated.

The fuel data output device may present information associated with how much hydrogen fuel inventory is available to the driver of the vehicle. The fuel data output device may receive the information from the hydrogen recovery system through a wired or wireless communication link. The fuel data output device may comprise one or more dials, displays, meters, gauges, or other data output devices. The device will often be located on the dashboard of the vehicle, for ease of viewing by the driver, although this is not required. The device may present the hydrogen inventory on a scale from empty to full. A single device may provide an averaged or otherwise combined hydrogen inventory for a plurality of cassettes, or alternatively a separate device may be provided for each of the plurality of cassettes. The user may use information from the output device to manage their hydrogen inventory by purchasing or ordering cassettes. The hydrogen powered vehicle may have a system to remind its user to obtain more hydrogen inventory. For example, when the hydrogen inventory dips below a predetermined threshold amount the vehicle may alert the driver with one or more audible stimuli (e.g., a beep, or a verbal statement), visible stimuli (e.g., a light or flashing light), or other sensory stimuli in order that the user may be reminded to obtain more hydrogen.

In some embodiments, the vehicle may contain the communication device. The communication device may be as described elsewhere herein. The communication device may be used to communicate with a hydrogen network, or to communicate with other remote communication systems. In one instance, the communication device may be part of the hydrogen recovery system or wired or wirelessly connected with the recovery system. In one aspect, the communication device may communicate with the network to order one or more replacement cassettes based on hydrogen inventory information associated with the vehicle and dependent upon how much power the vehicle has consumed. The communication device may communicate with the network automatically, as desired. Alternatively, a user may use the communication device to order a cassette. In some embodiments, the communication device may be a wireless mobile network access device to access the network from a remote location and obtain information identifying a location where a cassette may be obtained. The vehicle may contain a geographic positioning system to provide geographic position information for the vehicle to the hydrogen network or this information may be provided manually.

The vehicle may obtain information about a location of a nearby hydrogen retail store. The information may be obtained from the hydrogen network (as described elsewhere herein), may be obtained from a geographic positioning system, may be obtained from the Internet, may be obtained from a local database onboard the vehicle, or may be otherwise obtained. The vehicle may present this hydrogen retail store location information to a user. Accordingly, the vehicle may have a system to assist a user in locating a hydrogen retail store.

In embodiments of the invention, a hydrogen powered vehicle may compare an amount of hydrogen inventory available to power the vehicle with an estimate of an amount of hydrogen to power the vehicle from its present location to a location of a nearby hydrogen retail store and alert the user when the amount of available hydrogen inventory is sufficiently close to, but more than, the estimated amount needed to get to the hydrogen retail store. The vehicle may obtain information about its present location. This information may be obtained by using a geographic positioning system, for example. Alternatively, the information may be entered manually. The vehicle may estimate the amount of hydrogen needed to power the vehicle from its present location to the location of the nearest nearby, or specified hydrogen retail store. In one embodiment of the invention a shortest driving distance is calculated and is divided by a hydrogen mileage ratio in miles that the vehicle may be powered per unit amount of hydrogen fuel to estimate the amount of hydrogen to power the vehicle to the retail store. The estimated needed hydrogen amount may be compared to the amount of hydrogen available to power the vehicle and the user may be alerted based on the comparison. For example, the user may be alerted if the available hydrogen is sufficiently close to the needed hydrogen. As one example, the estimated needed hydrogen may be subtracted from the amount of hydrogen available and the user may be alerted if this is under a predetermined amount. The predetermined amount may be approximately ¼ the full hydrogen inventory of the vehicle and the user may be alerted if the comparison indicates a value less than this value. Other predetermined values convenient for the particular implementation may also be used. This capability to intelligently inform a driver to purchase hydrogen fuel may allow the user to drive to the retail store and obtain additional hydrogen before they run out of inventory. This may be particularly useful during the initial transition toward hydrogen powered vehicles, when hydrogen retail stores may be relatively more disperse compared to present day gasoline stations. This processing may be performed automatically or autonomously by the vehicle, or based on a request. The vehicle may perform such processing automatically, autonomously, based on a request from a user, or based on other criteria (e.g., when the hydrogen inventory drops below a predetermined or user supplied threshold).

XI. Hydrogen Retail Stations and Hydrogen Dispensing Units

Embodiments of the invention relate to a hydrogen dispensing unit containing at least a cassette exchange system to exchange one or more cassettes with a user. The hydrogen dispensing unit may be implemented within a hydrogen retail station, at a median strip, at a sidewalk at the side of a street, at an interior of a store, at an entrance to a store, or at other locations. The cassette exchanging system may include a depleted cassette acceptor to accept a depleted hydrogen fuel cassette and a charged cassette dispenser to dispense a charged hydrogen fuel cassette. The cassette acceptor may contain structurally defined positions for accepting and dispensing cassettes. Sensors may be used to sense cassettes properly configured within the unit, or within the structurally defined positions. The unit may contain a diagnostic testing system to diagnostically test a cassette and/or a material within the cassette. The unit may also have a device to read information stored in an information storage system of a cassette, such as a microelectronic device or a magnetic pattern. The unit or the retail station, or both, may comprise a communication system to communicate with a hydrogen network and implement a variety of business methods described herein. Other embodiments of the invention relate to a hydrogen retail station containing a hydrogen dispensing unit. Other embodiments of the invention relate to a method of carrying out a hydrogen fuel transaction with a hydrogen dispensing unit, for example purchasing a charged hydrogen fuel cassette from the unit. Other embodiments relate to business methods involving a hydrogen dispensing unit and/or a hydrogen retail store, interacting with a hydrogen network. Still other embodiments relate to business methods involving a hydrogen network interacting with a hydrogen retail store and/or a hydrogen dispensing unit.

Figure 27:
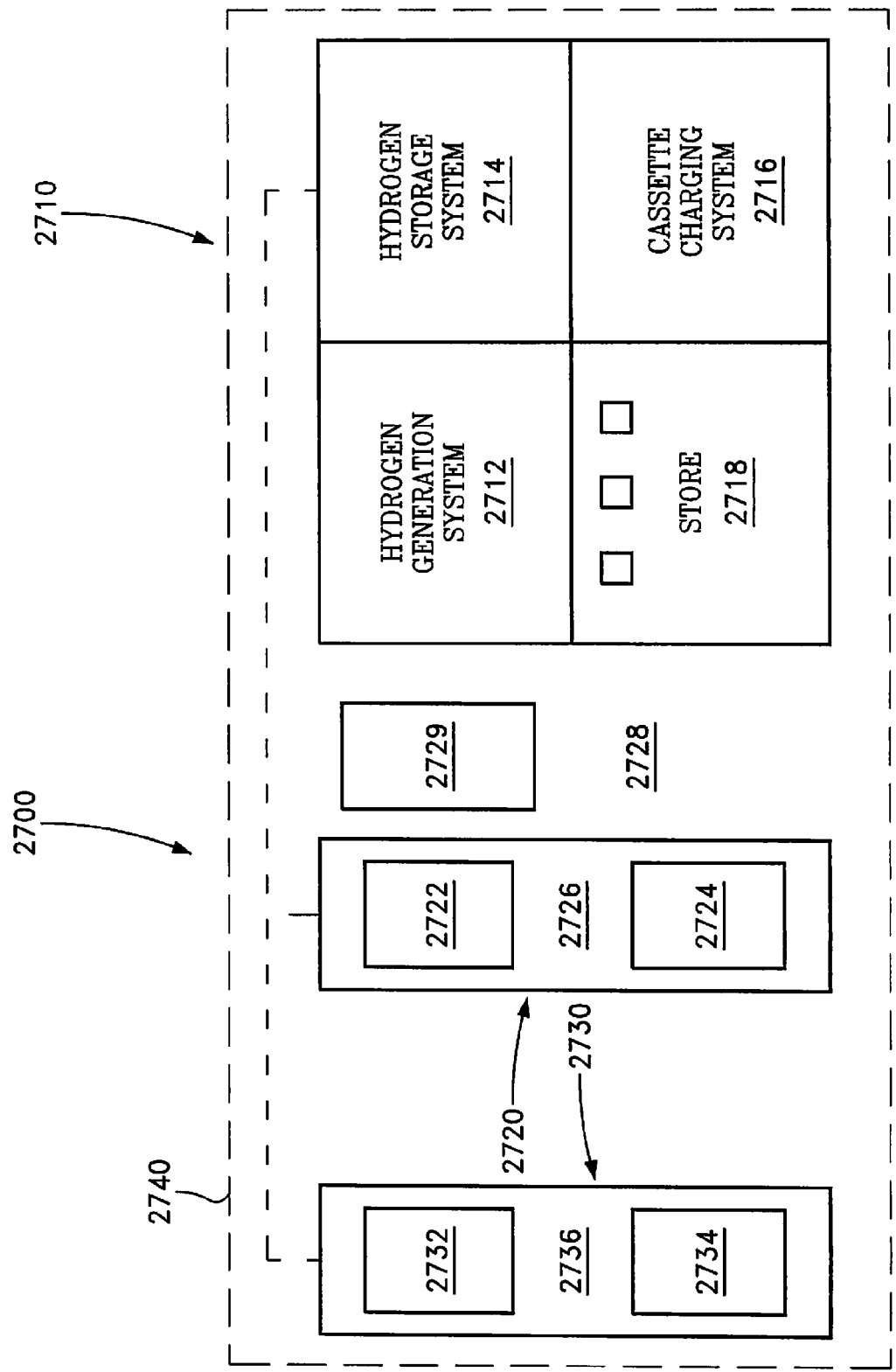
FIG. 27 shows a hydrogen retail station that may be used to provide hydrogen to users, according to embodiments of the invention.

FIG. 27 shows a hydrogen retail station 2700 that may be used to provide hydrogen to users, according to embodiments of the invention. The retail station may be similar to a gasoline station or the retail station may be part of a hypermarketer, for example a large retail store or supermarket that offers hydrogen in their parking lots. The retail station contains a building 2710, a first hydrogen dispensing station 2720, and a second hydrogen dispensing station 2730. The retail station may be energy self sufficient and self powered so that it doesn't need to rely upon power from the electrical grid. The retail station may comprise a fuel cell to provide this power. The retail station may have a communication system, for example a satellite dish on top of the building, to communicate information to and receive information from a hydrogen network as described elsewhere herein. The satellite dish may also be used to communicate credit card information or other information.

The building contains a hydrogen generation system 2712, a hydrogen storage system 2714, a cassette charging system 2716, and a store 2718. The hydrogen generation system may contain any conventional system to generate hydrogen gas. Suitable examples include but are not limited to electrolyzers, organic liquid reformers, gasoline reformers, methanol reformers, organic gas reformers, natural gas reformers, and other hydrogen generation systems known in the arts. The generation system generates gaseous hydrogen by chemically reacting a hydrogen containing source material and is coupled with the hydrogen storage system, for example via piping, flow regulation devices, and the like, in order to provide the gaseous hydrogen to the hydrogen storage system. As desired, hydrogen purification devices, such as desiccants, hydrogen separation membranes, pressure swing sorbers, or other devices may be used to purify the generated hydrogen prior to storage. The hydrogen storage system may comprise a conventional vessel for storing hydrogen. Suitable examples include but are not limited to liquid hydrogen storage tanks and gaseous hydrogen storage tanks. The hydrogen generation capacity of the hydrogen generation system and the hydrogen storage capacity of the hydrogen storage system may be sufficient to accommodate the amount of hydrogen dispensed at the retail station.

The cassette charging system is coupled to the hydrogen storage system to receive hydrogen to charge cassettes containing hydrogen storage materials therein. The cassette charging system may include a rack containing a plurality of charging cassettes, piping to connect the plurality of cassettes with the hydrogen in the hydrogen storage system, attachments or couplings to attach or couple the piping to the cassette. Commonly, the piping and/or the attachments will comprise flow and pressure regulation devices sufficient to allow slow and controlled charging of the cassettes and to avoid subjecting the cassettes to the typical high pressure of the hydrogen storage system. The pressure in the cassettes may be maintained less than approximately 2 atmospheres or less than approximately 10 atmospheres. As desired, the cassette charging system may comprise a cooling system, for example refrigeration or cooling pipes to cool the cassettes while they are charged with hydrogen. Alternatively, the cassettes may be charged sufficiently slowly to avoid overheating.

The store may assist with disseminating information about hydrogen, fuel cells, hydrogen powered vehicles, hydrogen retail stations, and the like. The store may contain packets, brochures, and other forms of information for distribution to users. The store may also provide information about other hydrogen retail stations hydrogen may be purchased. For example, the retail station may provide a map or directions to another hydrogen retail station of potential interest to the user.

Although not shown, in some embodiments of the invention, the retail station may comprise a vehicle service station for servicing vehicles. The vehicle service station may repair vehicles and/or convert gasoline powered vehicles to hydrogen powered vehicles. In embodiments of the invention the vehicle service station may perform a conversion as described in U.S. patent application Ser. No. 10/178,974, entitled "Methods and Apparatus for Converting Internal Combustion Engine (ICE) Vehicles to Hydrogen Fuel"). U.S. patent application Ser. No. 10/178,974 is hereby entirely incorporated by reference.

The particular retail station contains two hydrogen dispensing stations 2720 and 2730. In alternate embodiments of the invention, the retail station may contain fewer or more hydrogen dispensing stations. For example, the station may contain a single hydrogen dispensing station, or the station may contain two more hydrogen dispensing stations located on the opposite side of the building. The hydrogen dispensing stations may be coupled with the hydrogen storage system in order to receive hydrogen gas from storage. The hydrogen gas may be dispensed or used to charge cassettes. The retail station may comprise above ground hydrogen conveyance piping to convey hydrogen. The piping may be routed from a building containing a hydrogen generation system and/or hydrogen storage system via an overhead roof and down from the roof to a hydrogen dispensing station. This may avoid having underground piping. Underground piping may be more expensive to construct and it may be more difficult to access and fix a leak, should one occur. Additionally, the overhead piping may be safer in the event of hydrogen exiting the piping. The hydrogen exiting the overhead piping may rapidly rise and dissipate due to the hydrogen's low molecular weight. In this way, the hydrogen may move upward away from the retail station and people proximate the station.

The first hydrogen dispensing station contains a first hydrogen dispensing unit 2722, a second hydrogen dispensing unit 2724, and an island 2726. The island may comprise a raised area that supports the hydrogen dispensing units and is used to separate or direct hydrogen powered vehicles through the retail station. Likewise, the second hydrogen dispensing station contains a third hydrogen dispensing unit 2732, a fourth hydrogen dispensing unit 2734, and a second island 2736. The island 2726 and the building may define a first hydrogen powered vehicle access way 2728. A hydrogen powered vehicle 2729 may drive through the access way and receive dispensed hydrogen from the first hydrogen dispensing unit 2722.

Figure 28:
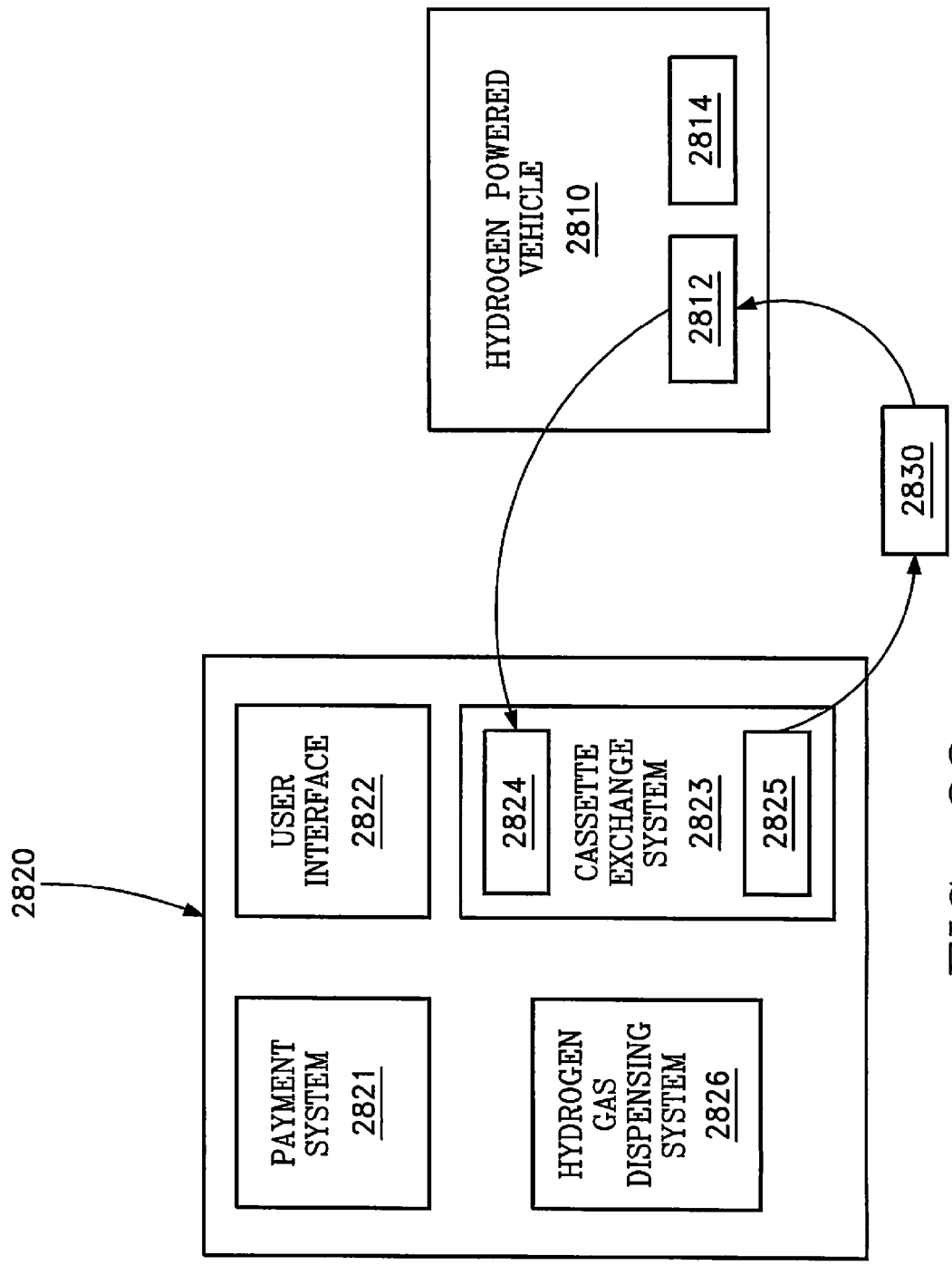
FIG. 28 shows a hydrogen dispensing unit to dispense hydrogen to a hydrogen powered vehicle, according to embodiments of the invention.

FIG. 28 shows a hydrogen dispensing unit 2820 to dispense hydrogen to a hydrogen powered vehicle 2810, according to embodiments of the invention. The particular vehicle contains a depleted cassette 2812 and a partially depleted cassette 2814. The hydrogen dispensing unit may contain a payment system 2821, a user interface 2822, a cassette exchange system 2823, and a hydrogen gas dispensing system 2826. The cassette exchange system may contain a depleted cassette acceptor 2824 and a charged cassette dispenser 2825. The cassette exchange system may serve as a vending machine for hydrogen fuel cassettes and may accept return depleted cassettes. A user of the hydrogen powered vehicle may use the hydrogen dispensing unit to obtain hydrogen for powering the vehicle. The user may use the payment system to enter hydrogen purchasing information. The payment system may allow entering of information from a credit card, checking card, bank card, or other payment device that may be read by the payment system. For example, the payment system may have a magnetic strip reader that may read information from a credit card when a user swipes the credit card through the payment system.

After entering payment information the user may obtain a charged cassette from the cassette dispenser and may optionally return one or more depleted cassettes to the depleted cassette acceptor. The user may use the user interface to qualify or define the hydrogen purchase transaction. The user interface may comprise one or more data presentation devices, such as a display device (e.g., an liquid crystal display or monitor) and a speaker, and one or more data entry devices, such as a keyboard, buttons, a touch screen, or a microphone. The hydrogen dispensing unit may comprise hydrogen transaction instructions that allow the user to qualify or define the hydrogen purchase or transaction based on text and other information presented or displayed to the user via the display device and information obtained from the user via the data entry device.

To further illustrate the concepts, according to embodiments of the invention, consider the following exemplary transaction. After swiping a credit card, the hydrogen dispensing system may determine whether the user wants to purchase a cassette or hydrogen gas. The user interface or display device may present the question, "DO YOU WANT TO PURCHASE A CASSETTE OR HYDROGEN GAS?". The user may use the user interface to enter an answer. For example, the user may indicate that they desire to purchase a cassette. The user interface may comprise a first button labeled "CASSETTE" and a second button labeled "GAS". The user may press the button labeled "CASSETTE" to indicate that they desire to purchase a cassette or press the button labeled "GAS" to indicate that they desire to purchase hydrogen gas.

If the user selects to purchase a cassette, the hydrogen dispensing unit may determine whether the user wants to return a depleted cassette. The user interface or display device may present the question, "DO YOU WANT TO RETURN A DEPLEATED CASSETTE?". The user interface may comprise a first button labeled "YES" and a second button labeled "NO". The user may press one of these buttons to indicate their preference. Alternatively, the user may insert a cassette into the cassette acceptor, which may also constitute an answer indicating that the user desires to return a depleted cassette. If the user presses the "YES" button, the user interface may provide instructions to assist the user in detaching the depleted cassette from the vehicle and inserting the depleted cassette into the cassette acceptor.

The cassette acceptor may comprise a slot or other opening into which the cassette may be inserted. For example, the cassette acceptor may comprise a slot to a depleted cassette bin or other container. Alternatively, the cassette acceptor may comprise a mechanized acceptor similar to the loading systems for loading video cassettes into video cassette recorders. The cassette acceptor may determine when a cassette has been inserted with a sensor. Once within the hydrogen dispensing unit the cassette may be processed in a variety of ways. In embodiments of the invention the depleted cassette may be charged within the unit. In other embodiments of the invention the cassette may be diagnostically tested. For example, one or more circuits or electronic devices of the cassette may be tested with a diagnostic testing system of the hydrogen dispensing unit. As another example, a hydrogen fuel material within the cassette may be tested for hydrogen content, microstructure, or the like with a probe of the hydrogen dispensing unit. In other embodiments of the invention when the cassette is added to the cassette acceptor the hydrogen dispensing unit may read cassette identification or other information from an information storage system of the cassette (e.g., a memory of a microelectronic device, a bar code, a magnetic pattern in a hydrogen fuel material, or others).

After the depleted cassette has been inserted into the cassette acceptor, which may be detected with a sensor, the user interface may present the question, "DO YOU WANT TO RETURN ANOTHER DEPLETED CASSETTE?". The user may respond, for example, by pressing either the "YES" or the "NO" button, or by inserting an additional cassette into the acceptor. If the "YES" button is pressed the display may again instruct the user to detach the depleted cassette and insert it into the acceptor.

If the "NO" button is pressed, either in response to the question "RETURN A DEPLEATED CASSETTE?" or the question "RETURN ANOTHER DEPLETED CASSETTE?" the cassette dispenser may dispense a charged cassette. The cassette dispenser may comprise a mechanized dispenser or ejection system similar to that used to the video cassette loading and unloading systems used to eject video cassettes from a video cassette recorder. Alternatively, the cassette dispenser may comprise a dispenser similar to those used in vending machines for vending cigarettes, beverages, food, and other commodities. The user interface may provide instructions to remove the charged cassette from the cassette dispenser and attach the cassette to the vehicle. The user may remove the charged cassette and attach the cassette where the depleted cassette was detached. Alternatively, the user may remove the cassette and store it elsewhere in the vehicle for subsequent use. After the charged cassette is removed from the dispenser the display may determine whether the user wants to purchase another charged cassette. This may continue until the user indicates that they do not want to purchase another charged cassette, for example by pressing the "NO" button, or until a predetermined period of time elapses. Upon such occurrence, the credit card or other payment account may be billed, according to the particular transaction.

In other embodiments of the invention, a cassette exchange system may comprise a container with one or more doors that may be opened by a user entering payment information through the payment system. In one embodiment of the invention the door opens to allow access to a cassette acceptor that contains a plurality of positions for accepting depleted cassettes and a cassette dispenser that contains a plurality of positions for dispensing charged cassettes. The plurality of positions may represent positions within a stack, slots, or other structurally defined positions.

The cassette dispenser may contain a plurality of cassettes in structurally predefined cassette dispenser positions that are communicatively or logically coupled with the cassette dispenser. The coupling may comprise a wired or wireless connection. For example, the cassette dispenser may be communicatively coupled with a microelectronic device on the cassette when the cassette is properly configured within the cassette dispenser. This sort of coupling may allow reading stored information in a memory of the microelectronic device. Alternatively, the communicative coupling may comprise a sensor that optically, electrically, magnetically, or otherwise senses that the cassette is configured within the dispensing unit, or not. The coupling may allow the cassette dispenser to determine when a cassette is configured within the dispenser and when it has been removed. The user may remove any desired number of cassettes from the cassette dispenser. The cassette dispenser may know how many cassettes have been removed by way of the coupling. The user may be billed based on the number of cassettes removed from the cassette dispenser.

The user may also add any desired number of depleted cassettes to the cassette acceptor. The user may insert a cassette into one of a plurality of structurally predefined cassette acceptor positions within a stack. The cassette acceptor may determine that a cassette has been added by using a sensor to sense the cassette or by communicating with the cassette by reading information stored in a microelectronic device of the cassette. The user may be billed based on the number of cassettes added to the cassette acceptor. For example, credit amount may be removed from a purchase of one or more charged cassettes for each cassette added to the cassette dispenser.

A hydrogen dispensing unit may also be located elsewhere than the hydrogen retail station. In embodiments of the invention a hydrogen dispensing unit may be located on a median strip, often a paved or planted strip, between lanes of traffic going in different directions. The location on the median strip may be proximate a stoplight, so that a hydrogen powered vehicle may swipe a credit card and carry out a hydrogen fuel transaction while stopped at the stoplight. In other embodiments of the invention, a hydrogen dispensing unit may be located on a sidewalk at the side of a street. For example, the unit may be located proximate a parking space or a parking meter. In this way, a user may swipe a credit card and carry out a hydrogen fuel transaction while parked, paying parking fees at the parking meter, or trafficking the sidewalk. In still other embodiments of the invention, a hydrogen dispensing unit may be located in a parking garage at a location where gasoline or hydrogen gas distribution would be unsafe. In other embodiments of the invention, the hydrogen dispensing unit may be located within a store or at the entrance to a store (e.g., a grocery store or a mass merchandising store). Alternatively, the hydrogen dispensing unit may be located in other locations where conventional beverage, snack, and newspaper vending machines are located. Commonly, the hydrogen gas dispensing system would not be desired in such embodiments.

Accordingly, a method according to embodiments of the invention may include driving a hydrogen powered vehicle to a hydrogen dispensing unit, removing a depleted cassette from the vehicle, adding the depleted cassette to a cassette exchange system, removing a charged cassette from the cassette exchange system, adding the charged cassette to the vehicle, and driving the vehicle away from the hydrogen dispensing unit. In one embodiment of the invention removing the depleted cassette comprises removing a loose depleted cassette stored anywhere in the vehicle, for example in the trunk, and adding the charged cassette includes adding the charged cassette for storage anywhere in the vehicle. In another embodiment of the invention, removing the cassette may include decoupling the cassette from the vehicle, or a hydrogen recovery system thereof, and adding the cassette may include coupling the cassette with the vehicle or recovery system, for example at the location where the depleted cassette was removed. The cassette exchange system may include a depleted cassette receiver and a charged cassette dispenser. The cassette exchange system may contain sensors or probes to determine when a cassette has been added to or removed from the system. A user may be billed based on a total number of cassettes added to and removed from the system. A method of billing a user may include billing a first amount when a charged cassette is removed from a first location within a hydrogen exchange system and reducing the first amount by a second amount when a depleted cassette is added to a second location within the hydrogen exchange system. The first and the second locations may be structurally predetermined locations. The billing may be based on signals received from sensors that detect the cassettes added to or removed from the exchange system.

The retail station, or some portion thereof, may access a hydrogen network and exchange information with the hydrogen network by using the information read from the cassette. The retail station may have a central information system, for example located in the building, which is communicatively coupled with the hydrogen dispensing system, and any other desired retail station components. The dispensing station may provide the information read from the cassette, for example cassette identification information, to the central information system. The central information system may access the hydrogen network. This may be done by wired, or wireless communication, as desired. The retail station may comprise a dish on the top of the building for this purpose.

Many methods of using the information read from the cassette are contemplated. In one exemplary method, the retail station may communicate information indicating that a particular cassette has been purchased back to a hydrogen network. In this way a cassette inventory may be maintained for a particular retail station and hydrogen inventory sufficiency information may be assessed for the retail station. In embodiments of the invention a cassette containing a hydrogen storing material therein may be distributed to a hydrogen retail station based on a communication of a purchase of one or more cassettes from the retail station to a hydrogen distribution network. In another exemplary method, cassette identification information may be communicated to the hydrogen network in order to update the hydrogen network with status information and or location information for the cassette. In another exemplary method, the retail station may obtain information about the cassette, for example its age, number of times recharged, batch information, recall information, any problems associated with the cassette, return address information, etc. This sort of information obtained from the cassette may be used to selectively process the particular cassette. For example, the particular cassette may be selectively taken out of circulation based on an indication to do so received from the hydrogen network. As an example, the cassette may be taken out of circulation if the cassette has been recharged not less than a predetermined number of times as provided by the hydrogen networks accounting. In yet another method, instructions on processing the cassette may be obtained from the hydrogen network. For example, the cassette may be segregated from other cassettes according to information received from the network. The cassette may be segregated for distribution to a particular address or recharging station.

In embodiments of the invention, the user interface may determine whether the user is enrolled in a hydrogen purchasing rewards program, or would like to enroll in such a program. In the program the hydrogen dispensing unit may discount the cost of hydrogen fuel based on certain hydrogen fuel discounting criteria, such as previous purchases. If the user is enrolled in the program the retail station may contact the hydrogen network to obtain up to date hydrogen fuel discounting criteria for the user. The retail station may report information about the user to the hydrogen network. For example, user identification information, user profile information, user address information, retail store address information, information indicating that the user purchased a particular hydrogen fuel cassette, or other information may be communicated. Cassette identification information for a cassette purchased or returned may be combined with user identification information and this information may be communicated to the hydrogen network for storage in a database. This ability to identify a user and a cassette transaction is useful for implementing a variety of useful methods. In one exemplary method, a user may be billed if a returned cassette is damaged. In another exemplary method, a user profile may be maintained for the user, and may be used, for example, to provide discounted hydrogen fuel to the user based on profile information.

In embodiments of the invention different cassettes may be used for different types of cars. This may be useful, for example, for providing hydrogen to different sized vehicles, such as sports utility vehicles and compacts, or shipping trucks and compacts. In one embodiment of the invention a compact vehicle may be charged with hydrogen by exchanging approximately 5-20 depleted cassettes for an equal number of charged cassettes, the cassettes each containing approximately one-liter of hydrogen storing material. In another embodiment of the invention a SUV may be charged with hydrogen by exchanging approximately 3 depleted attaché-sized depleted cassettes filled with hydrogen storage material for an equal number of charged cassettes. A single hydrogen exchange system may support different cassettes. Alternatively, different hydrogen exchange systems may be used for the different cassettes.

The hydrogen fuel cassettes may provide a novel opportunity for presenting marketing information to users. A cassette may contain marketing information. As an example, the cassette may contain an advertisement for a movie, a restaurant, a company, a food, a beverage, an automotive product, vehicle part, tires, or another advertisement. The marketing information may include targeted marketing information. The targeted marketing information may be based on the type of vehicle. In an embodiment where a first type of cassette (e.g., a large cassette) is used for a first type of vehicle (e.g., a sports utility vehicle (SUV)) and a second type of cassette (e.g., a small cassette) is used for a second type of vehicle (e.g., a compact) the marketing information on the first and the second types of cassette may be different. The marketing information on the first and the second types of cassettes may be based on the demographic information or profile of the owners of the vehicles. As an example, a cassette to be sold to a SUV owner may have an advertisement for SUV tires while a cassette to be sold to a compact owner may have an advertisement for compact tires. The targeted marketing information may also be based on a particular hydrogen retail store. For example, the marketing information may comprise advertisements for attractions, restaurants, theaters, companies, automotive stores, etc that are proximate the hydrogen retail store, or otherwise associated with the hydrogen retail store. The hydrogen dispensing unit may also select a cassette containing targeted marketing information for a particular user based on a user profile accessed based on user identification information (e.g., from payment information). Advantageously, in this way, the cassette allows marketing information, and in some embodiments targeted marketing information, to be conveyed to a user on a cassette. The cassette is handled by the user when it is added to and removed from the vehicle. So the user may see the marketing information twice. Furthermore the user may access the marketing information at any time when the cassette is in their possession. Such presentation of marketing information is not possible with conventional hydrocarbon fuels purchased at a gasoline station.

In some embodiments of the invention the retail station and the hydrogen dispensing unit may also allow hydrogen gas to be purchased, although this is not required. This hydrogen gas may be stored within the vehicle as a gas and used to power the vehicle or it may be used to charge a material within a hydrogen fuel cassette. If the user elects to purchase hydrogen gas the user interface may present or display instructions that assist the user in attaching piping of the hydrogen gas dispensing system to the vehicle. The vehicle or a hydrogen recovery system therein may have a coupling to accept a pipe or hose of the hydrogen gas dispensing system. Likewise, the vehicle or the hydrogen recovery system may comprise piping, flow regulation devices (e.g., valves), pressure regulation devices, and the like to provide the hydrogen gas to one or more cassettes to be charged. In this way a cassette may be charged in situ within the vehicle with hydrogen received from the hydrogen gas dispensing system. In embodiments of the invention, the cassette may be exposed to a pressure of hydrogen for a predetermined fixed period of time that is sufficient to fully charge the cassette. For example, the cassette may be exposed to hydrogen for a time in the range of approximately 1-10 or desirably 1-5 minutes. This may take more time compared with purchasing a previously charged cassette.

As another option, in other embodiments of the invention, one or more sensors or probes may be used to determine how much hydrogen to add to the cassette. The sensors may be within the cassette or external to the cassette. The sensors or probes may interrogate the material within the cassette to determine the hydrogen content in the material within the cassette. Often, the sensors may be within the cassette and communicatively coupled with the vehicle or some subset thereof. In this way the vehicle may present hydrogen inventory information to a user of the vehicle on the dashboard, for example. The vehicle may also present the hydrogen inventory information, for example the amount of hydrogen within a cassette, to the retail station, the hydrogen dispensing station, or the hydrogen dispensing unit. In embodiments of the invention, the pipe or hose used to dispense the hydrogen gas may contain a signaling path or signaling medium, such as an electrically conductive wire, that may electrically connect with a memory chip on the vehicle that stores the quantity information when the hose is attached to the vehicle to allow charging the cassette with hydrogen. Alternatively, the hydrogen inventory information may be communicated wirelessly from the vehicle to the hydrogen dispensing station. In this way, the retail station may know how much hydrogen is within the cassette and how much hydrogen to add to the cassette to charge it.

XII. Exemplary Use in Portable Electronic Devices

Figure 24:
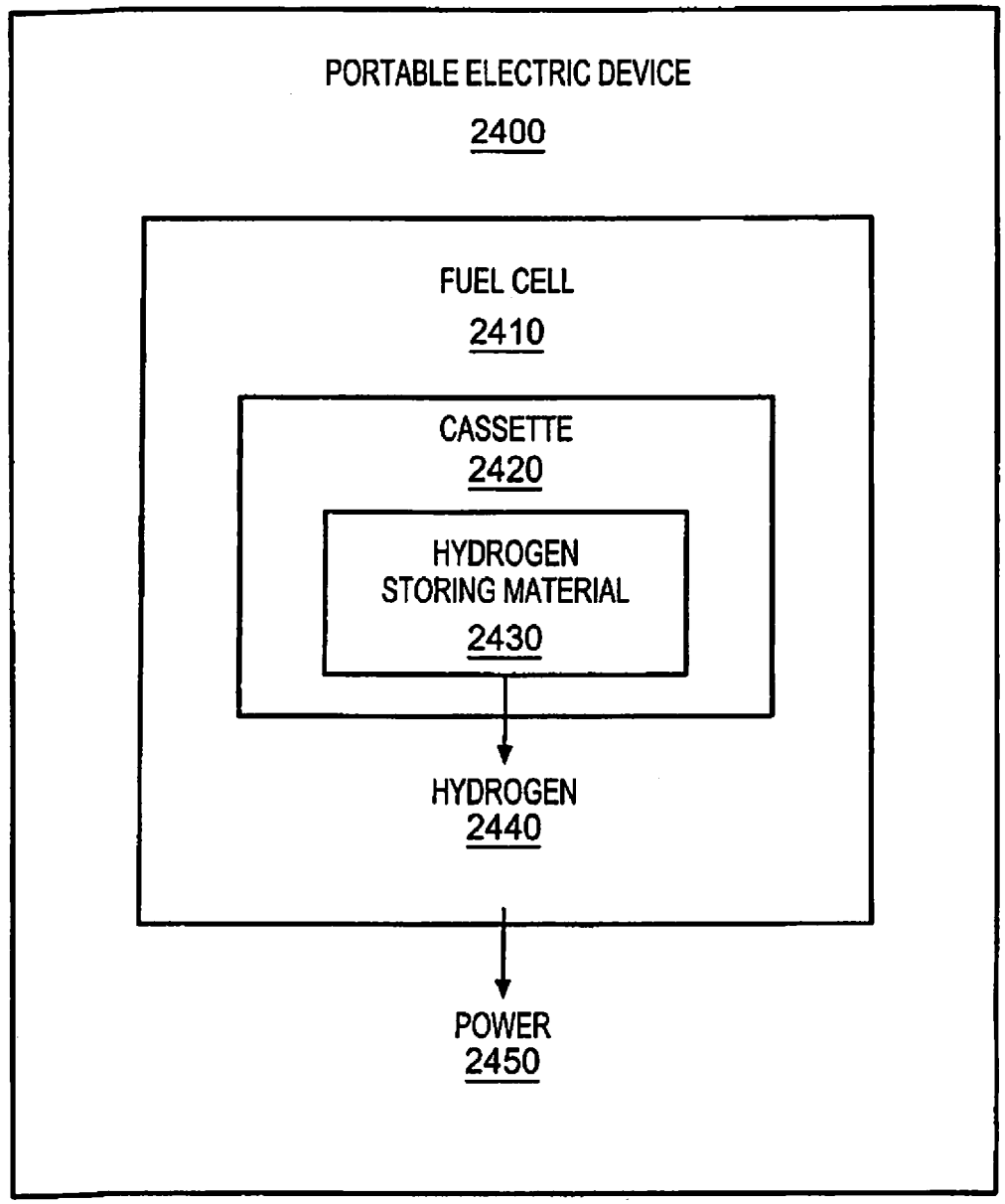
FIG. 24 shows a portable electrical device, such as a laptop, containing a fuel cell to receive hydrogen from a cassette containing a hydrogen storing material, for example from a hydrogen permeable glass cassette containing a metal hydride, in order to provide power to the electrical device, according to embodiments of the invention.

FIG. 24 shows a portable electrical device 2400 containing a fuel cell 2410 that receives hydrogen 2440 from a cassette 2420 containing a hydrogen storing material 2430 and converts the hydrogen into power 2450 that is supplied to the electrical device. The electrical device may be a number of portable electrical devices known in the arts including among others portable computer systems (e.g., laptop computers or personal digital assistants) and portable communication devices (e.g., cell phones or pagers). Cassettes may be particularly useful in portable devices in order to provide power in an unplugged state. In one particular embodiment of the invention, the electrical device comprises a laptop computer in an unplugged state and the cassette and storing material comprise a permeable glass cassette and a metal hydride. It is contemplated that such a cassette may provide hydrogen sufficient to power the laptop for much longer times than possible with conventional laptop batteries. In the case of the laptop, the cassette may have a size that is in the range of approximately a deck of playing cards and a matchbox, or somewhat smaller if a smaller laptop is desired. Alternatively, in the case of a cell phone, the cassette may have a size that is in the range of approximately a nickel and a stack of for example five quarters. Of course, it will be appreciated that the cassette may have virtually any size that is appropriate for the particular implementation.

Figure 25:
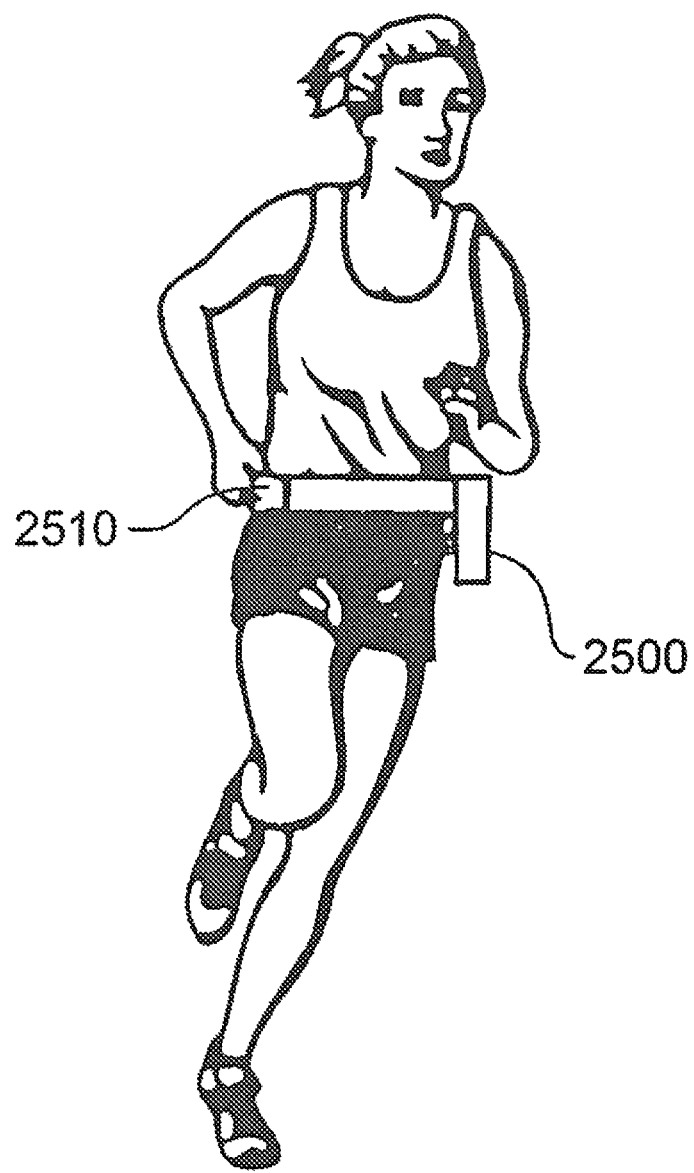
FIG. 25 shows a user containing a mobile, compact, and user-wearable hydrogen storage, recovery, and utilization system, according to embodiments of the invention.

FIG. 25 shows a user containing a mobile, compact, and user-wearable hydrogen storage, recovery, and utilization system 2500, according to embodiments of the invention. The system is miniaturized and may be attached, for example, to a belt 2510 of a wearer. The system may include a small cassette, a small hydrogen recovery system, a small fuel cell, and other desired components (e.g., a battery). In some embodiments, the system may contain a DC adapter to power cell phones, pocket pc's, etc. The system may contain a battery for startup in some embodiments, or alternatively may contain another means for initial power such as a piezoelectric energy pressure transducer that may be worn in the heel section of the shoe or a kinetic energy device worn on the belt, which uses the motion of the body to initiate hydrogen recovery and/or help charge a battery. Advantageously, the conveniently small and portable system may allow producing power for operating a radio, a cell phone, or other desired electronic devices.

Of course, it will be appreciated that there are many additional environments where a cassette and a hydrogen recovery system may be advantageously employed. For example, a hydrogen recovery system may reside in a home or office and be connected to a fuel cell to provide hydrogen to the fuel cell to power the home or office. This may allow removing the home or office from the local or regional power grid.

Embodiments of the invention include various operations, as described above. The operations may be performed by hardware components or may be embodied in machine-executable instructions, which may be used to cause a general-purpose or special-purpose processor or logic circuits programmed with the instructions to perform the operations. The embodiments of the invention may be provided as a computer program product that may include a machine-readable medium having stored thereon instructions that may be used to program a computer (or other electronic devices) to perform a process according to the present invention. The machine-readable medium may include, but is not limited to, floppy diskettes, optical disks, CD-ROMs, and magneto-optical disks, ROMs, RAMs, EPROMs, EEPROMs, magnet or optical cards, flash memory, or other type of media or machine-readable medium suitable for storing electronic instructions. Moreover, the embodiments may also be downloaded as a computer program product, wherein the program may be transferred from a remote computer to a requesting computer by way of data signals embodied in a carrier wave or other propagation medium via a communication link (e.g., a modem or network connection). Alternatively, the operations may be performed by a combination of hardware and software.

Thus, systems and methods for hydrogen storage, distribution, and recovery have been described. Although described with reference to specific embodiments it should be remembered that various modifications and changes may be made to the techniques described herein without departing from the broader spirit and scope of the invention. The specification and drawings are accordingly to be regarded in an illustrative rather than a restrictive sense and the invention measured only in terms of the claims, which follow.

What is claimed is:

1. A system comprising:
   a hydrogen fuel cassette, the hydrogen fuel cassette having a housing defining an interior region and a hydrogen storage material selected from the group consisting of metal hydrides, carbon nanostructures, glass microspheres, doped sodium alanates, and sodium alanates in the interior region;
   a hydrogen recovery unit having a receptacle to receive the hydrogen fuel cassette, the hydrogen recovery unit to recover hydrogen from the hydrogen storage material; and
   a heating system for heating said hydrogen storage material to recover hydrogen that includes heating elements for insertion into said cassette module.

2. The system of claim 1, wherein said heating elements comprise thermal prongs or thermal vanes.

3. The system of claim 1 wherein said heating system includes an array of alternating heating devices and cooling devices within said hydrogen storage material.

4. The system of claim 1 wherein said hydrogen fuel cassette includes a plurality of electrical resistance heaters.

5. The system of claim 4, comprising a controller to receive information from one or more of the hydrogen fuel cassette and the hydrogen recovery unit, the controller having a storage device storing instructions that when executed cause the controller to process hydrogen fuel information associated with the hydrogen recovery unit.

6. A system comprising:
   a hydrogen fuel cassette, the hydrogen fuel cassette having a housing defining an interior region and a hydrogen storage material selected from the group consisting of metal hydrides, carbon nanostructures, glass microspheres, doped sodium alanates, and sodium alanates in the interior region;

a hydrogen recovery unit having a receptacle to receive the hydrogen fuel cassette, the hydrogen recovery unit to recover hydrogen from the hydrogen storage material;

said hydrogen storage material being powdered; and said hydrogen recovery unit recovering hydrogen through reaction of said material with water or enhanced water formulations.

7. A system comprising:

a hydrogen fuel cassette, the hydrogen fuel cassette having a housing defining an interior region and a hydrogen storage material selected from the group consisting of metal hydrides, carbon nanostructures, glass microspheres, doped sodium alanates, and sodium alanates in the interior region; and a hydrogen recovery unit having a receptacle to receive the hydrogen fuel cassette, the hydrogen recovery unit to recover hydrogen from the hydrogen storage material; and a hydrogen dispensing unit to dispense hydrogen to a hydrogen powered vehicle.

8. A system comprising:

a hydrogen fuel container;

a material selected from the group consisting of metal hydrides, carbon nanostructures, glass microspheres, doped sodium alanates, and sodium alanates within the container to store hydrogen; and a heating system for heating said hydrogen storage material to recover hydrogen that includes heating elements for insertion into said cassette module.

9. The system of claim 8, wherein said heating elements comprise thermal prongs or thermal vanes.

10. The system of claim 8 wherein said heating system comprises an array of alternating heating devices and cooling devices within said hydrogen storage material.

11. The system of claim 8 wherein: said hydrogen fuel cassette includes a plurality of electrical resistance heaters.

12. A system comprising:

a hydrogen fuel container, a material selected from the group consisting of metal hydrides, carbon nanostructures, glass microspheres, doped sodium alanates, and sodium alanates within the container to store hydrogen;

said hydrogen storage material being powdered; and said hydrogen recovery unit recovering hydrogen through reaction of said material with water or enhanced water formulations.

13. A system comprising:

a hydrogen fuel container; and a material selected from the group consisting of metal hydrides, carbon nanostructures, glass microspheres, doped sodium alanates, and sodium alanates within the container to store hydrogen;

a hydrogen dispensing unit to dispense hydrogen to a hydrogen powered vehicle.

\* \* \* \* \*